(12) United States Patent
Matsumoto

(10) Patent No.: US 6,975,572 B2
(45) Date of Patent: Dec. 13, 2005

(54) OPTICAL DISC APPARATUS WITH REGULATION OF RECORDING VELOCITY AND LASER POWER

(75) Inventor: Keishi Matsumoto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 538 days.

(21) Appl. No.: 10/067,926

(22) Filed: Feb. 5, 2002

(65) Prior Publication Data

US 2002/0105874 A1 Aug. 8, 2002

(30) Foreign Application Priority Data

Feb. 5, 2001 (JP) .......................................... 2001-028774
Mar. 2, 2001 (JP) .......................................... 2001-058866

(51) Int. Cl.[7] ................................................. G11B 7/00
(52) U.S. Cl. ....................................... 369/47.53; 369/116
(58) Field of Search .............................. 369/47.5, 47.1, 369/116, 47.55, 47.53

(56) References Cited

U.S. PATENT DOCUMENTS 5,862,103 A * 1/1999 Matsumoto et al. ...... 369/13.27
6,157,609 A * 12/2000 Shoji et al. ............... 369/275.3
6,639,890 B1 * 10/2003 Miura et al. ................. 369/116

FOREIGN PATENT DOCUMENTS

JP 09-138947 5/1997
JP 3057875 3/1999

OTHER PUBLICATIONS

Notice of Rejection, dated Jun. 29, 2004 in Japanese Patent Application No. 2001–058866.

* cited by examiner

Primary Examiner—Nabil Hindi
(74) Attorney, Agent, or Firm—Pillsbury Winthrop Shaw Pittman LLP

(57) ABSTRACT

A test recording is performed with respect to an optical disc prior to a regular recording, and a β value for setting a qualitative parameter relating to the level of the recording state within a preferable range is derived from a result of the test recording. Then, the recording velocity at which the derived β value or the writing laser power value is within the preferable value can be obtained. Therefore, the recording velocity at which the satisfactory recording can be realized with few recording errors can be determined. Further, a relation between a writing laser power value and a Δβ value is obtained from the reproduced signal from the test record area, and the writing laser power value is determined considering the Δβ value. Therefore, it is possible to determine the writing laser power value for performing a satisfactory recording even with the optical disc having a characteristic of a so-called β significant point at which the β value significantly changes with respect to the writing laser power value.

20 Claims, 34 Drawing Sheets

| TYPE OF DISC | C1 ERROR PREFERABLE VALUE |
|---|---|
| A | 0~10 |
| B | 0~9 |
| C | 0~12 |
| ⋮ | ⋮ |

FIG.23

| TYPE OF DISC | PREFERABLE $\beta$ VALUE |
|---|---|
| A | 0 |
| B | −1 |
| C | 2 |
| ⋮ | ⋮ |

FIG.24

| No. | WRITING POWER | $\beta$ | C1Error |
|---|---|---|---|
| 1 | 11.0 | −31 | 98 |
| 2 | 11.5 | −26 | 98 |
| 3 | 12.0 | −22 | 62 |
| 4 | 12.5 | −16 | 10 |
| 5 | 13.0 | −12 | 2 |
| 6 | 13.5 | −8 | 0 |
| 7 | 14.0 | −3 | 0 |
| 8 | 14.5 | 1 | 0 |
| 9 | 15.0 | 3 | 0 |
| 10 | 15.5 | 4 | 0 |
| 11 | 16.0 | 5 | 3 |
| 12 | 16.5 | 10 | 12 |
| 13 | 17.0 | 14 | 78 |
| 14 | 17.5 | 20 | 98 |
| 15 | 18.0 | 24 | 98 |

OPC RESULT

| TYPE OF DISC | PREFERABLE C1 ERROR VALUE |
|---|---|
| A | 0~10 |
| B | 0~9 |
| C | 0~12 |
| ⋮ | ⋮ |

OPTICAL DISC APPARATUS WITH REGULATION OF RECORDING VELOCITY AND LASER POWER

BACKGROUND OF THE INVENTION (i) Field of the Invention

The present invention relates to an optical disc recording velocity determining method for determining a recording velocity at which information can satisfactorily be recorded in optical discs such as a compact disc-recordable (CD-R) and a compact disc-rewritable (CD-RW).

The present invention relates to an optical disc writing laser power determining method for determining a writing laser power value at which information can satisfactorily be recorded in optical discs such as a compact disc-recordable (CD-R) and a compact disc-rewritable (CD-RW).

(ii) Description of Related Art

As a conventional recording method with respect to the optical discs such as a CD-R and a digital versatile disc-recordable (DVD-R), a high-velocity recording is performed at a multi-times linear velocity (e.g., double velocity, four-times velocity, . . . , and the like) higher than a standard linear velocity (one-time velocity).

By a change of a so-called strategy for adjusting a writing laser power, irradiation time, irradiation start timing, and the like in accordance with a recording velocity magnification, the recording has heretofore been performed with a negligible recording error in the respective recording velocities.

However, some types of the optical disc to be recorded do not meet the high-velocity recording. Therefore, when the recording is performed with respect to these optical discs at the high velocity, a recording error is generated at a high possibility. Moreover, even with the recording with respect to the optical disc which can meet the high-velocity recording, the recording error is sometimes generated depending upon compatibility of a recording apparatus with the optical disc. When such a recording error is generated, the data area cannot be reproduced correctly.

An optical power control (OPC: adjustment of an optimum write power of a laser beam) has been implemented which comprises: performing a test recording at a plurality of recording velocities in a predetermined area in the optical disc prior to a regular recording; and obtaining a writing laser power with which an optimum recording can be performed at the tested recording velocity. However, an available and preferable velocity range at which the recording can be performed well cannot be determined under the OPC. If the optimal recording velocity range can be determined with respect to a combination of the optical disc type to be recorded and the recording apparatus for performing the recording on the optical disc, the recording error is suppressed with the corresponding combination of the optical disc and the recording apparatus, and it is possible to perform the recording in a shorter time. However, an effective method for determining a range of the recording velocity at which the satisfactory recording can be realized has not been heretofore proposed.

As a method for controlling a write laser power to be optimum in accordance with a recording velocity magnification, the OPC method of implementing an optimum power control has been proposed which comprises: performing a test recording with a plurality of writing laser power values in a predetermined area in an optical disc prior to a regular recording; and obtaining a writing laser power value from a reproduction result of the test recording area.

In the conventional OPC, a writing laser power value/β value characteristic indicating a relation between the writing laser power value and the β value is obtained from a reproduced signal from a test record area, and is referred to, and the writing laser power value corresponding to a predetermined optimum β value is employed as an optimum writing laser power value. Additionally, the β value is a parameter relating to a reproduced signal level or amplitude, and is obtained by (a+b)/(a−b) in which character a denotes a peak level (with a sign of +) of an eight to fourteen modulation (EFM) signal waveform as a returned light receiving signal of an optical pickup, and b (with a sign of −) denotes a bottom level of the returned signal.

Additionally, in the conventional OPC, the writing laser power value corresponding to the predetermined optimum β value is determined. That is, the writing laser power value is determined considering only the β value. However, when a characteristic of the optical disc differs from a type to type, a quality level of a recording state is deteriorated during recording with the writing laser power value determined simply by considering only the β value. For example, a relation between the writing laser power value and the β value is usually substantially linear, but sometimes turns to a nonlinear relation shown in FIG. 49 because of distortion, dyestuff unevenness, and the like of the optical disc. As shown in FIG. 49, in the optical disc, the relation between the β value and the writing laser power value has a substantially linear characteristic excluding a part BT (the vicinity of a β value of 10, and the vicinity of a writing laser power value of 16 mW in the shown example). During the recording with respect to the optical disc having such a characteristic with the writing laser power value (e.g., 16 mW) corresponding to the β value significant point BT at which the β value significantly changes, a satisfactory recording state quality cannot sometimes be obtained.

SUMMARY OF THE INVENTION

The present invention has been developed in consideration of the aforementioned circumstances, and a first object thereof is to provide an optical disc recording velocity determining method in which a recording velocity for performing a satisfactory recording with few recording errors can be determined.

A second object of the invention is to provide an optical disc writing laser power determining method for obtaining a writing laser power value at which occurrence of a recording error can be reduced regardless of a type difference of the optical disc to be recorded.

To achieve the first object, according to the present invention, there is provided a method of determining a recording velocity of a signal by a write laser beam onto an optical disc. The inventive method is carried out by the steps of undergoing a test recording of a signal onto a predetermined area of the optical disc prior to an actual recording at one or more levels of the recording velocity, reproducing the signal by a read laser beam from the predetermined area of the optical disc, generating a first characteristic in function of the recording velocity based on the reproduced signal, the first characteristic representing a relation between an optical feature of the laser beam and a qualitative parameter of a recording state of the signal, the optical feature being expressed in terms of either a β value obtained from the read laser beam reflected back from the optical disc or a power of the writing laser beam, generating a second characteristic from the first characteristic based on a predetermined preferable range of the qualitative parameter, such that the second characteristic represents a relation between the recording velocity and an available range of the optical feature corresponding to the predetermined preferable range of the qualitative parameter of the recording state, and determining a preferable value of the recording velocity according to the second characteristic and a predetermined preferable range of the optical feature which is predetermined to obtain the preferable recording state.

According to the present invention, the test recording is performed with respect to the optical disc to be subjected to the regular recording, and the β value or the writing laser power value for setting the qualitative parameter relating to the level of the recording state within a preferable range is derived from a result of the test recording. Then, the recording velocity at which the derived β value or the writing laser power value is within the preferable value can be obtained. Therefore, the recording velocity at which the satisfactory recording can be realized with few recording errors can be determined.

Moreover, the aforementioned method further comprises the steps of storing a plurality of preferable ranges of the qualitative parameter and a plurality of preferable ranges of the optical feature in correspondence with a plurality of types of optical discs, and detecting the type of the optical disc under the test recording, such that the step of generating the second characteristic uses the optical range of the qualitative parameter corresponding to the detected type of the optical disc, and the step of determining uses the preferable range of the optical feature corresponding to the detected type of the optical disc.

Furthermore, in the method, the step of generating the first characteristic adopts the qualitative parameter selected from the group consisting of a frequency of detecting a frame synchronization signal contained in the signal reproduced from the optical disc, a C1 error contained in the reproduced signal, a jitter of the reproduced signal, a deviation of the reproduced signal, a degree of modulation applied to the laser beam, a reflectance of the laser beam from the optical disc and an amplitude of the reproduced signal.

In order to achieve the second object, according to the present invention, there is provided a method of determining a power of a writing optical beam used for recording of a signal onto an optical disc. The inventive method is carried out by the steps of undergoing a test recording of a signal onto a predetermined test area of the optical disc prior to an actual recording, reproducing the signal from the predetermined test area of the optical disc, generating a recording characteristic according to the reproduced signal, representing a relation between Δβ and the power of the writing optical beam, the Δβ indicating a variation of β value per a unit amount of the power of the writing optical beam, the β value being derived from a variation of an amplitude of the reproduced signal, and determining a preferable power of the writing optical beam according to the generated recording characteristic with using a preferable range of Δβ, which is predetermined for realizing a preferable recording.

According to the inventive method, a relation between the writing laser power value and the Δβ value as the change amount of the β value is obtained from the reproduced signal from the test record area, and the writing laser power value is determined considering the Δβ value. Therefore, it is possible to determine the writing laser power value for performing a satisfactory recording even with the optical disc having a characteristic of a so-called β significant point at which the β value significantly changes with respect to the writing laser power value by individual irregularities of products, such as distortion and dyestuff unevenness of the disc.

Moreover, according to the present invention, there is provided a method of determining a power of a writing optical beam used for recording of a signal onto an optical disc. The inventive method is carried out by the steps of undergoing a test recording of a signal onto a predetermined test area of the optical disc prior to an actual recording, reproducing the signal from the predetermined test area of the optical disc, generating a recording characteristic according to the reproduced signal, representing a relation between the power of the writing optical beam and at least one of qualitative parameters being associated to a quality of the recording and being selected from a group consisting of a frequency of detecting a frame synchronization signal contained in the signal reproduced from the optical disc, a C1 error contained in the reproduced signal, a jitter of the reproduced signal, a deviation of the reproduced signal, a degree of modulation applied to the laser beam, a reflectance of the laser beam from the optical disc and an amplitude of the reproduced signal, and determining a preferable power of the writing optical beam for use in the actual recording according to the generated recording characteristic.

According to the present invention, not the relation between the writing laser power value and the β value, but the relation between the writing laser power value and at least one parameter relating to the recording quality level, such as the detection frequency of the frame synchronous signal, C1 error, jitter, and deviation is obtained from the reproduced signal of the test record area, and the writing laser power value is determined in consideration of the relation. Therefore, it is possible to determine the writing laser power value for performing the satisfactory recording even with the optical disc having the characteristic of a so-called β significant point at which the β value significantly changes with respect to the writing laser power value by individual differences of products, such as distortion and dyestuff unevenness of the disc.

Furthermore, according to the present invention, there is provided a method of determining a power of a writing optical beam used for recording of a signal onto an optical disc. The inventive method is carried out by the steps of undergoing a test recording of a signal onto a predetermined test area of the optical disc prior to an actual recording, reproducing the signal from the predetermined test area of the optical disc, generating one recording characteristic according to the reproduced signal, representing a relation between the power of the writing optical beam and one of qualitative parameters being associated to a quality of the recording and being selected from a group consisting of a β value derived from a variation of an amplitude of the reproduced signal, a frequency of detecting a frame synchronization signal contained in the signal reproduced from the optical disc, a C1 error contained in the reproduced signal, a jitter of the reproduced signal, a deviation of the reproduced signal, a degree of modulation applied to the laser beam, a reflectance of the laser beam from the optical disc and an amplitude of the reproduced signal, generating another recording characteristic according to the reproduced signal, representing a relation between the power of the writing optical beam and another of the qualitative parameters, and determining a preferable power of the writing optical beam for use in the actual recording according to the generated recording characteristics.

According to the inventive method, the relation between the writing laser power value, and at least two or more qualitative parameters relating to the recording quality level, such as the β value, detection frequency of the frame synchronous signal, C1 error, jitter, and deviation is obtained from the reproduced signal of the test record area, and the writing laser power value is determined in consideration of the plurality of parameters relating to the recording level. Therefore, it is possible to determine the writing laser power value for performing the satisfactory recording even with the optical disc having the characteristic of the so-called β significant point at which a certain parameter, for example, the β value significantly changes with respect to the writing laser power value due to the individual differences of products, such as distortion and dyestuff unevenness of the disc.

BRIEF DESCRIPTION OF THE DRAWINGS

FIG. 23 is an explanatory view of a stored content of a β preferable value information storage as a constituting element of the controller.

FIG. 24 is a diagram showing one example of β value and C1 error value for each writing laser power value obtained by the test recording performed by the optical disc recording/reproducing apparatus.

DETAILED DESCRIPTION OF THE PREFERRED EMBODIMENTS

Embodiments of the present invention will be described hereinafter with reference to the drawings.

A-1. Constitution of First Embodiment

Figure 1:
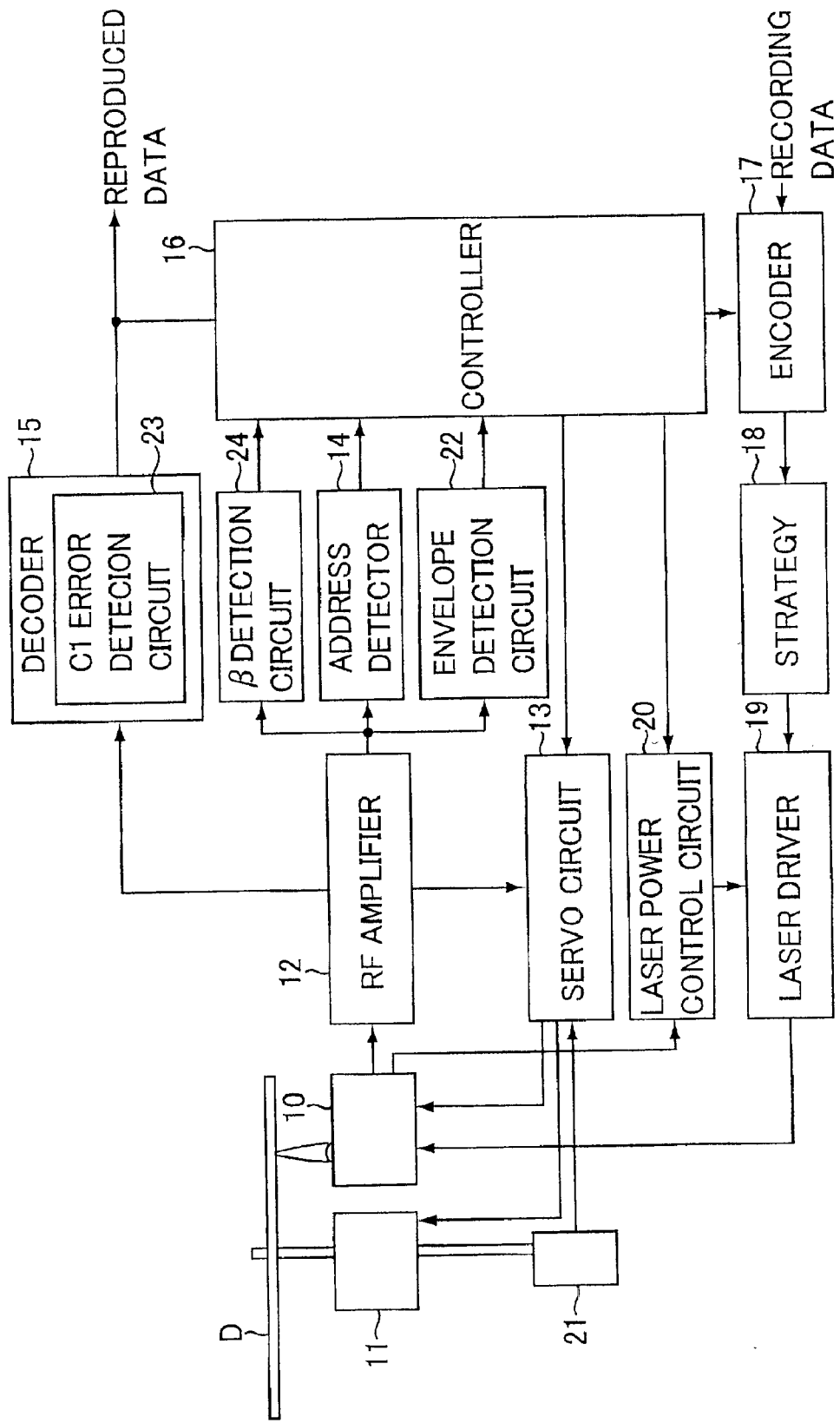
FIG. 1 is a block diagram showing a constitution of an optical disc recording/reproducing apparatus according to a first embodiment of the present invention.

First, FIG. 1 is a block diagram showing a constitution of an optical disc recording/reproducing apparatus according to the first embodiment of the present invention. As shown in FIG. 1, the optical disc recording/reproducing apparatus includes an optical pickup 10, spindle motor 11, RF amplifier 12, servo circuit 13, address detector circuit 14, decoder 15, controller 16, encoder 17, strategy circuit 18, laser driver 19, laser power control circuit 20, frequency generator 21, envelope detection circuit 22, C1 error detection circuit 23, and $\beta$ detection circuit 24.

The spindle motor 11 is a motor for rotating/driving an optical disc (CD-R herein) D as an object in which data is recorded. The optimum pickup 10 has a laser diode, an optical system such as a lens and mirror, and a returned light receiving element. The optical pickup irradiates the optical disc D with a laser beam during recording and reproducing, receives a returned light from the optical disc D, and outputs an RF signal subjected to eight to fourteen modulation (EFM) as a light receiving signal to the RF amplifier 12. Moreover, the optical pickup 10 has a monitor diode, a current is generated in the monitor diode by the returned light of the optical disc D, and the current is supplied to the laser power control circuit 20.

The RF amplifier 12 amplifies the RF signal supplied from the optical pickup 10 and subjected to the EFM modulation, and outputs the amplified RF signal to the servo circuit 13, address detector circuit 14, envelope detection circuit 22, $\beta$ detection circuit 24, and decoder 15. The decoder 15 EFM-demodulates the EFM-modulated RF signal supplied from the RF amplifier 12 and generates reproduced data during reproducing.

On the other hand, during recording, the decoder 15 EFM-demodulates the RF signal supplied from the RF amplifier 12 during reproduction of a test record area, the C1 error detection circuit 23 detects a C1 error based on the demodulated signal, and outputs the error to the controller. The C1 error detection circuit 23 subjects the EFM demodulated signal to error correction using an error correction code called a cross interleaved read Solomon code (CIRC), and detects the number of frames in which the first error correction cannot be performed in one sub code frame (98 EFM frames), that is, a frequency of the C1 error.

During recording, the optical disc recording/reproducing apparatus according to the present embodiment is constituted to subject a predetermined area (see FIG. 2) on an inner peripheral side of the optical disc D to a test recording prior to a regular recording, and obtain a recording velocity at which a satisfactory recording can be performed with respect to the optical disc D based on a reproduction result of the test record area. The C1 error detection circuit 23 detects the C1 error of the reproduced signal of the test record area, and outputs the error to the controller 16.

Figure 2:
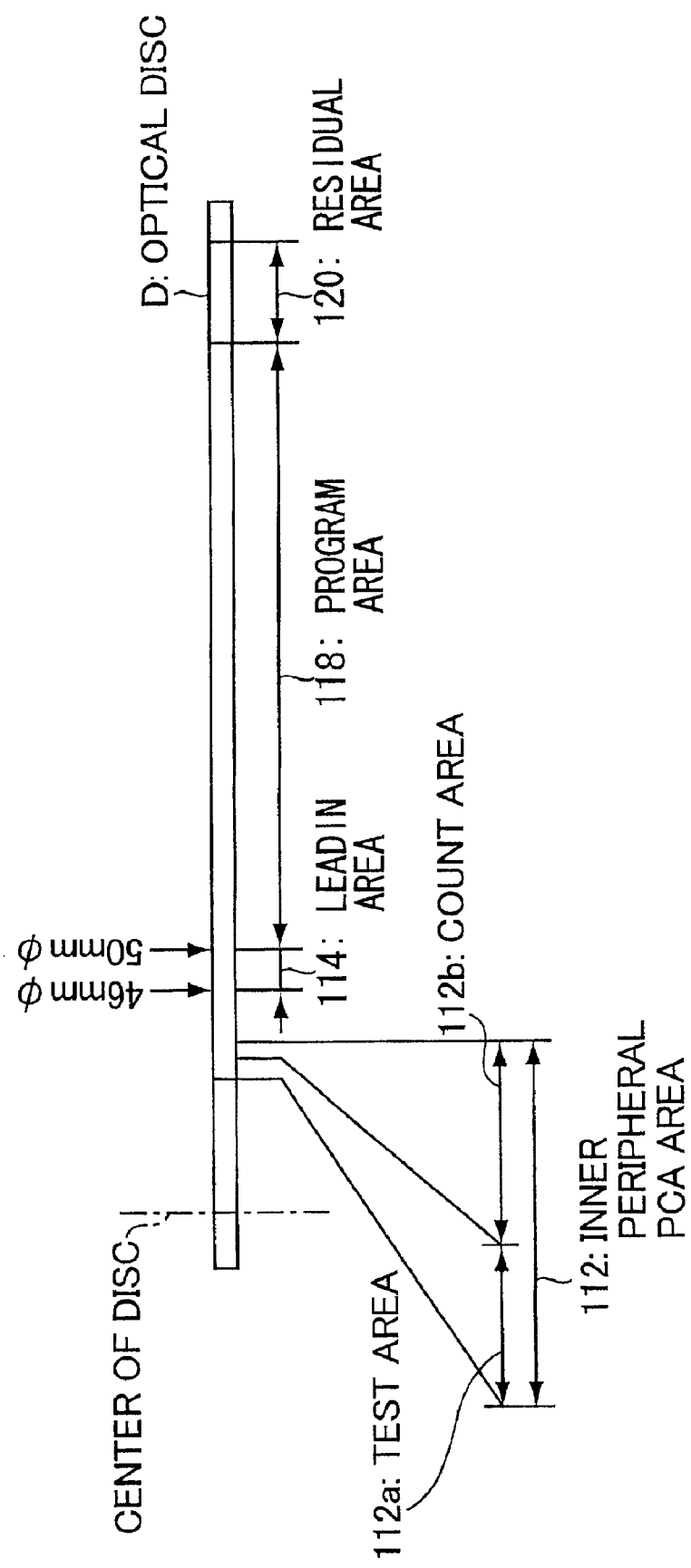
FIG. 2 is an explanatory view of a test area in which a test recording is performed in an optical disc by the optical disc recording/reproducing apparatus.

Here, the test area for performing the test recording of the optical disc D (CD-R) will be described with reference to FIG. 2. An area of the optical disc D having a diameter of 46 to 50 mm is prepared as a leadin area 114, and a program area 118 and residual area 120 for recording data are prepared on an outer peripheral side of the leadin area. On the other hand, an inner peripheral side power calibration area (PCA) 112. The inner peripheral side PCA area 112 includes a test area 112a, and a count area 112b. The test area 112a is subjected to the test recording prior to a regular recording processing. Here, an area in which a large number of test recordings can be performed is prepared as the test area 112a, and an EFM signal indicating a portion of the test area 112a in which the recording is ended at an end of the test recording is recorded in the count area 112b. Therefore, when the optical disc D is subjected to the test recording, the EFM signal of the count area 112b is read. Then, a position of the test area 112a from which the test recording is to be performed is seen. In the optical disc recording/reproducing apparatus according to the present embodiment, the test area 112 is subjected to the test recording prior to the regular recording.

Turning back to FIG. 1, the address detector circuit 14 extracts a wobble signal component from the EFM signal supplied from the RF amplifier 12, decodes information indicating time information (address information) of each position included in the wobble signal component, identification information (disc ID) for identifying the disc, and disc types such as disc dyestuff, and outputs the information to the controller 16.

The $\beta$ detection circuit 24 calculates a $\beta$ (asymmetry) value as a parameter relating to a reproduced signal level from the EFM modulated RF signal supplied from the RF amplifier 12 during reproduction of the test record region, and outputs a calculation result to the controller 16. The $\beta$ value is determined by $(a+b)/(a-b)$ in which character a denotes a peak level (sign is +) of a signal waveform subjected to the EFM modulation, and b denotes a bottom level (sign is − of the signal waveform.

The envelope detection circuit 22 detects an envelope of the EFM signal of the count area 112b of the optical disc D in order to detect the portion of the predetermined test area of the optical disc D from which the test recording is started before performing the test recording.

The servo circuit 13 performs a rotation control of the spindle motor 11, and a focus control, tracking control, and feeding control of the optical pickup 10. In the optical disc recording/reproducing apparatus according to the present embodiment, it is possible to switch and perform a constant angular velocity (CAV) method for driving the optical disc D at a constant angular velocity during recording, and a constant linear velocity (CLV) method for driving the optical disc D at a linear velocity set to be constant. The servo circuit 13 changes CAV control and CLV control in response to a control signal supplied from the controller 16. Here, in the CAV control by the servo circuit 13, a rotation number of the spindle motor 11 detected by the frequency generator 21 is controlled to agree with a set rotation number. Moreover, in the CLV control by the servo circuit 13, the spindle motor 11 is controlled so that a wobble signal of the EFM-modulated signal supplied from the RF amplifier 12 indicates a set linear velocity magnification.

The encoder 17 EFM-modulates supplied recording data, and outputs the data to the strategy circuit 18. The strategy circuit 18 performs a time axis correction processing, or the like with respect to the EFM signal supplied from the encoder 17, and outputs the signal to the laser driver 19. The laser driver 19 drives the laser diode of the optical pickup 10 in accordance with the signal modulated with the recording data supplied from the strategy circuit 18, and the control of the laser power control circuit 20.

The laser power control circuit 20 controls the laser power emitted from the laser diode of the optical pickup 10. Concretely, the laser power control circuit 20 controls the laser driver 19 based on a current value supplied from the monitor diode of the optical pickup 10 and information indicating an optimum target value of the laser power supplied from the controller 16 so that the laser beam having the optimum laser power is emitted from the optical pickup 10.

The controller 16 is constituted of a central processing unit (CPU), read only memory (ROM), random access memory (RAM), and the like, and controls respective apparatus components of the optical disc recording/reproducing apparatus in accordance with program stored in the ROM.

First, the controller 16 controls the respective apparatus components so as to perform the test recording with respect to the predetermined area of the optical disc D set in the optical disc recording/reproducing apparatus prior to the regular or actual recording as described above. Furthermore, the controller 16 performs a recording velocity determination processing for obtaining a recording velocity, at which a satisfactory recording can be performed without any recording error on the optical disc D subjected to the test recording by the optical disc recording/reproducing apparatus, from the signal obtained during reproducing of the test record area based on the $\beta$ value detected by the $\beta$ detection circuit 24, the count value of the C1 error detected by the C1 error detection circuit 23, and the like. A functional constitution of the controller 16 which performs the recording velocity determination processing for obtaining the recording velocity is shown in FIG. 3.

Figure 3:
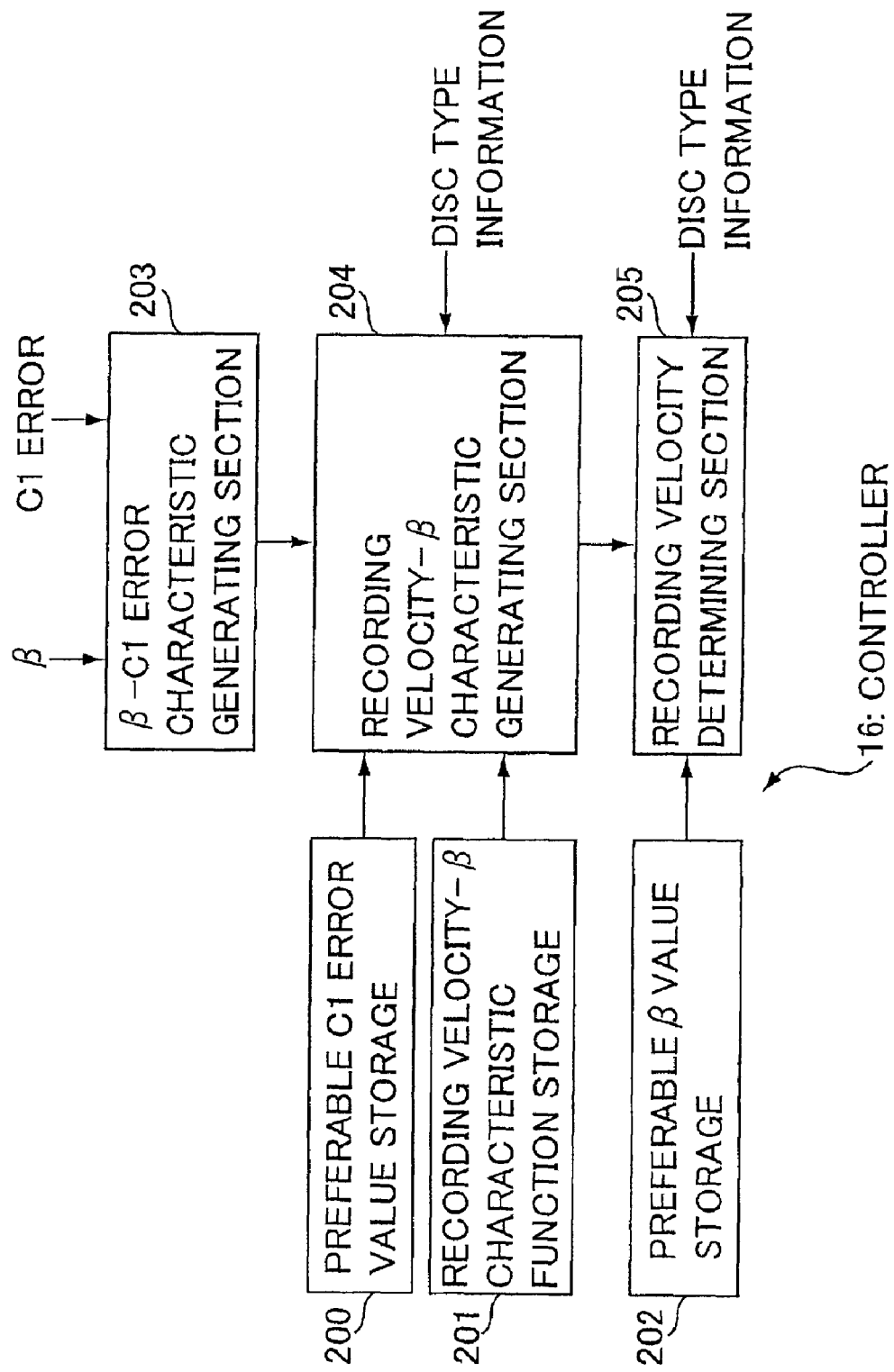
FIG. 3 is a block diagram showing a functional constitution of a controller as a constituting element of the optical disc recording/reproducing apparatus.

As shown in FIG. 3, the controller 16 has a C1 error preferable value storage 200, recording velocity-$\beta$ characteristic function storage 201, $\beta$ preferable value storage 202, $\beta$-C1 error characteristic generating section 203, recording velocity-$\beta$ characteristic generating section 204, and recording velocity generating section 205.

In the $\beta$-C1 error characteristic generating section 203, the $\beta$ value detected by the $\beta$ detection circuit 24, and the count value (hereinafter referred to a C1 error value) of the C1 error detected by the C1 error detection circuit 23 are supplied. Then, a recording characteristic indicating a relation between the $\beta$ value for each of a plurality of recording velocities (V1, V2, V3; V1<V2<V3 in the shown example) shown in FIG. 4A and the count value of the C1 error is obtained from the supplied $\beta$ value and C1 error value. In order to obtain the characteristic for each of the plurality of recording velocities, the test recording is performed with three recording velocities V1, V2, V3, and the recording characteristic in each velocity may be obtained from the $\beta$ value and C1 error value detected from the reproduced signal of the area recorded at each velocity. Additionally, instead of performing the test recording at each velocity and obtaining the recording characteristic shown in FIG. 3, for example, the method may include: performing the test recording only at one recording velocity; using other data for estimating the velocity prepared from the reproduced signal of the test record area based on a result of an experiment performed beforehand; and obtaining characteristics of the recording velocities other than the test recording velocity.

Furthermore, the test recording may be performed once or a plurality of times for a certain velocity (one or a plurality of velocities), but it is preferable to perform the test recording a plurality of times so that a more accurate judgment result is obtained.

Figure 4:
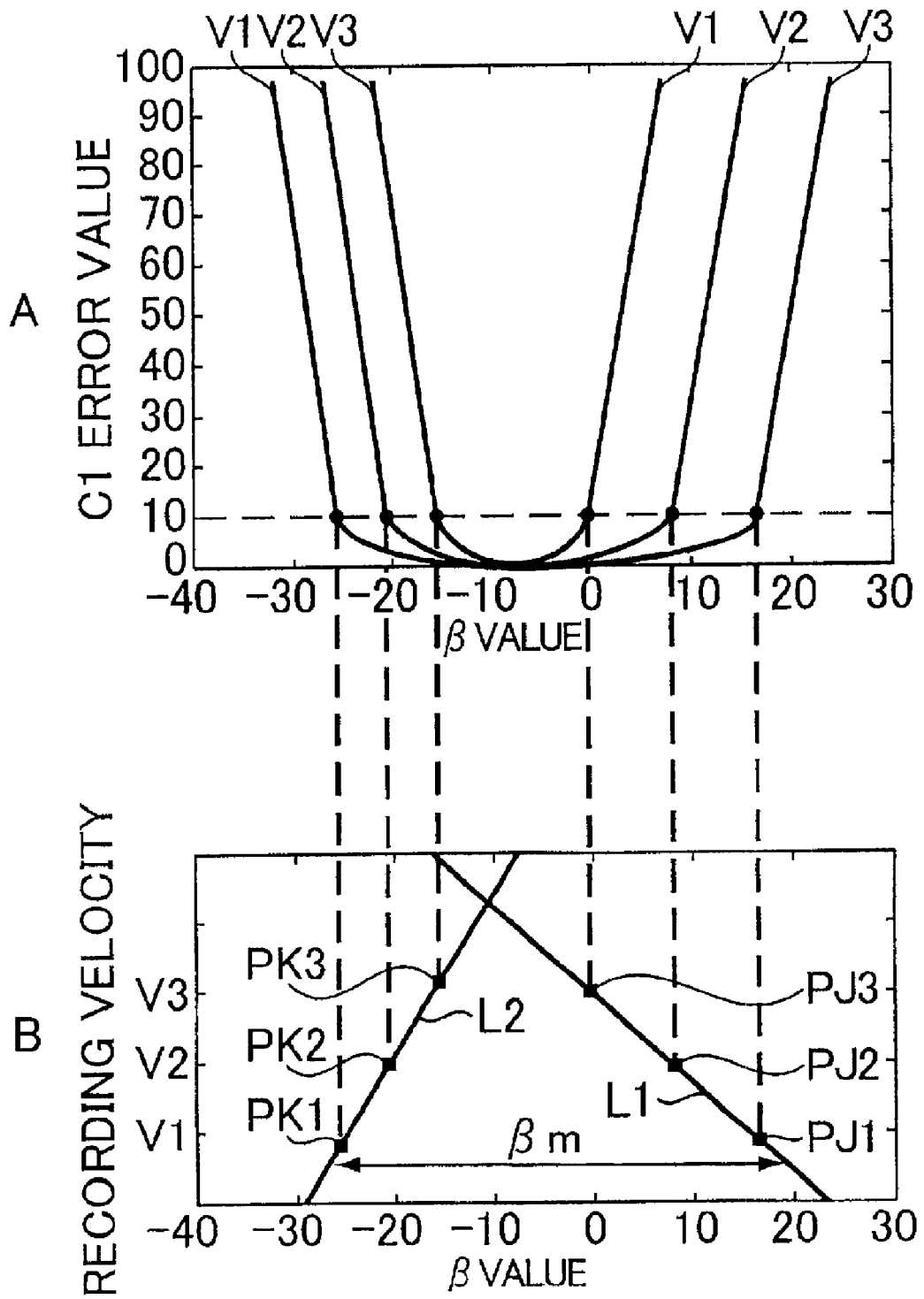
FIG. 4 is an explanatory view of a derivation method of a recording maximum velocity by the controller.

The recording velocity characteristic generating section 204 obtains a recording velocity-β characteristic indicating a relation between the recording velocity and the value shown in FIG. 4B based on β-C1 error characteristics for the respective recording velocities obtained by the β-C1 error characteristic generating section 203 as described above and C1 error preferable value information stored in the C1 error preferable value storage 200.

Figures 5, 6:
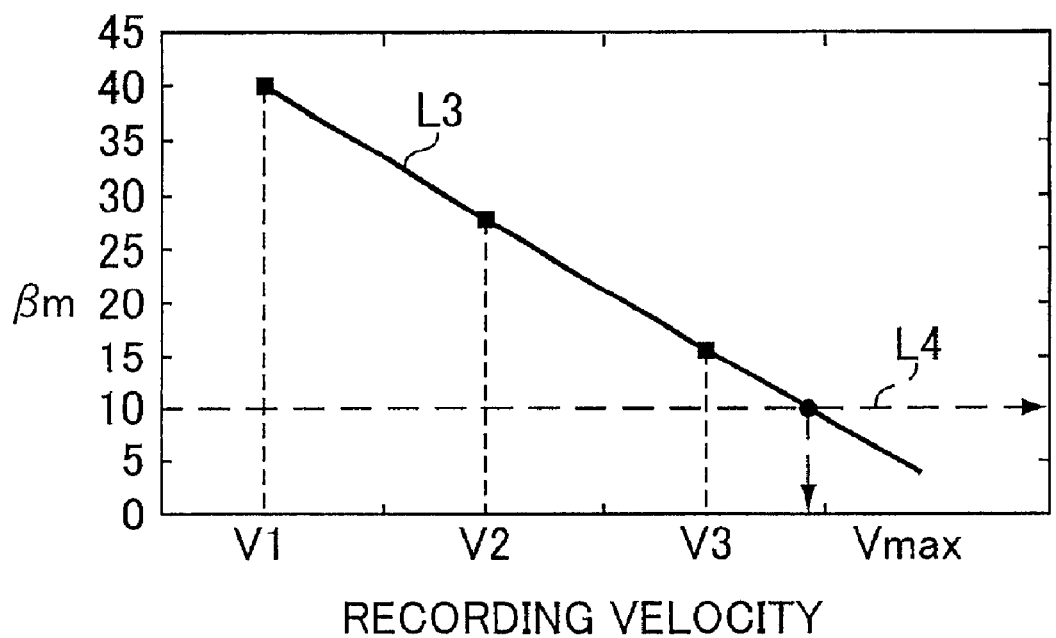
FIG. 5 is an explanatory view showing a stored content of a C1 error preferable value storage as the constituting element of the controller.
FIG. 6 is an explanatory view of the derivation method of a recording maximum velocity by the controller.

As shown in FIG. 5, in the C1 error preferable value storage 200, information indicating a range of the C1 error value for performing a satisfactory recording is stored for each type (manufacturing maker and dyestuff) of the optical disc D. In the shown example, information indicating that the satisfactory recording can be performed with the disc of a type A in a range of the C1 error value of 0 to 10 (98 C1 error values at maximum) is stored. Here, the information stored in the C1 error preferable value storage 200 is a value obtained for each type of the disc beforehand by the experiment. The recording velocity-β characteristic generating section 204 uses C1 error preferable value information stored in the C1 error preferable value storage 200 to obtain the recording velocity-β characteristic shown in FIG. 4B by the following method.

First, the recording velocity-β characteristic generating section 204 obtains the C1 error preferable value information corresponding to type information of the optical disc D detected by the address detector circuit 14 from the preferable value information stored in the C1 error preferable value storage 200. Moreover, upper and lower limit values of the β value for setting the C1 error value within a range indicated by the C1 error embodiment preferable value information obtained for each of three recording velocities are obtained based on the obtained C1 error preferable value information and the β-C1 error characteristic obtained by the β-C1 error characteristic generating section 203 as shown in FIG. 4A. For example, when the type information of the disc detected by the address detector circuit 14 is A, the preferable value information (0 to 10) corresponding to the type A is obtained from the C1 error preferable value information stored in the C1 error preferable value storage 200. Moreover, as shown in FIG. 4B, possible upper limit values PJ1, PJ2, PJ3 and lower limit values PK1, PK2, PK3 of the β value for setting the C1 error value within a range of 1 to 10 indicated by the obtained C1 error preferable value information are obtained.

When the possible upper limit values PJ1, PJ2, PJ3 and lower limit values PK1, PK2, PK3 of the β value for the respective recording velocities are obtained, the recording velocity-β characteristic generating section 204 obtains a relation between the recording velocity shown in FIG. 4B and a range between the possible upper and lower limit values of the β value based on the obtained upper limit values PJ1, PJ2, PJ3 and lower limit values PK1, PK2, PK3, and the function information stored in the recording velocity-β characteristic function storage 201. In the recording velocity-β characteristic function storage 201, function information indicating changes of the upper and lower limit values of the β value for setting the C1 error value within the preferable range with respect to a change of the recording velocity is stored. Here, the function information is prepared based on the upper and lower limit values of the β value with respect to a large number of recording velocities obtained beforehand by the experiment in which the test recording is performed at a large number of recording velocities, and a linear function (i.e., a function linearly changing in a graph shown in FIG. 4B) is stored in the present embodiment. Also for function information, optimum information is stored beforehand for each type (manufacturing maker and dyestuff) of the optical disc D, and the function information may appropriately be selected in accordance with the type information of the optical disc D. Displacements of the upper and lower limit values of β with respect to the recording velocity can be defined from the function information and the upper limit values PJ1, PJ2, PJ3 and lower limit values PK1, PK2, PK3 by lines L1 and L2 in the graph of FIG. 4B. When the lines L1, L2 are defined, a relation between a value βm indicating a possible range of the β value represented by (upper limit value of β-lower limit value of β) and the recording velocity can be obtained, and the recording velocity-β range characteristic shown in FIG. 6 can be obtained. Additionally, the three upper limit values PJ1, PJ2, PJ3 and lower limit values PK1, PK2, PK3 are obtained from the characteristics for the respective three recording velocities as described above, and these may be used to obtain a relation between the possible range βm of the β value and the recording velocity. When two functions (e.g., linear function y=ax+b+c (c denotes a variable value with actually measured upper and lower limit values assigned thereto, and a, b are fixed values)) for obtaining the upper and lower limit values are stored in the recording velocity-β characteristic function storage 201, and when the upper limit value PJ1 and lower limit value PK1 of a certain velocity V1 are obtained, the linear function can be used to define the lines L1, L2. Thereby, the relation between the possible range βm of the β value and the recording velocity can be obtained. A relation between the possible range βm and the recording velocity may be obtained from the β-C1 error characteristic of one velocity in this manner. In this case, of course, the test recording may be performed at a single velocity. Moreover, instead of preparing two functions for the upper and lower limit values as described above, a function indicating a relation between the possible range βm of the β value and the recording velocity (e.g., linear function y=Ax+B+C (C denotes a variable value with a difference between the actually measured upper limit value and the lower limit value of the velocity assigned thereto, and A, B are fixed values)) is held beforehand The relation between the possible range βm of the β value and the recording velocity may be obtained from this function and an actually measured value of the difference between the upper limit value and the lower limit value of the velocity.

Figures 7, 8:
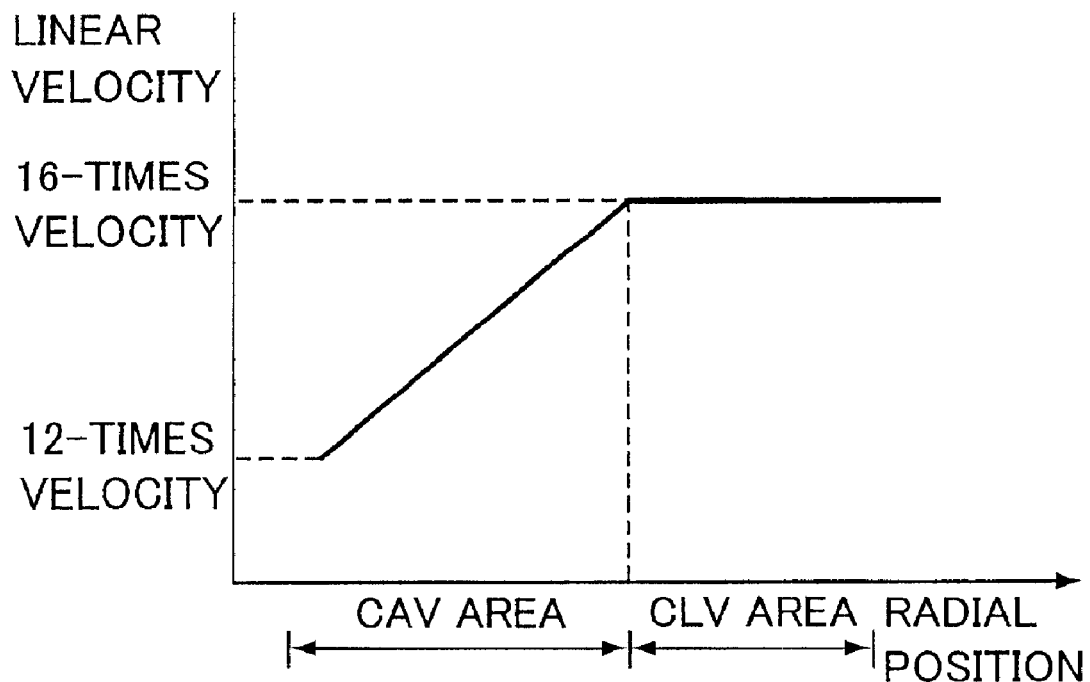
FIG. 7 is an explanatory view showing the stored content of a β preferable value storage as the constituting element of the controller.
FIG. 8 is an explanatory view of a switching timing between a CAV operation and a CLV operation of the optical disc recording/reproducing apparatus.

The recording velocity generating section 205 obtains a maximum velocity at which the optical disc recording/reproducing apparatus can perform the recording with respect to the optical disc D subjected to the test recording with a maintained satisfactory recording level based on the recording velocity-β range characteristic obtained by the recording velocity-β characteristic generating section 204 as described above and β preferable value information stored in the β preferable value storage 202. As shown in FIG. 7, in the β preferable value storage 202, information indicating a value permitting a fluctuation range for performing a satisfactory recording for each type (manufacturing maker and dyestuff) of the optical disc D is stored. In the shown example, information indicating that the satisfactory recording can be performed with the disc of type A in the range of the β value of 10 or more is stored. That is, when the preferable range of the β value as a target decreases, it is difficult for the optical disc recording/reproducing apparatus to control the β value within a small value range because of warp, dyestuff unevenness, and the like of the optical disc D. In the β preferable value storage 202, In consideration of difficulty in the control with a very small range of the target β value, a value at which the optical disc recording/ reproducing apparatus can sufficiently control the β value within the target range even with the warp, dyestuff unevenness, and the like of the optical disc D is stored. Here, the information stored in the β preferable value storage 202 is a value obtained beforehand for each type of the disc by the experiment. The recording velocity generating section 205 uses the preferable value information of the range of the β value stored in the β preferable value storage 202 to obtain a maximum recording velocity at which β is within the range indicated by the preferable value information from the characteristic shown in FIG. 6 as the maximum velocity at which the optical disc recording/reproducing apparatus can execute the recording on the optical disc D subjected to the test recording with a maintained recording level. An example in FIG. 6 shows a case in which the preferable value information of the range βm of the β value is 10 or more. In this case, a recording velocity Vmax at which a characteristic line L3 intersects a line L4 with βm=10 is obtained as the recording maximum velocity.

Turning back to FIG. 1, the controller 16 in the optical disc recording/reproducing apparatus according to the present embodiment controls the hardware so as to switch between CAV and CLV based on the recording maximum velocity obtained as described above. Concretely, the controller 16 controls the servo circuit 13 so that the CAV method is used during the recording on an innermost peripheral side. After the recording is started in this manner, the controller 16 specifies a radial position of the optical disc D based on address information supplied from the address detector circuit 14, and drives the spindle motor 11 at a predetermined angular velocity. In this case, when the radial position is detected to correspond to the maximum velocity obtained as described above, the controller outputs a control signal for switching the CAV method to the CLV method to the servo circuit 18. As shown in FIG. 8, the spindle motor 11 is driven in the CAV method at the rotation number corresponding to a linear velocity of 12-times velocity in the innermost peripheral position. The position of the radial in which the linear velocity reaches the maximum velocity (16-times velocity herein) with the rotation number is detected. Then, the controller 16 outputs the control signal instructing the switching to CLV to the servo circuit 13. Thereafter, the servo circuit 13 drives the spindle motor 11 at a 16-times velocity in the CLV method.

Moreover, during the recording in the CAV method, the controller 16 successively outputs information indicating a target value of optimum laser power to the laser power control circuit 20 in accordance with the linear velocity. That is, when the CAV recording is performed, the linear velocity successively changes during the recording, and therefore the information indicating the target value of the laser power optimum for the successively changing linear velocity is outputted. Concretely, the recording of the disc proceeds on an outer peripheral side. That is, when the linear velocity increases, a large laser power is successively outputted as the target value to the laser power control circuit 20. Here, the target value of the optimum laser power corresponding to the current linear velocity may be obtained with reference to a data table prepared beforehand by the experiment, or may be obtained by so-called OPC. This OPC method includes: performing the test recording of the optical disc D in an innermost peripheral portion before a regular recording; and obtaining the target value of the optimum laser power in each linear velocity from the reproduced signal obtained by reading the recorded portion.

A-2. Operation of First Embodiment

Figure 9:
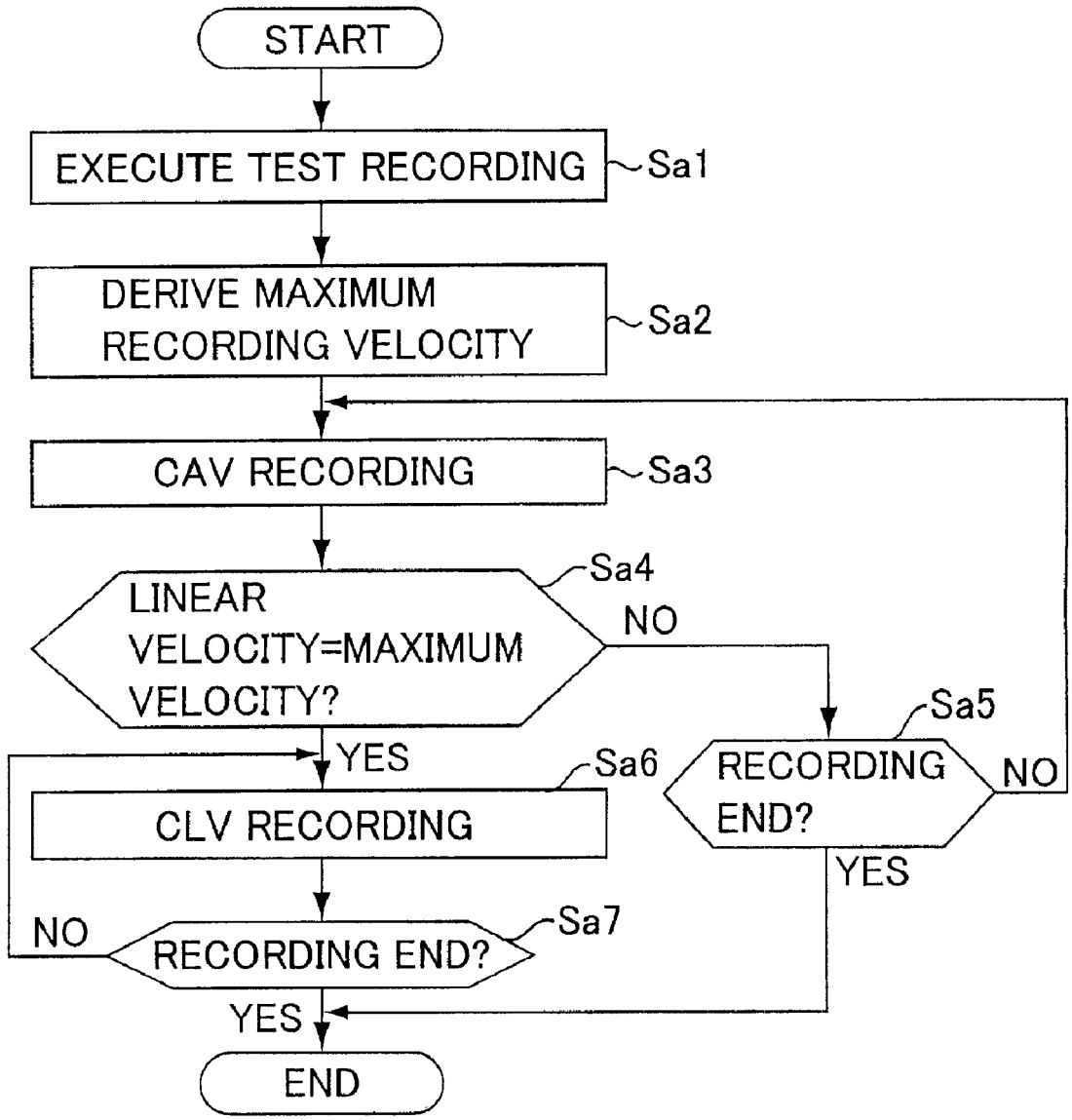
FIG. 9 is a flowchart showing a processing executed by the controller during recording of data by the optical disc recording/reproducing apparatus.

The constitution of the optical disc recording/reproducing apparatus according to the first embodiment of the present invention has been described above. An operation for the recording by the optical disc recording/reproducing apparatus constituted as described above will be described hereinafter with reference to a flowchart of a processing executed by the controller 16 shown in FIG. 9.

First, when a user sets the optical disc D in the optical disc recording/reproducing apparatus and instructs a recording start, the test recording is performed in the test area 112a of the set optical disc D (step Sa1). Subsequently, the controller 16 uses the β value and C1 error value detected from the reproduced signal of the test record area to derive the maximum recording velocity at which the optical disc recording/reproducing apparatus performs the satisfactory recording with respect to the set optical disc D (step Sa2).

Thereafter, the controller 16 instructs the servo circuit 13 to drive the optical disc D in the CAV method (step Sa4), and executes the recording in the CAV method. When the recording in the CAV method is started in this manner, the controller 16 outputs the information indicating the target value of the optimum laser power corresponding to the change of the linear velocity to the laser power control circuit 20 in order to increase the laser power with an increase of the linear velocity. Thereby, the laser power control circuit 20 feedback-controls the laser power in order to obtain the target value supplied from the controller 16.

Moreover, the controller 16 judges whether or not the linear velocity of a recorded position of the optical disc D reaches the maximum recording velocity obtained as described above based on the address information detected from the address detector circuit 14 (step Sa4). Here, when the linear velocity of the recorded position is judged not to reach the maximum recording velocity, the controller 16 continues the recording in the CAV method. When all data to be recorded is recorded, the recording processing ends (judgment "YES" of step Sa5). On the other hand, when the linear velocity of the recorded position is judged to reach the maximum recording velocity in the judgment of the step Sa4, the controller 16 outputs the control signal instructing the switching of the recording method to the CLV method from the CAV method to the servo circuit 13, and executes the recording in the CLV method (step Sa6).

Thereafter, during the recording in the CLV method, the controller 16 judges whether or not the recording ends (step Sa7). When all the data to be recorded is recorded, or when the user instructs a recording end, the judgment results in "YES", and the recording processing ends.

In the present embodiment, the test recording is performed prior to the regular data recording processing, and the maximum recording velocity at which the satisfactory recording can be achieved with respect to the optical disc D can be obtained from the reproduced signal of the test record area. Moreover, during the regular recording, the CAV recording is performed until the obtained maximum recording velocity is reached. After the maximum recording velocity is achieved, the CLV recording is performed at the velocity. Therefore, the data can be recorded in a short time without impairing a satisfactory recording quality level. Therefore, when the user instructs the recording without noticing the corresponding recording velocity of the optical disc D or compatibility of the optical disc D with the optical disc recording/reproducing apparatus, the data can automatically be recorded at the satisfactory recording level in the short time.

A-3. Modification Example

Additionally, the present invention is not limited to the aforementioned embodiment, and can variously be modified as follows.

Modification Example 1

Moreover, in the aforementioned embodiment, the CAV recording is performed until the maximum recording velocity obtained in accordance with the result of the test recording is achieved. After the maximum recording velocity is achieved, the CLV recording is performed. However, the CLV recording may be performed at the maximum recording velocity or a lower velocity from the beginning.

Furthermore, the aforementioned obtained maximum recording velocity is 12-times velocity, and the user instructs the CLV recording of a 16-times velocity. In this case, the user is notified that the satisfactory recording cannot be achieved with the CLV recording at the 16-times velocity, and the user may be urged to set the recording velocity again. Moreover, when the recording velocity set by the user is higher than the maximum recording velocity obtained as described above, instead of urging the user to set the velocity again as described above, the automatically obtained maximum recording velocity or lower recording velocity is set, and the recording may be performed at the changed recording velocity. In this case, a required time for the recording at the changed/set recording velocity is estimated, and the estimated time may be notified to the user.

Modification Example 2

Figure 10:
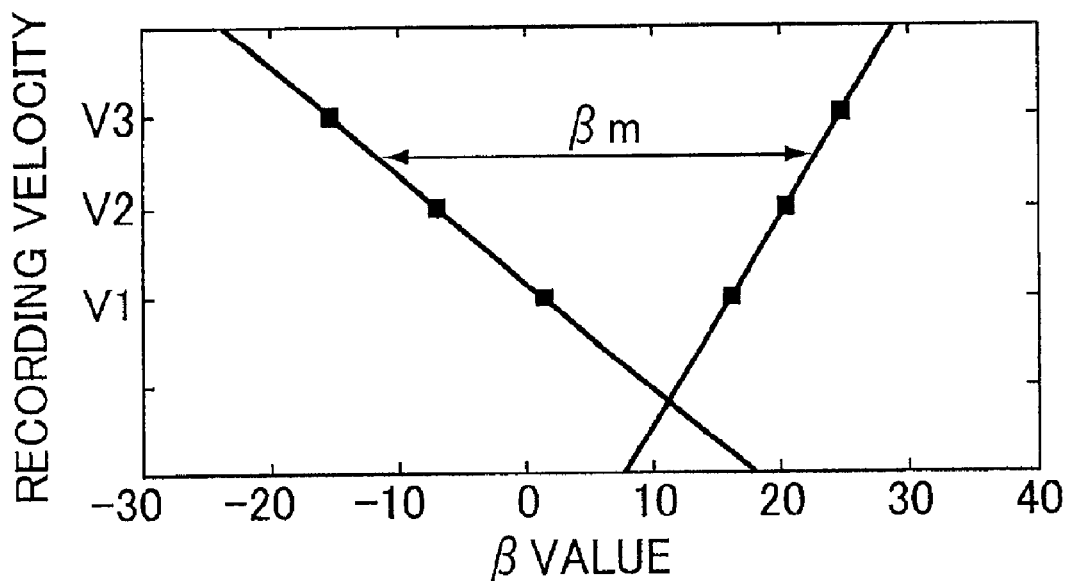
FIG. 10 is an explanatory view of a derivation method of a recording minimum velocity by the controller according to a modification example of the optical disc recording/reproducing apparatus.
Figure 11:
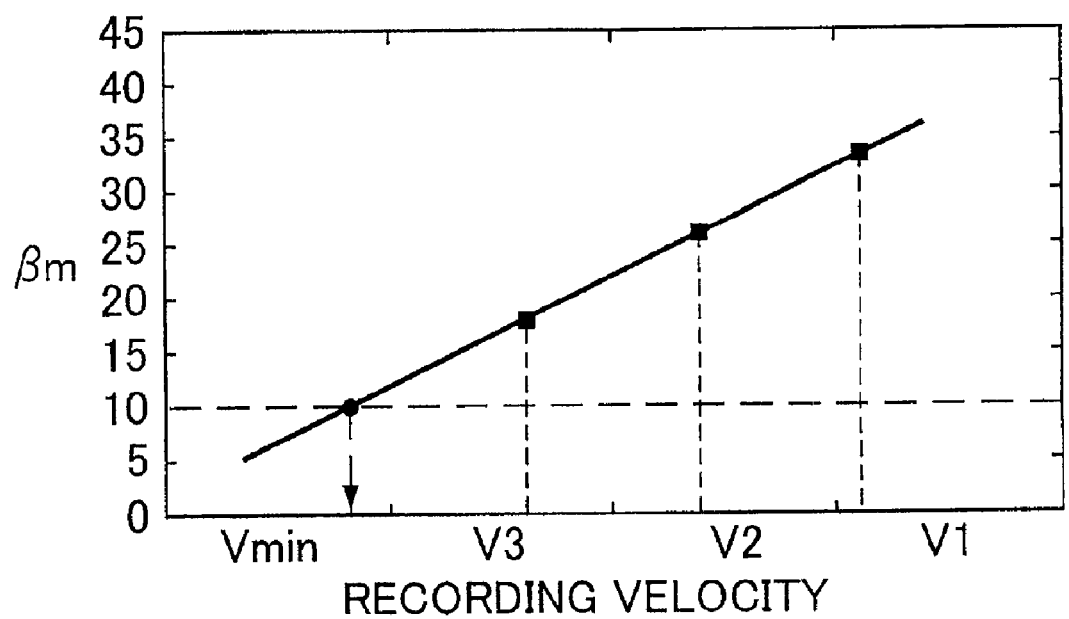
FIG. 11 is an explanatory view of the derivation method of the recording minimum velocity by the controller according to the modification example of the optical disc recording/reproducing apparatus.

Moreover, in the aforementioned embodiment, the maximum recording velocity at which the satisfactory recording is possible is obtained. However, a case in which the recording level is deteriorated during low-velocity recording is also considered (a case in which the range βm of the β value for setting the C1 error value within the preferable range is reduced at a lower velocity as shown in FIG. 10). In this case, as shown in FIG. 11, a velocity at which a value (10 or more in the shown example) indicated by the β preferable value information may be obtained as a minimum recording velocity Vmin.

Figure 12:
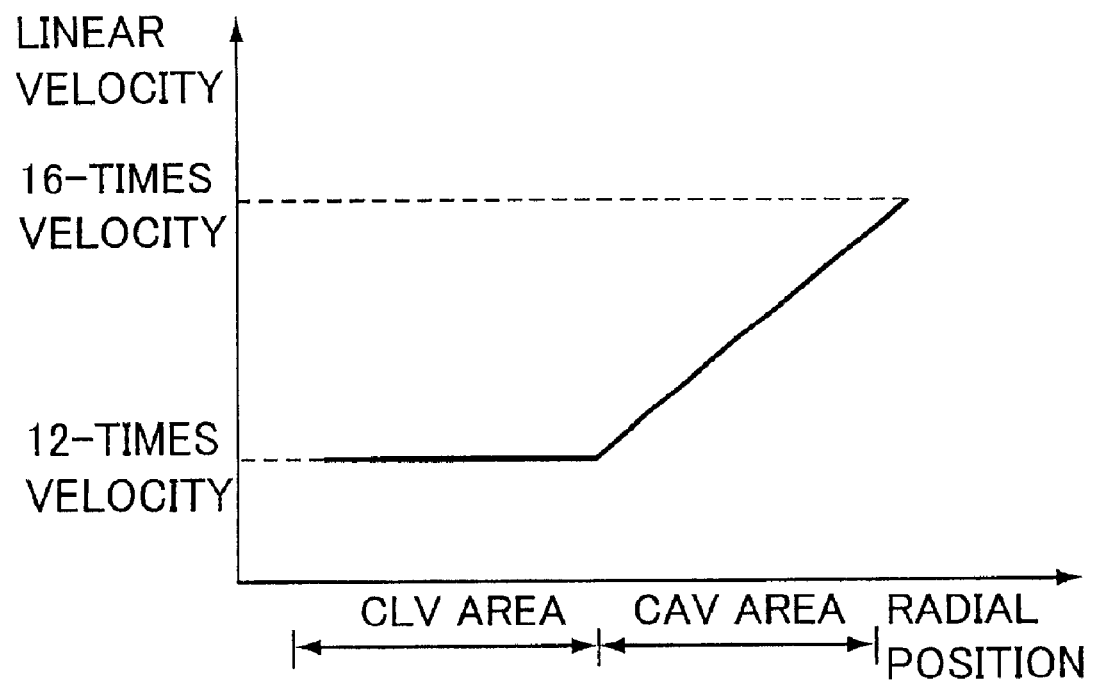
FIG. 12 is an explanatory view of the switching timing between the CAV operation and the CLV operation in the modification example of the optical disc recording/reproducing apparatus.

During the regular recording with the minimum recording velocity obtained in this manner, as shown in FIG. 12, the CLV recording is performed at a recording velocity higher than the obtained minimum recording velocity (4-times velocity in the shown example), and may be switched to the CAV recording, when the linear velocity of the CAV recording exceeds the minimum recording velocity.

Modification Example 3

Figure 13A:
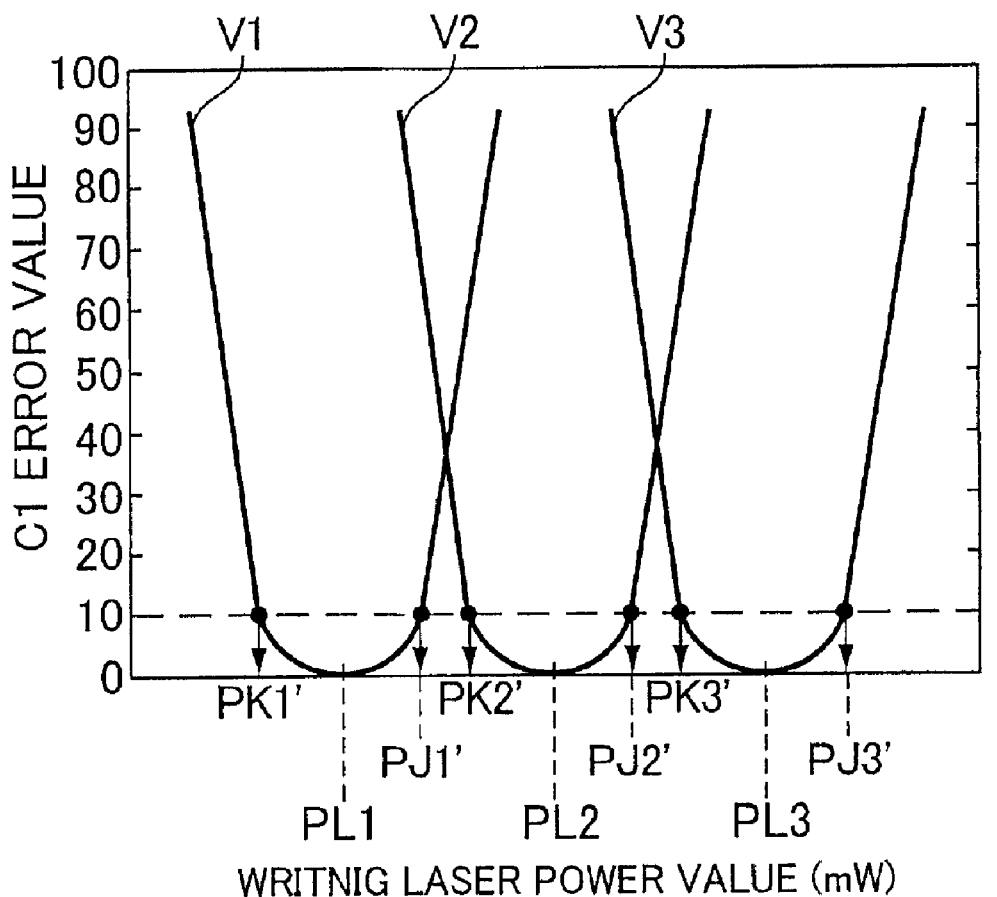
FIGS. 13A and 13B are an explanatory view of another derivation method of the recording maximum velocity by the controller.

Moreover, in the embodiment, the recording velocity is obtained on the basis of the β value, but this is not limited, and the recording velocity can be obtained on the basis of the writing laser power value. In this case, the controller 16 obtains a relation between the writing laser power value and the C1 error value shown in FIG. 13A for each of the plurality of recording velocities from the C1 error value supplied from the C1 error detection circuit 23. Here, as shown in FIG. 13A, when the writing laser power value is used as a reference instead of the β value, a recording power value also increases with the higher recording velocity. Therefore, the recording velocity is obtained based on the writing laser power value as the reference. Then, the characteristic of each velocity and optimum writing laser power values PL1, PL2, PL3 obtained by the OPC are used to obtain ratios of difference values of upper limit values PJ1', PJ2', PJ3' and lower limit values PK1', PK2', PK3' of the power value at which the C1 error value is not more than a reference value ("0" in the shown example) for each velocity from the optimum writing laser power value, to the optimum writing laser power value, that is, to obtain a ratio (%) of an allowed power value from the optimum writing laser power value. For example, an upper allowable range value PJ01 (%) is obtained with respect to a recording velocity V1 by the following equation.

$$PJ01=(PJ1'-PL1)/PL1*100$$

Figure 13B:
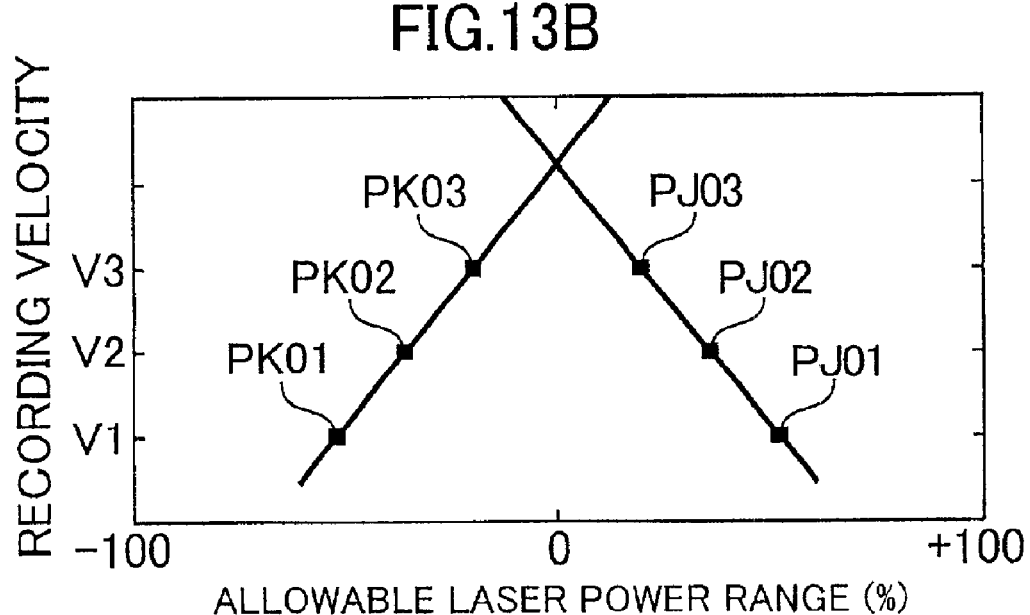
Figure 14:
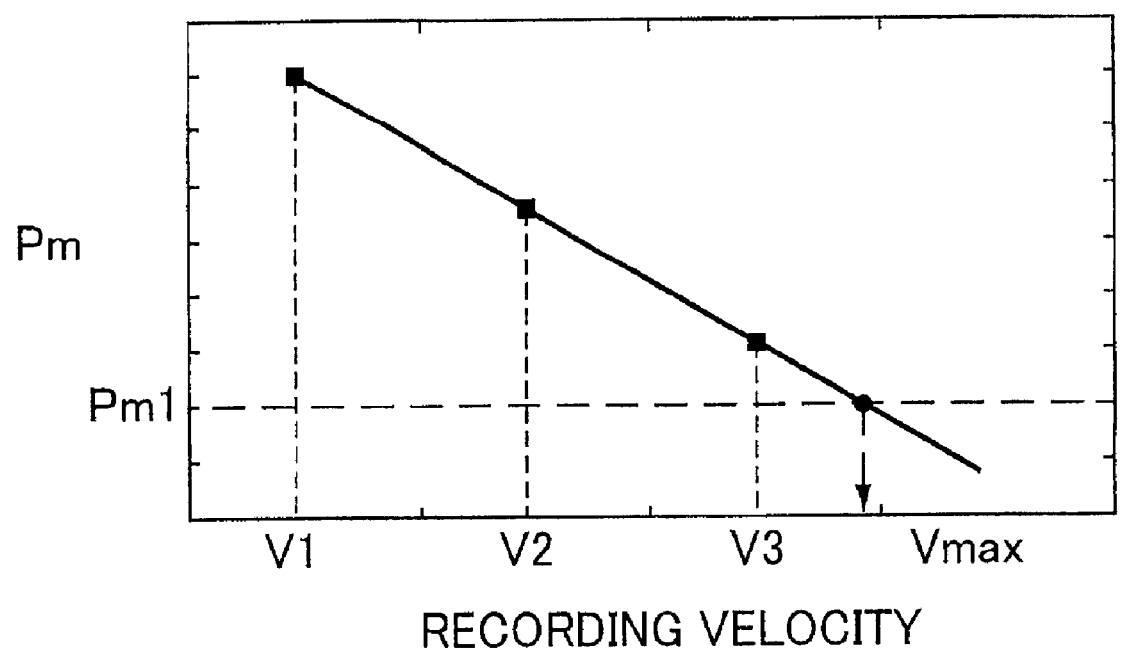
FIG. 14 is an explanatory view of another derivation method of the recording maximum velocity by the controller.

In this manner, as shown in FIG. 13B, allowable upper limit range values PJ01, PJ02, PJ03 and allowable lower limit range values PK01, PK02, PK03 of the writing laser power in the respective recording velocities are obtained. Furthermore, as shown in FIG. 14, a relation between the allowable range of the writing laser power value and the recording velocity is obtained, and a recording velocity at which an allowable range Pm of the writing laser power value indicates a predetermined value Pm1 may be obtained as the maximum recording velocity.

Modification Example 4

Figure 15:
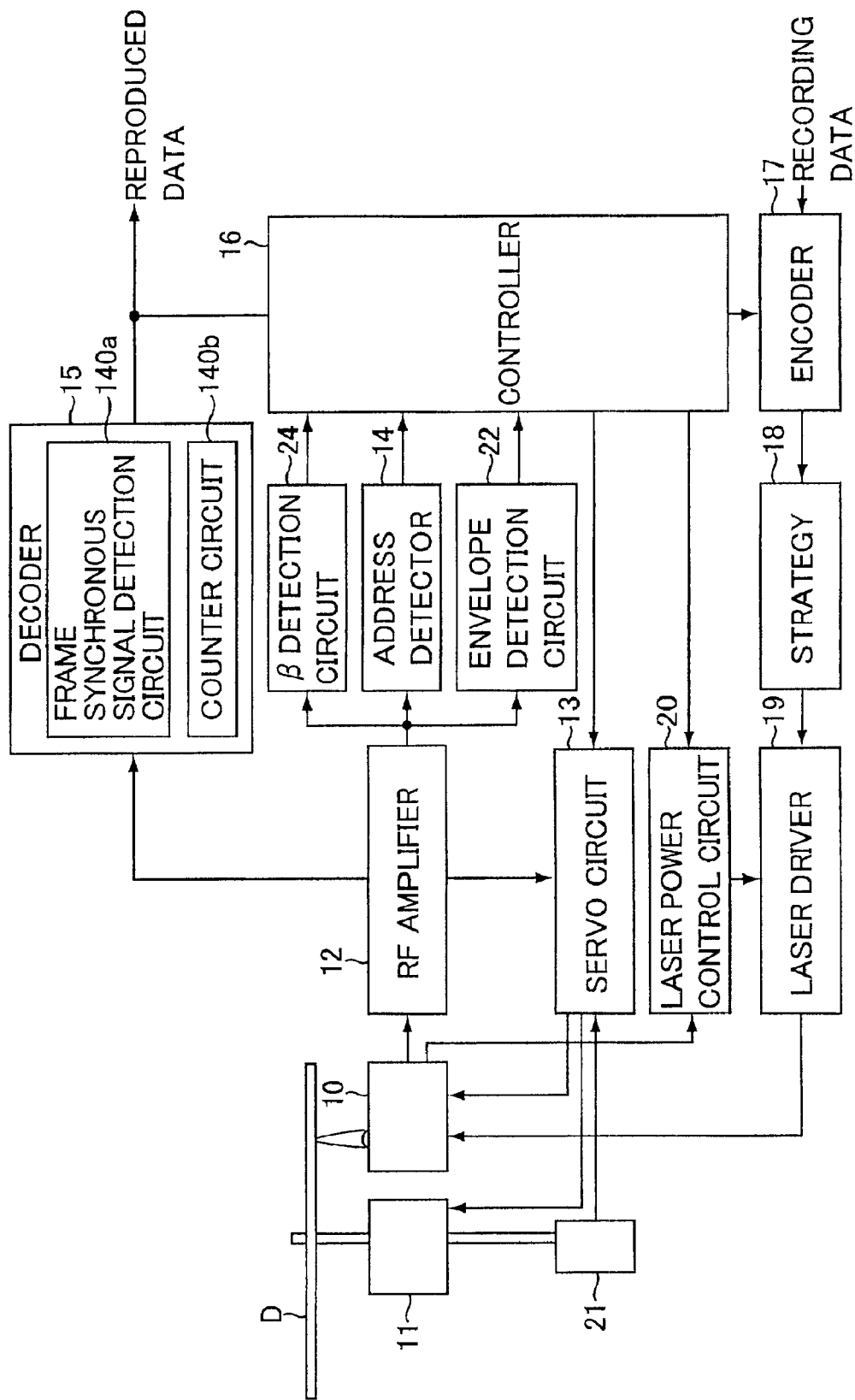
FIG. 15 is a block diagram showing the constitution of another modification example of the optical disc recording/reproducing apparatus.

Furthermore, in the embodiment, the recording velocity is obtained based on the range of the β value in which the C1 error value is smaller than a predetermined value. However, a parameter relating to the recording level is not limited to the C1 error, and other parameters may be used. For example, as shown in FIG. 15, instead of the C1 error detection circuit 23, frame synchronous signal detection and counter circuits 140 are provided. There are provided a frame synchronous signal detection circuit 140a, and a counter circuit 140b for counting a detection frequency of a frame synchronous signal detected by the frame synchronous signal detection circuit 140a instead of the C1 error value. The detection frequency of the frame synchronous signal counted by the counter circuit 140b may be used to obtain the recording velocity. Here, similarly as the aforementioned embodiment, the frame synchronous signal detection circuit 140a and counter circuit 140b EFM-modulate the reproduced signal of the test record area, detects an EFM frame synchronous signal from the obtained signal, counts the detection frequency, and outputs a count result to the controller 16.

Figure 16:
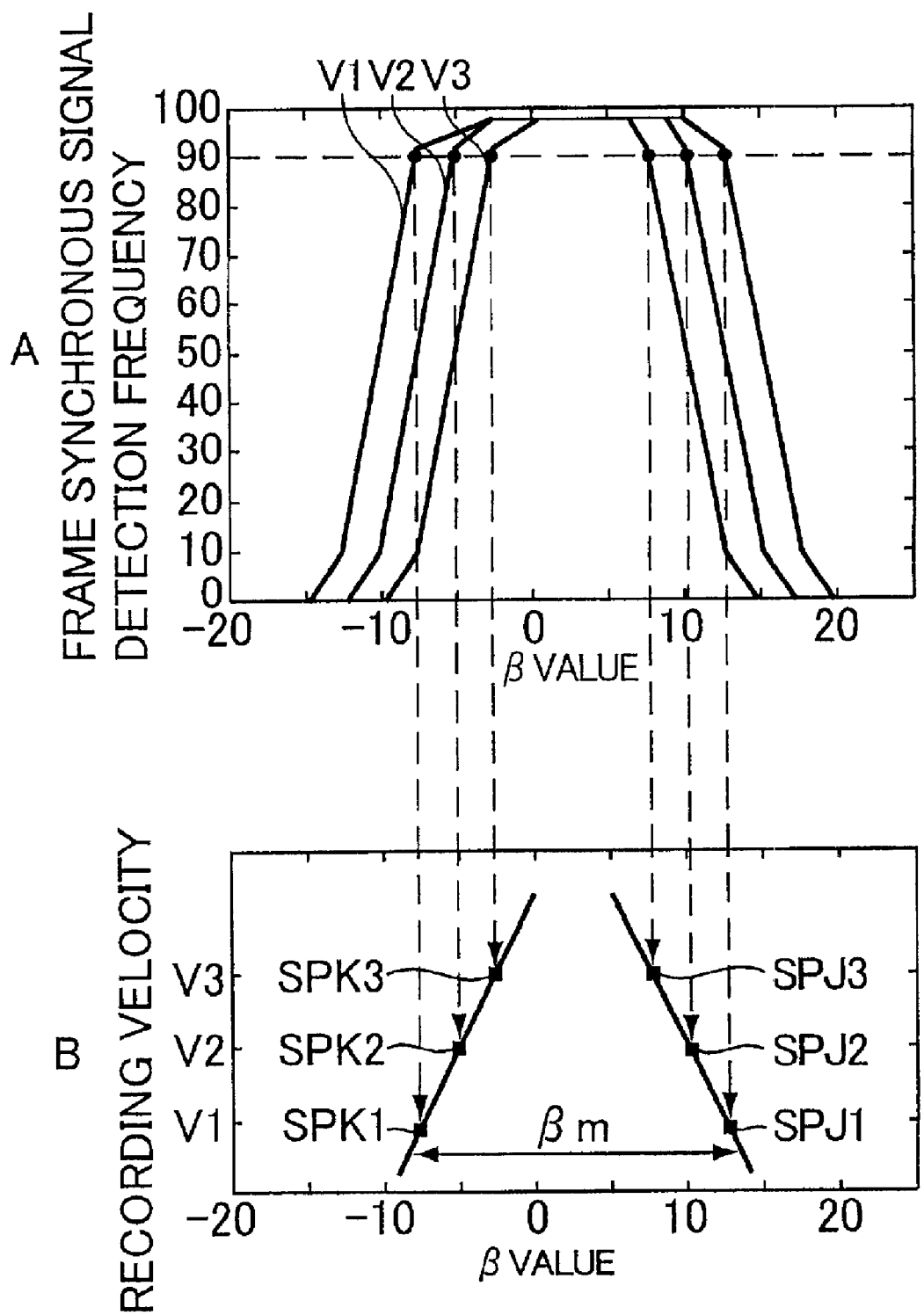
FIG. 16 is an explanatory view of the derivation method of the recording maximum velocity by the controller according to another modification example of the optical disc recording/reproducing apparatus.

A method in which the detection frequency of the frame synchronous signal is used instead of the C1 error value first includes: obtaining a relation between the detection frequency of the frame synchronous signal and the β value for each of the plurality of recording velocities shown in FIG. 16A from the detection frequency of the frame synchronous signal supplied from the detection circuit 140 and the β value supplied from the β detection circuit 24. The method further includes: obtaining upper limit values SPJ1, SPJ2, SPJ3 and lower limit values SPK1, SPK2, SPK3 of the β value for the respective recording velocities (V1, V2, V3) so as to obtain a range of the detection frequency of the frame synchronous signal (90 or more in the shown example) obtained beforehand by the experiment, in which the satisfactory recording level can be maintained as shown in FIG. 16B; and using the function obtained beforehand by the experiment (linear function in the shown example) to obtain a recording velocity-β range characteristic indicating a relation between the recording velocity and the value βm indicating the range of the β value. After the recording velocity-β range characteristic is obtained in this manner, similarly as the recording velocity generating section 205 in the embodiment, the recording maximum velocity may be obtained.

Figure 17:
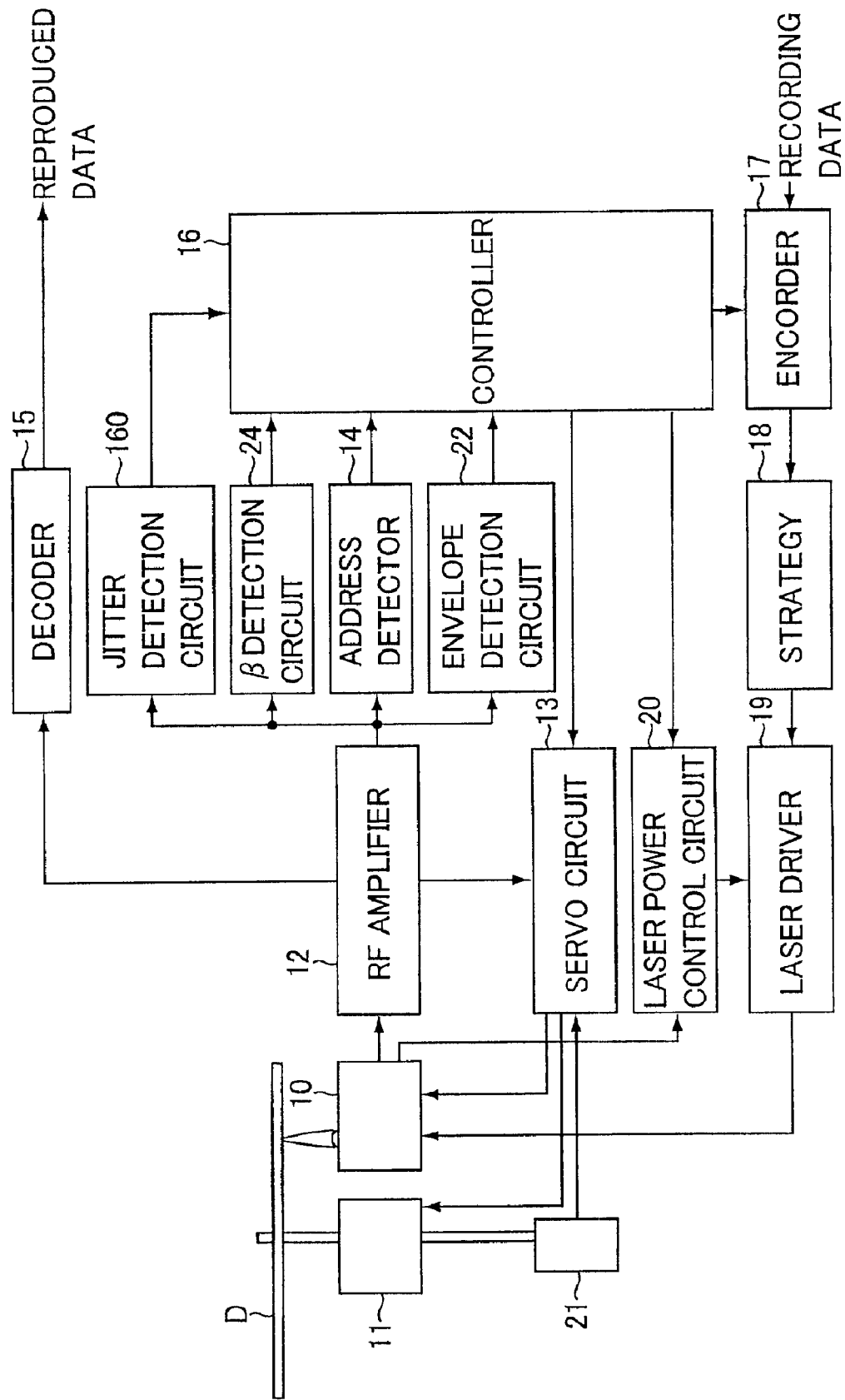
FIG. 17 is a block diagram showing the constitution of still another modification example of the optical disc recording/reproducing apparatus.

Furthermore, as shown in FIG. 17, a jitter detection circuit 160 is provided instead of the C1 error detection circuit 23, and a jitter value detected by the jitter detection circuit 160 may be used instead of the C1 error value to obtain the recording velocity. Here, the jitter detection circuit 160 has an equalizer, slicer, phase-locked loop (PLL) circuit, and jitter measurement unit. An RF signal supplied from the RF amplifier 12 passes through the equalizer, and the signal passed through the equalizer is binarized by the slicer. Moreover, the binarized RF signal is supplied to both the PLL circuit and the jitter measurement unit. In the PLL circuit, a clock is generated from the binarized RF signal, and the generated clock is sent to the jitter measurement unit. The jitter measurement unit measures a jitter as a standard deviation of a recorded bit and reference length deviation from the clock and the binarized RF signal.

Figure 18:
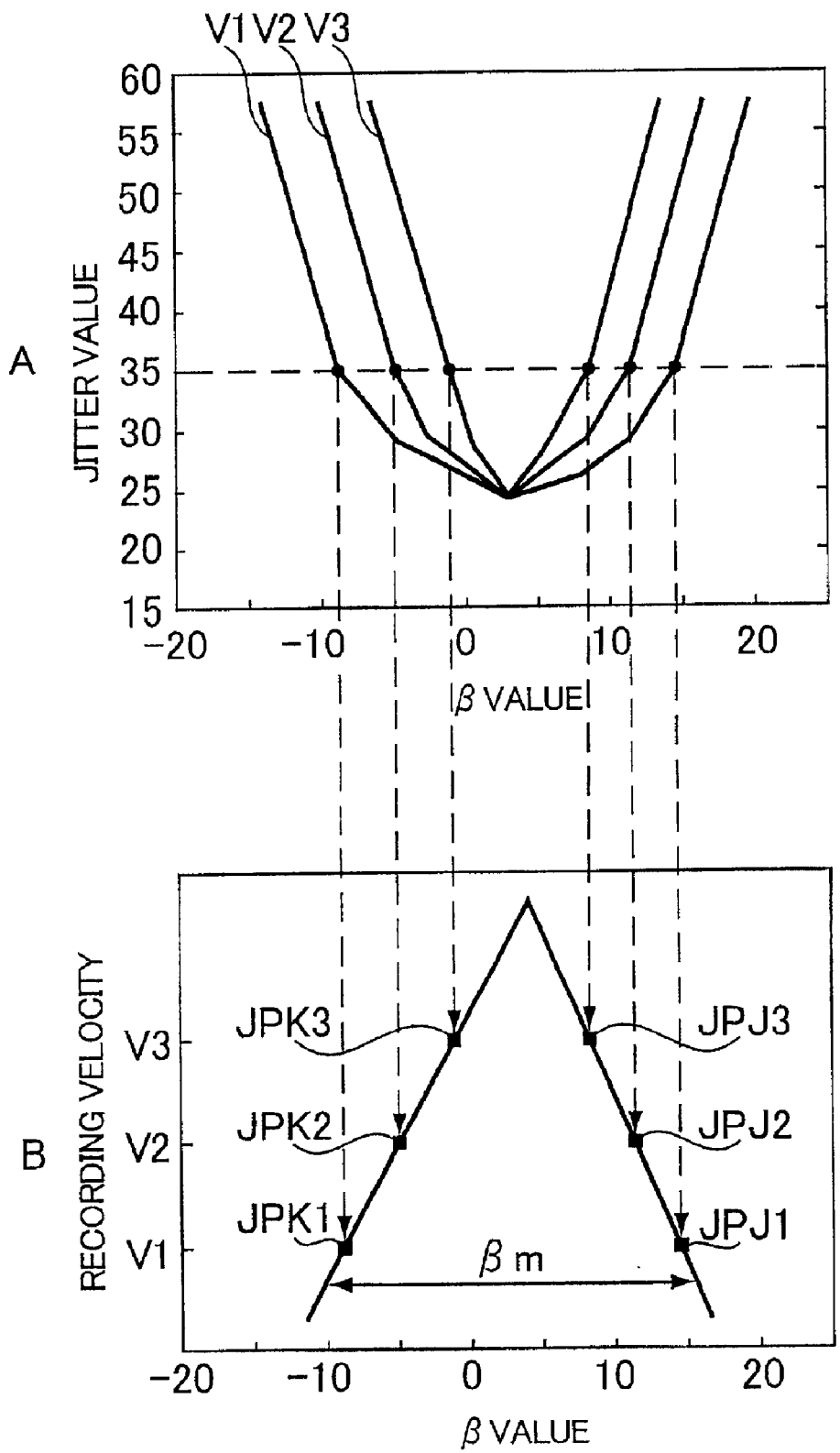
FIG. 18 is an explanatory view of the derivation method of the recording maximum velocity by the controller according to another modification example of the optical disc recording/reproducing apparatus.

A method in which the jitter value is used instead of the C1 error value first includes: obtaining a relation between the jitter value and the $\beta$ value for each of the plurality of recording velocities shown in FIG. 18A from the jitter value supplied from the jitter detection circuit 160 and the $\beta$ value supplied from the $\beta$ detection circuit 24. The method further includes: obtaining upper limit values JPJ1, JPJ2, JPJ3 and lower limit values JPK1, JPK2, JPK3 of the $\beta$ value for the respective recording velocities (V1, V2, V3) so as to obtain a range of the jitter value (the jitter value of 35 or less in the shown example) obtained beforehand by the experiment in which the satisfactory recording level can be maintained as shown in FIG. 18B; and using the function obtained beforehand by the experiment (linear function in the shown example) to obtain the recording velocity-$\beta$ range characteristic indicating the relation between the recording velocity and the value $\beta$m indicating the range of the $\beta$ value. After the recording velocity-$\beta$ range characteristic is obtained in this manner, similarly as the recording velocity generating section 205 in the embodiment, the recording maximum velocity may be obtained.

Figure 19:
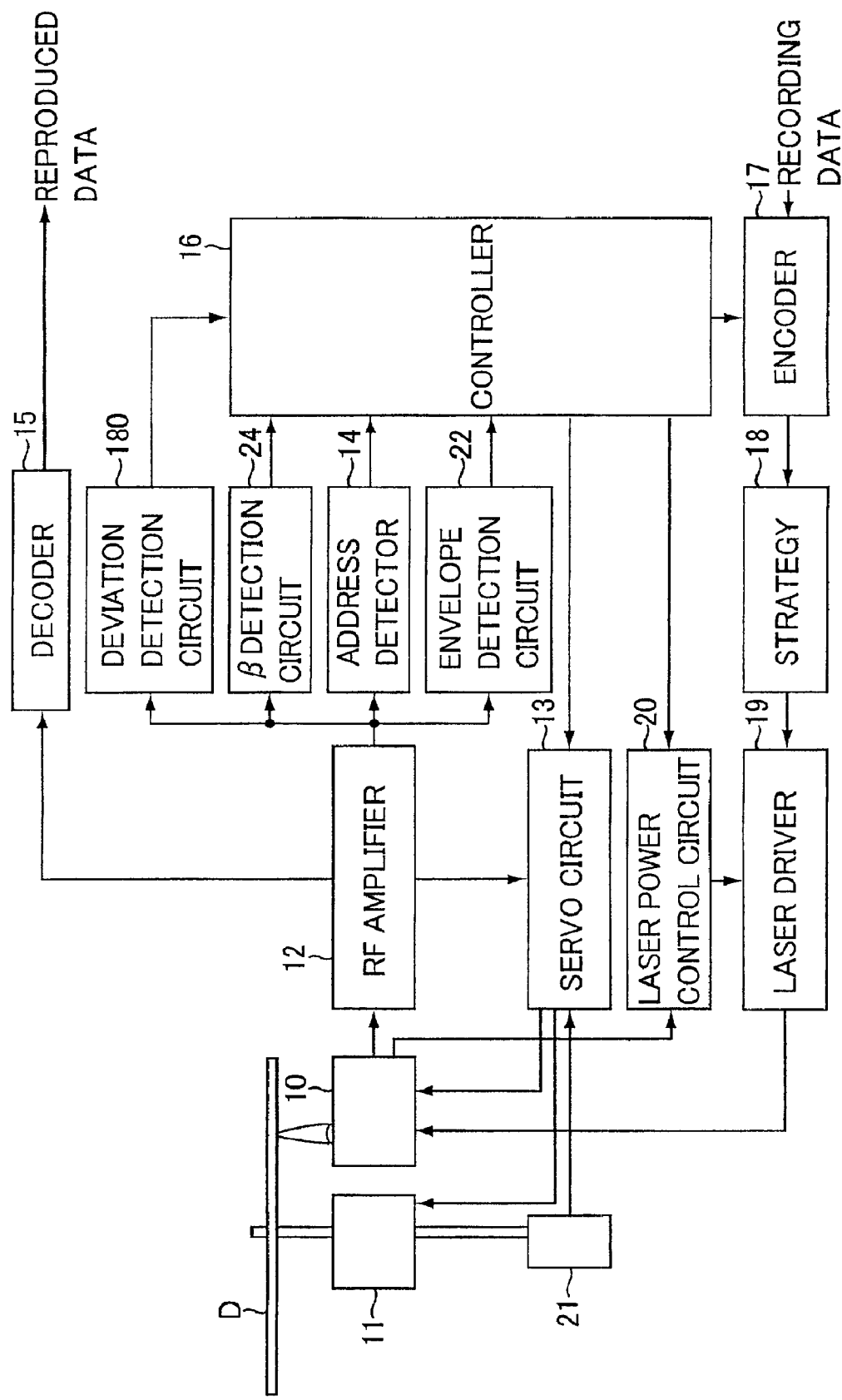
FIG. 19 is a block diagram showing the constitution of a further modification example of the optical disc recording/reproducing apparatus.

Additionally, as shown in FIG. 19, a deviation detection circuit 180 is provided instead of the C1 error detection circuit 23, and a deviation value detected by the deviation detection circuit 180 may be used instead of the C1 error value to obtain the recording velocity. Here, the deviation detection circuit 180 has an equalizer, slicer, and PLL circuit similarly as the jitter detection circuit 160. Furthermore, instead of the jitter measurement unit, there is provided a deviation measurement unit for detecting deviation (recording bit and reference length deviations) from the clock supplied from the PLL circuit and binary RF satisfactory supplied from the slicer.

Figure 20:
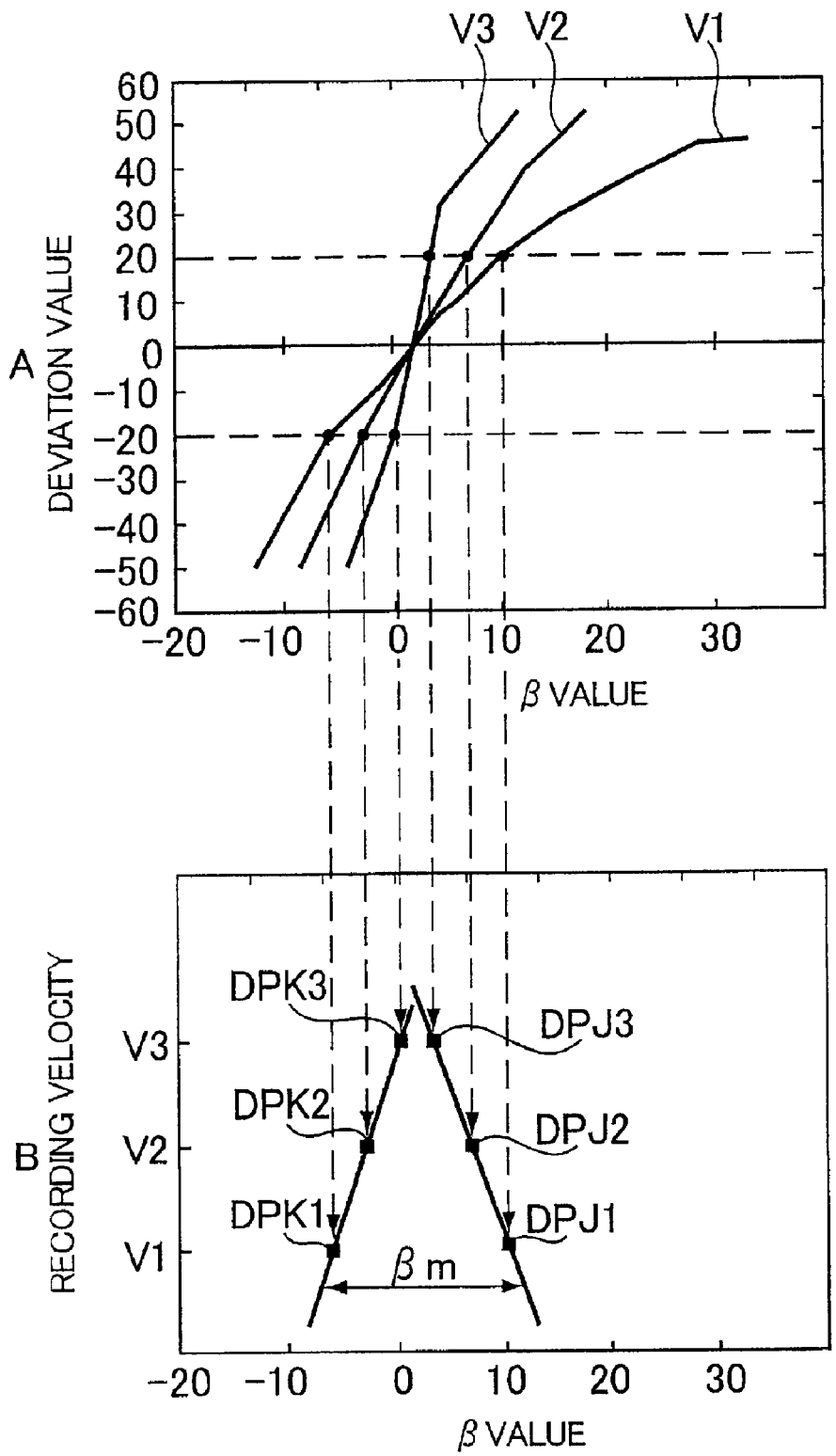
FIG. 20 is an explanatory view of the derivation method of the recording maximum velocity by the controller according to the further modification example of the optical disc recording/reproducing apparatus.

A method in which the deviation value is used instead of the C1 error value first includes: obtaining a relation between the deviation value and the $\beta$ value for each of the plurality of recording velocities shown in FIG. 20A from the deviation value supplied from the deviation detection circuit 180 and the $\beta$ value supplied from the $\beta$ detection circuit 24. The method further includes: obtaining upper limit values DPJ1, DPJ2, DPJ3 and lower limit values DPK1, DPK2, DPK3 of the $\beta$ value for the respective recording velocities (V1, V2, V3) so as to obtain a range of the deviation value ($-20 \leq$ deviation value $\leq 20$ in the shown example) obtained beforehand by the experiment in which the satisfactory recording level can be maintained as shown in FIG. 20B; and using the function obtained beforehand by the experiment (linear function in the shown example) to obtain the recording velocity-$\beta$ range characteristic indicating the relation between the recording velocity and the value $\beta$m indicating the range of the $\beta$ value. After the recording velocity-$\beta$ range characteristic is obtained in this manner, similarly as the recording velocity generating section 205 in the embodiment, the recording maximum velocity may be obtained.

Figure 21A:
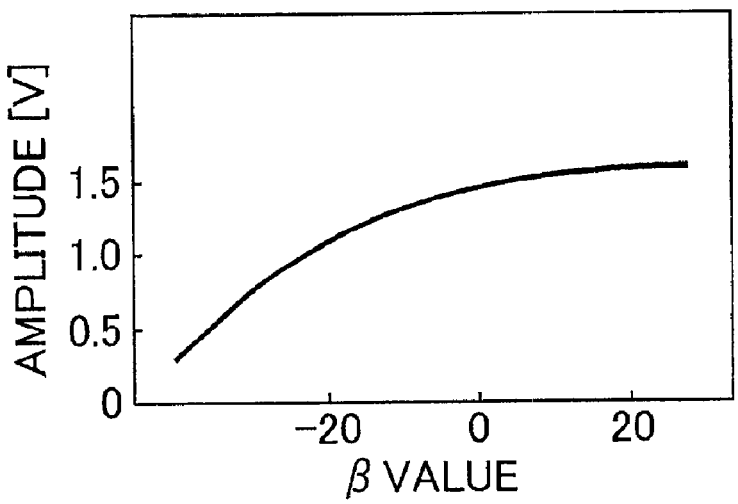
FIGS. 21A through 21C are a graph showing a relation between a parameter relating to a recording level which can be used in deriving the recording velocity by the optical disc recording/reproducing apparatus, and a β value.

Additionally, instead of the C1 error value, parameters such as an amplitude of the RF signal supplied from the RF amplifier 12 during reproduction of the test record area, modulation degree, and reflectance may be used to obtain the recording velocity. Here, a relation between the amplitude value of the RF signal and the $\beta$ value has a characteristic such that the amplitude value rises with a rise of the $\beta$ value, and the amplitude value rises to some degree and becomes saturated as shown in FIG. 21A. The characteristic is obtained for each of the plurality of recording velocities, and similarly as the aforementioned embodiment, the upper and lower limit values of the $\beta$ value within the range of the amplitude of the RF signal obtained beforehand by the experiment are obtained for each of the recording velocities. Thereafter, similarly as the aforementioned embodiment, the recording velocity can be obtained.

Figure 21B:
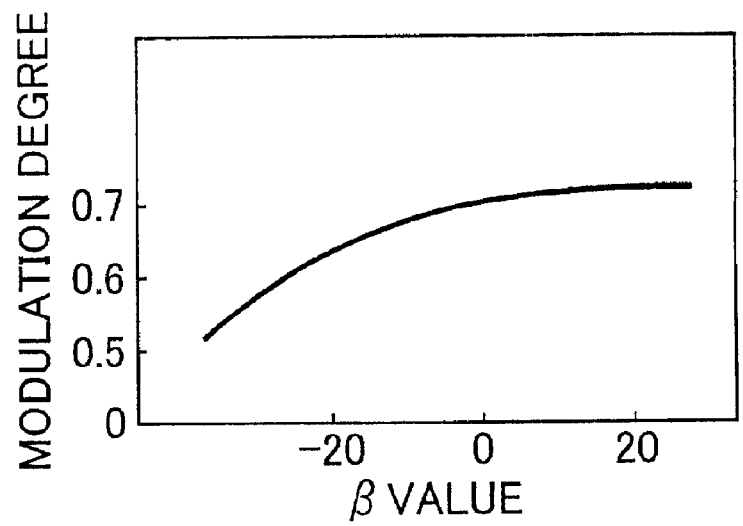

Furthermore, a relation between the modulation degree and the $\beta$ value has a characteristic similar to that of the amplitude of the RF signal as shown in FIG. 21B. The characteristic is obtained for each of the plurality of recording velocities, and similarly as the aforementioned embodiment, the upper and lower limit values of the $\beta$ value within the range of the modulation degree obtained beforehand by the experiment are obtained for each of the recording velocities. Thereafter, similarly as the aforementioned embodiment, the recording velocity can be obtained. Additionally, assuming that a maximum value of the RF signal is Imax, and a minimum value thereof is Imin, the modulation degree can be obtained by the modulation degree=(Imax−Imin)/Imax.

Figure 21C:
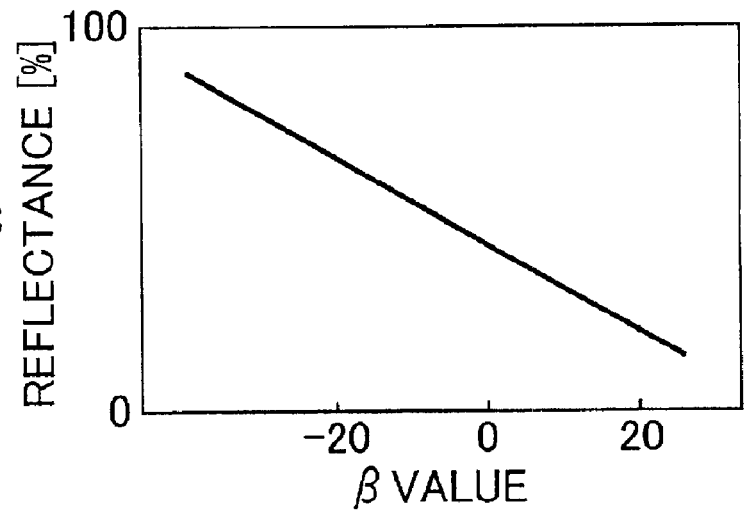

Moreover, a relation between the reflectance and the $\beta$ value substantially has a characteristic of a linear function, in which the reflectance drops with an increase of the $\beta$ value as shown in FIG. 21C. The characteristic is obtained for each of the plurality of recording velocities, and similarly as the aforementioned embodiment, the upper and lower limit values of the $\beta$ value within the range of the reflectance obtained beforehand by the experiment are obtained for each of the recording velocities. Thereafter, similarly as the aforementioned embodiment, the recording velocity can be obtained. Additionally, the reflectance can be obtained by passing the RF signal through a low-pass filter and averaging values.

Moreover, in the above examples, the relation between each parameter used instead of the C1 error value and the $\beta$ value is obtained, and then the recording velocity is obtained. However, as described in the modification examples, the relation between each parameter and the writing laser power value may be obtained in order to obtain the recording velocity.

Furthermore, a plurality of parameters (e.g., C1 error value and jitter value) may be used to obtain the respective recordable velocities. For example, when the maximum recording velocity is obtained, a lower velocity in the recording velocities obtained using both parameters is employed as the maximum recording velocity. When the minimum recording velocity is obtained, a higher velocity in the recording velocities obtained using both the parameters is employed as the minimum recording velocity.

Modification Example 5

Furthermore, in the aforementioned embodiments, an example in which the CD-R is used as the optical disc D has been described. However, the present invention can also be applied to the recording with respect to CD-RW, DVD-R, DVD-random access memory (DVD-RAM), and the like.

Modification Example 6

Additionally, the controller 16 for executing the recording processing including the determination processing of the recording velocity may be constituted of an exclusive-use hardware circuit. Alternatively, when the controller is constituted of a central processing unit (CPU), or the like, the processing may be realized by software by executing program stored in storage means such as a read only memory (ROM). When the processing is performed by software in this manner, various recording mediums such as CD-ROM and floppy disc with the program for allowing a computer to realize the processing recorded therein may be supplied to the user, or the program may be supplied to the user via transmission mediums such as Internet.

As described above, according to the first aspect of the present invention, during the recording with respect to a certain optical disc, the range of the recording velocity with few recording errors can be determined.

B-1. Construction of the Second Embodiment

The second embodiment of the invention has basically the same construction as the first embodiment. Thus, referring again to FIG. 1, description is given for a constitution of an optical disc recording/reproducing apparatus according to the second embodiment of the present invention. As shown in FIG. 1, the optical disc recording/reproducing apparatus includes an optical pickup 10, spindle motor 11, RF amplifier 12, servo circuit 13, address detector circuit 14, decoder 15, controller 16, encoder 17, strategy circuit 18, laser driver 19, laser power control circuit 20, frequency generator 21, envelope detection circuit 22, C1 error detection circuit 23, and β detection circuit 24.

The spindle motor 11 is a motor for rotating/driving an optical disc (CD-R herein) D as an object in which data is recorded. The optimum pickup 10 has a laser diode, an optical system such as a lens and mirror, and a returned light receiving element. The optical pickup irradiates the optical disc D with a laser beam during recording and reproducing, receives a returned light from the optical disc D, and outputs an RF signal subjected to eight to fourteen modulation (EFM) as a light receiving signal to the RF amplifier 12. Moreover, the optical pickup 10 has a monitor diode, a current is generated in the monitor diode by the returned light of the optical disc D, and the current is supplied to the laser power control circuit 20.

The RF amplifier 12 amplifies the RF signal supplied from the optical pickup 10 and subjected to the EFM modulation, and outputs the amplified RF signal to the servo circuit 13, address detector circuit 14, envelope detection circuit 22, β detection circuit 24, and decoder 15. The decoder 15 EFM-demodulates the EFM-modulated RF signal supplied from the RF amplifier 12 and generates reproduced data during reproducing.

On the other hand, during recording, the decoder 15 EFM-demodulates the RF signal supplied from the RF amplifier 12 during reproduction of a test record area, the C1 error detection circuit 23 detects a C1 error based on the demodulated signal, and outputs the error to the controller. The C1 error detection circuit 23 subjects the EFM demodulated signal to error correction using an error correction code called a cross interleaved read Solomon code (CIRC), and detects the number of frames in which the first error correction cannot be performed in one sub code frame (98 EFM frames), that is, a frequency of the C1 error.

The optical disc recording/reproducing apparatus according to the second embodiment of the present invention is constituted to perform a test recording in a predetermined area (see FIG. 2) on an inner peripheral side of the optical disc D at a recording velocity set by a user prior to a regular recording, and obtain the recording velocity for performing a satisfactory recording with respect to the optical disc D based on a reproduction result of the test record area, when the recording is performed as described above. In one test recording by the optical disc recording/reproducing apparatus, a writing laser power value is changed in 15 stages, an EFM signal for one sub code frame per one writing laser power value is recorded, and the EFM signal for 15 frames in total is recorded.

Here, the area for performing the test recording of the optical disc D (CD-R) will be described again with reference to FIG. 2. An area of the optical disc D having a diameter of 46 to 50 mm is prepared as a leadin area 114, and a program area 118 and residual area 120 for recording data are prepared on an outer peripheral side of the leadin area. On the other hand, an inner peripheral side power calibration area (PCA) 112. The inner peripheral side PCA area 112 includes a test area 112a, and a count area 112b. The test area 112a is subjected to the test recording prior to a regular recording processing. Here, an area in which a large number of test recordings can be performed is prepared as the test area 112a, and an EFM signal indicating a portion of the test area 112a in which the recording is ended at an end of the test recording is recorded in the count area 112b. Therefore, when the optical disc D is subjected to the test recording, the EFM signal of the count area 112b is read. Then, a position of the test area 112a from which the test recording is to be performed is seen. In the optical disc recording/reproducing apparatus according to the present embodiment, the test area 112 is subjected to the test recording prior to the regular recording.

Turning back to FIG. 1, the address detector circuit 14 extracts a wobble signal component from the EFM signal supplied from the RF amplifier 12, decodes information indicating time information (address information) of each position included in the wobble signal component, identification information (disc ID) for identifying the disc, and disc types such as disc dyestuff, and outputs the information to the controller 16.

The β detection circuit 24 calculates a β (asymmetry) value as a parameter relating to a reproduced signal level from the EFM modulated RF signal supplied from the RF amplifier 12 during reproduction of the test record region, and outputs a calculation result to the controller 16. The β value is determined by $(a+b)/(a-b)$ in which character a denotes a peak level (sign is +) of a signal waveform subjected to the EFM modulation, and b denotes a bottom level (sign is −).

The envelope detection circuit 22 detects an envelope of the EFM signal of the count area 112b of the optical disc D in order to detect the portion of the predetermined test area of the optical disc D from which the test recording is started before performing the test recording.

The servo circuit 13 performs a rotation control of the spindle motor 11 and a focus control, tracking control, and feeding control of the optical pickup 10. In the optical disc recording/reproducing apparatus of the present embodiment, the recording is performed in a constant linear velocity (CLV) method for driving the optical disc D at a recording linear velocity set by the user. The servo circuit 13 performs a CLV control for driving the spindle motor 11 at the set linear velocity in accordance with a control signal indicating the set velocity supplied from the controller 16. Here, in the CLV control by the servo circuit 13, the spindle motor 11 is controlled so as to obtain a linear velocity magnification such that a wobble signal of an EFM modulated signal supplied from the RF amplifier 12.

The encoder 17 EFM-modulates supplied recording data, and outputs the data to the strategy circuit 18. The strategy circuit 18 performs a time axis correction processing, or the like with respect to the EFM signal supplied from the encoder 17, and outputs the signal to the laser driver 19. The laser driver 19 drives the laser diode of the optical pickup 10 in accordance with the signal modulated with the recording data supplied from the strategy circuit 18, and the control of the laser power control circuit 20.

The laser power control circuit 20 controls the laser power emitted from the laser diode of the optical pickup 10. Concretely, the laser power control circuit 20 controls the laser driver 19 based on a current value supplied from the monitor diode of the optical pickup 10 and information indicating an optimum target value of the laser power supplied from the controller 16 so that the laser beam having the optimum laser power is emitted from the optical pickup 10.

First, the controller 16 controls respective apparatus components so that the aforementioned test recording is performed with respect to a predetermined area of the optical disc D set in the optical disc recording/reproducing apparatus prior to a regular recording as described above. Furthermore, the controller 16 determines an optimum writing laser power value for performing the recording with respect to the optical disc D at the recording velocity set by the user from a signal obtained during reproducing of the test record area based on the $\beta$ value detected by the $\beta$ detection circuit 24, a count value (hereinafter referred to as a C1 error value) of a detection frequency of the C1 error detected by the C1 error detection circuit 23, and the like, and controls the laser power control circuit 20 so that a laser beam having a determined optimum laser power value is emitted from the optical pickup 10 during the regular recording. A functional constitution of the controller 16 which performs a processing for obtaining the optimum writing laser power value is shown in FIG. 22.

Figure 22:
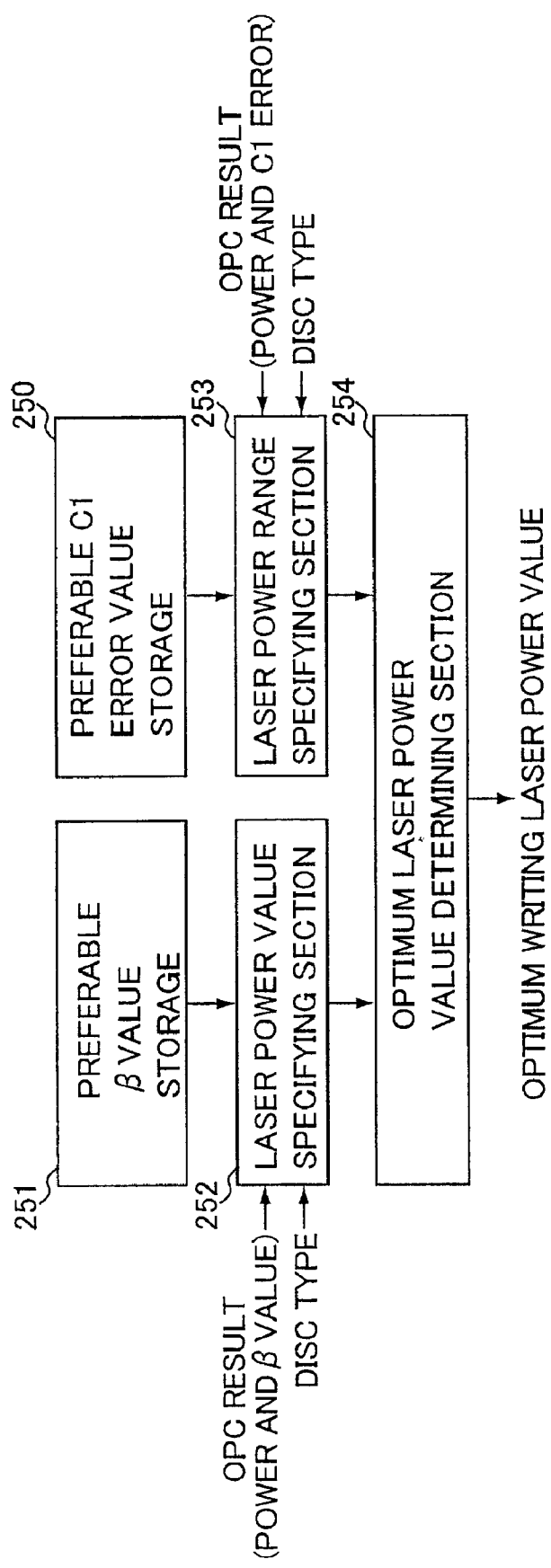
FIG. 22 is a block diagram showing a functional constitution of a controller as a constituting element of a second embodiment of the optical disc recording/reproducing apparatus.

As shown in FIG. 22, the controller 16 has a C1 error preferable value information storage 250, $\beta$ preferable value information storage 251, laser power value specifying section 252, laser power range specifying section 253, and optimum laser power value determining section 254.

The laser power value specifying section 252 obtains a recording powered characteristic indicating a relation between the writing laser power value and the $\beta$ value from a result (a plurality of writing laser power values and $\beta$ values corresponding to the respective laser power values) obtained by the OPC prior to the regular recording. The laser power value specifying section 252 specifies the writing laser power value based on the recording power-$\beta$ characteristic, $\beta$ preferable value information stored in the $\beta$ preferable value information storage 251, and disc type information supplied from the address detector circuit 14. As shown in FIG. 23, in the $\beta$ preferable value storage 251, $\beta$ preferable value information indicating the $\beta$ value for performing an optimal recording is stored for each type (manufacturing maker, dyestuff, and the like) of the optical disc D, and $\beta$ value="0" is stored as the $\beta$ value preferable value information with respect to a disc of type A in the shown example. Here, the information stored in the $\beta$ preferable value storage 251 is a value obtained for each type of the disc beforehand by an experiment. Additionally, a preferable $\beta$ value may be stored not only for each type of the disc but also for each recording velocity (one-time velocity, four-times velocity, eight-times velocity) in the $\beta$ preferable value storage 251.

Figures 25, 26:
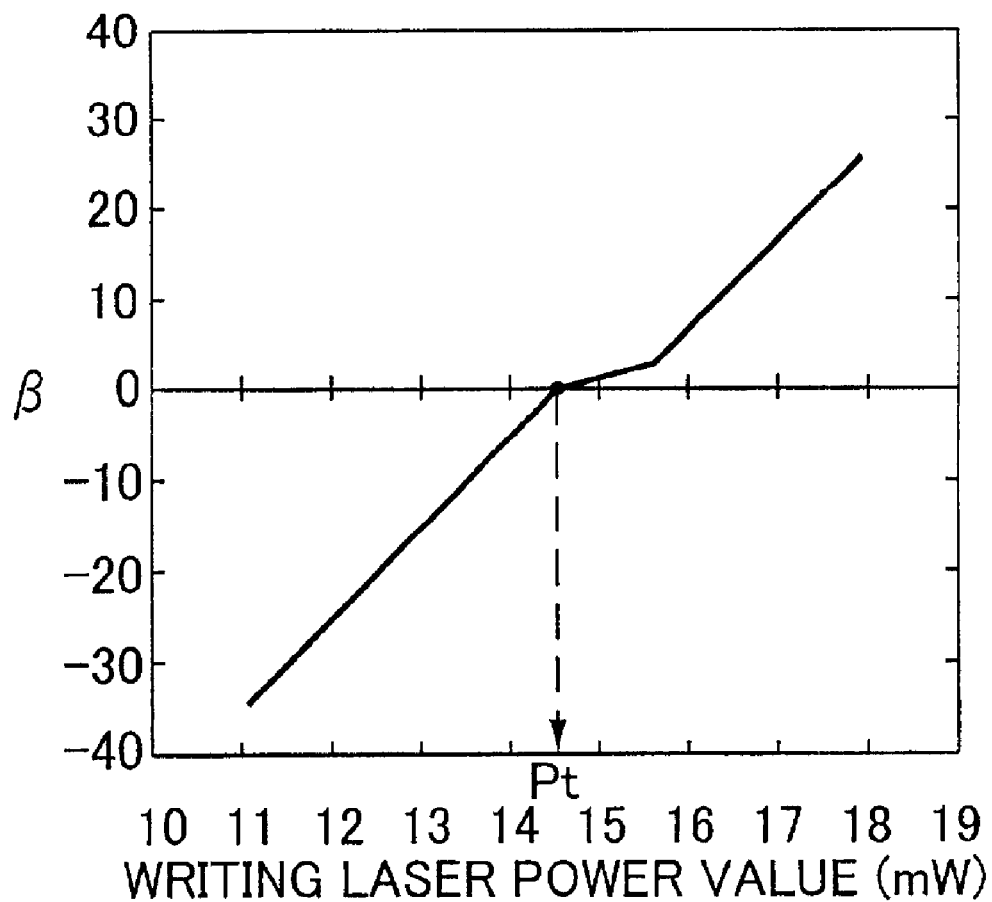
FIG. 25 is an explanatory view of a processing for determining an optimum writing laser power value from a relation between the writing laser power value and the β value.
FIG. 26 is an explanatory view of a stored content of a C1 error preferable value information storage as the constituting element of the controller.

For example, when an OPC result ($\beta$ values and C1 error values corresponding to 15 types of writing laser power values) is obtained as shown in FIG. 24, the laser power value specifying section 252 obtains a power-$\beta$ characteristic indicating a relation between the writing laser power value and the $\beta$ value shown in FIG. 25 from the writing laser power values and $\beta$ values of the OPC result. Moreover, the laser power value specifying section 252 obtains the $\beta$ preferable value information corresponding to disc type information supplied from the address detector circuit 14 from the $\beta$ preferable value information corresponding to a large number of disc types stored in the $\beta$ preferable value storage 251. Additionally, when the preferable $\beta$ value is stored for each recording velocity (one-time velocity, four-times velocity, eight-times velocity, . . . ) in the $\beta$ preferable value storage 251, the $\beta$ preferable value information corresponding to the set recording velocity may be obtained. Moreover, the laser power value specifying section 252 refers to the power-$\beta$ characteristic (see FIG. 25) obtained based on the OPC result, and specifies a writing laser power value Pt corresponding to the $\beta$ value indicated by the obtained $\beta$ preferable value information.

The laser power range specifying section 253 obtains a writing power-C1 error characteristic indicating a relation between the writing laser power value and the C1 error value from the result (a plurality of writing laser power values and C1 error values corresponding to the respective laser power values) obtained by the OPC prior to the regular recording. The laser power range specifying section 253 specifies possible upper and lower limit values of the writing laser power, that is, a range of the possible values of the writing laser power based on the writing power-C1 error characteristic, C1 error preferable value information stored in the C1 error preferable value storage 250, and disc type information supplied from the address detector circuit 14. As shown in FIG. 26, in the C1 error preferable value storage 250, C1 error preferable value information indicating a possible range of the C1 error values for performing the optimal recording is stored for each type (manufacturing maker, dyestuff, and the like) of the optical disc D, and C1 error value="0 to 10" is stored as the C1 error preferable value information with respect to the disc of type A in the shown example. Here, the information stored in the C1 error preferable value storage 250 is a value obtained for each type of the disc beforehand by the experiment. Additionally, the information indicating the possible range of preferable C1 error values may be stored not only for each type of the disc but also for each recording velocity (one-time velocity, four-times velocity, eight-times velocity, . . . ) in the C1 error preferable value storage 250.

Figure 27:
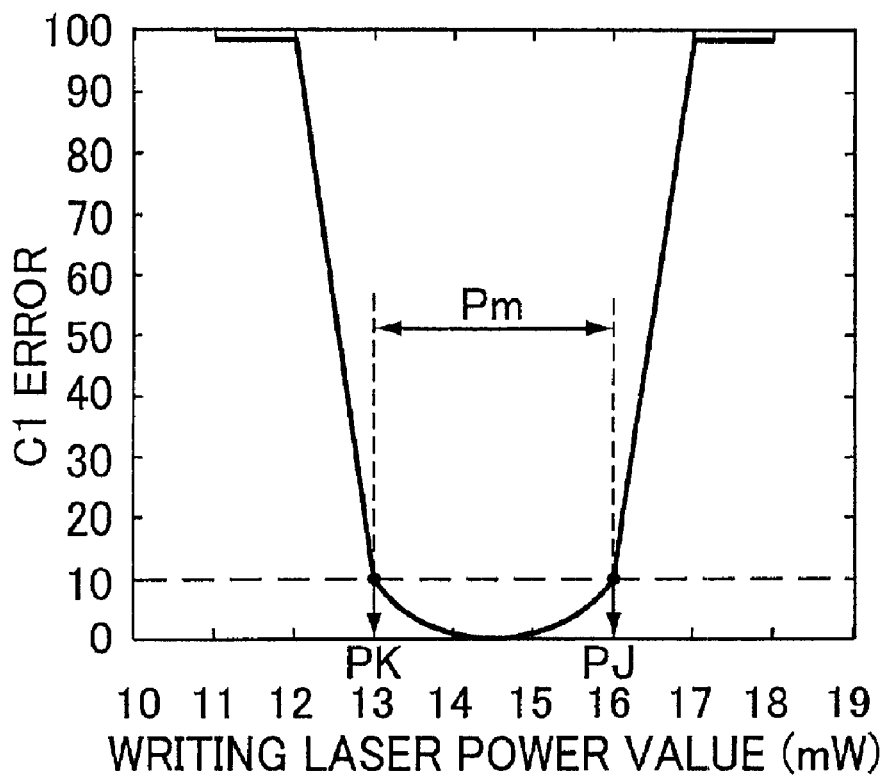
FIG. 27 is an explanatory view of the processing for determining the optimum writing laser power value from the relation between the writing laser power value and the C1 error value.

For example, when the OPC result shown in FIG. 24 is obtained, the laser power range specifying section 253 obtains the power-C1 error characteristic indicating the relation between the writing laser power value and the C1 error value as shown in FIG. 27 from the writing laser power values and C1 error values of the OPC result. Moreover, the laser power range specifying section 253 obtains the C1 error preferable value information corresponding to the type information of the disc supplied from the address detector circuit 14 from the C1 error preferable value information corresponding to a large number of disc types stored in the C1 error preferable value storage 250. Additionally, when the preferable range of C1 error values is stored for each recording velocity (one-time velocity, four-times velocity, eight-times velocity, . . . ) in the C1 error preferable value storage 250, the C1 error preferable value information corresponding to the set recording velocity may be obtained. Moreover, the laser power range specifying section 253 refers to the power-C1 error characteristic (see FIG. 27) obtained based on the OPC result, obtains an upper limit value PJ (16 mW in the shown example) and lower limit value PK (13 mW in the shown example) of the writing laser power for setting the C1 error value within the range of C1 error values indicated by the obtained C1 error preferable value information, and specifies a possible range Pm (13 to 16 mW of the writing laser power.

The optimal laser power value determining section 254 determines an optimal writing laser power value based on a writing laser power value Pt specified by the laser power value specifying section 252, and an available range Pm of the writing laser power specified by the laser power range specifying section 253 as described above. Concretely, the optimal laser power value determining section 254 judges whether or not the writing laser power value Pt specified by the laser power value specifying section 252 is within the available range Pm of the writing laser power values specified by the laser power range specifying section 253. When the writing laser power value Pt is judged to be in the range Pm, the writing laser power value Pt is determined as the optimal writing laser power value. On the other hand, when the writing laser power value Pt is not in the range Pm, the OPC is performed again, and the processing for determining the optimal writing laser power value based on the OPC result may be performed similarly as described above. Moreover, when the writing laser power value Pt is not in the range Pm, the determining method includes: determining an average value of the writing laser power value Pt and the upper limit value PJ or the lower limit value PK (a value closer to the writing laser power value Pt) as the optimal writing laser power value. Then, the optimal writing laser power value can be determined considering not only the β value and but also the C1 error value.

The controller 16 supplies the control signal indicating the optimal writing laser power value obtained from the OPC result as described above to the laser power control circuit 20 shown in FIG. 1, and the laser power control circuit 20 controls the laser driver 19 so that the power value of a recording laser beam emitted to the optical disc D from the optical pickup 10 agrees with the optimal writing laser power value.

B-2. Operation

Figure 28:
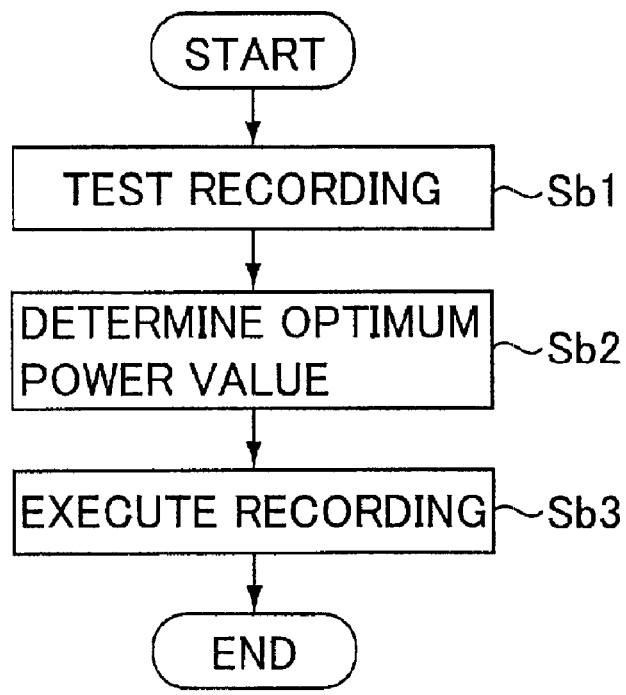
FIG. 28 is a flowchart showing a processing executed by the controller at a recording time by the optical disc recording/reproducing apparatus.

The constitution of the optical disc recording/reproducing apparatus according to the second embodiment of the present invention has been described above. An operation of a recording time by the optical disc recording/reproducing apparatus constituted as described above will be described with reference to a flowchart of a processing executed by the controller 16 shown in FIG. 28 in accordance with a program stored in ROM.

First, the user sets the optical disc D in the optical disc recording/reproducing apparatus, and instructs a recording start in a certain recording velocity. Then, the controller 16 controls the respective apparatus components in order to perform the test recording in the test area 112*a* (see FIG. 2) of the optical disc D set to execute the OPC (step Sb1). Concretely, the signal for the test recording is sent to the encoder 17, and the laser power control circuit 20 is controlled so that the writing laser power value is changed in 15 stages. The respective apparatus components are controlled in this manner, the EFM signal for one sub code frame is recorded per one writing laser power value, and the test recording for recording the EFM signal for 15 frames in total is executed.

When the respective apparatus components are controlled so as to execute the test recording, the controller 16 determines the optimal writing laser power value as described above based on the OPC result (see FIG. 24) obtained from the reproduced signal of the test record area (step Sb2). Thereafter, the controller 16 controls the laser power control circuit 20, servo circuit 13, and the like so that the recording is performed at the recording velocity set by the user and the optimal laser power value determined as described above, and executes a recording processing with respect to the optical disc D (step Sb3).

In the present embodiment, the test recording is performed prior to the regular recording, the optimal writing laser power value is determined based on the β value and C1 error value indicating the level of the recording state obtained from the reproduced signal of the test recording, and the recording can be performed with the determined writing laser power value. That is, the optimal writing laser power value is determined considering only the β value in the conventional OPC. However, according to the present embodiment, the optimal writing laser power value can be determined considering not only the β value but also the C1 error value. Therefore, as compared with the power determining method in which only the β value is considered, deterioration of the recording level because of individual differences (e.g., warp, distortion, dyestuff unevenness, and the like) of products of the optical disc D can be reduced. For example, the recording is performed with the writing laser power value corresponding to a β significant point with respect to the optical disc (see FIG. 48) having a characteristic with a β value significant point at which the β value significantly changes. Then, a satisfactory recording state level cannot sometimes be obtained. However, in the present embodiment, the optimal writing laser power value is determined considering not only the β value but also other parameters concerning the recording level. Therefore, the recording level arising from the β significant point can be inhibited from being deteriorated.

B-3. Modification Examples

Additionally, the second embodiment can variously be modified as follows.

B-3-1. Modification Example 1

The method of the second embodiment comprises: measuring the β values and C1 error values corresponding to a plurality of writing laser power values from the reproduced signal of the test record area; and using these parameters to determine the optimal writing laser power value. However, the method may comprise: obtaining other types of parameters relating to the quality level of the recording state from the reproduced signal of the test record area; and using the obtained parameter to determine the optimal writing laser power value.

For example, as shown in FIG. 15, the frame synchronous signal detection circuit 140*a* and counter circuit 140*b* are provided instead of the C1 error detection circuit 23 in the second embodiment. In addition to the β value, a frame synchronous signal detection frequency detected by the frame synchronous signal detection circuit 140*a* and counter circuit 140*b* may be used to determine the optimal writing laser power value. Here, similarly as the second embodiment, the frame synchronous signal detection circuit 140*a* and counter circuit 140*b* EFM-demodulate a reproduction RF signal of the test record area, detects an EFM frame synchronous signal from the obtained signal, counts a detection frequency, and outputs the frequency to the controller 16.

When the detection frequency of the frame synchronous signal is used instead of the C1 error value, that is, when the β value and the detection frequency of the frame synchronous signal are used to determine the optimal writing laser power value, first the writing power-β characteristic (see FIG. 25) indicating the relation between the writing laser power value and the β value is obtained from the detection frequency of the frame synchronous signal supplied from the frame synchronous signal detection circuit 140*a* and counter circuit 140*b* and the β value supplied from the β detection circuit 24 similarly as the second embodiment. Moreover, a writing power-frame synchronous signal detection frequency characteristic indicating a relation between the writing laser power value and the frame synchronous signal detection frequency is obtained as shown in FIG. 29.

Figure 29:
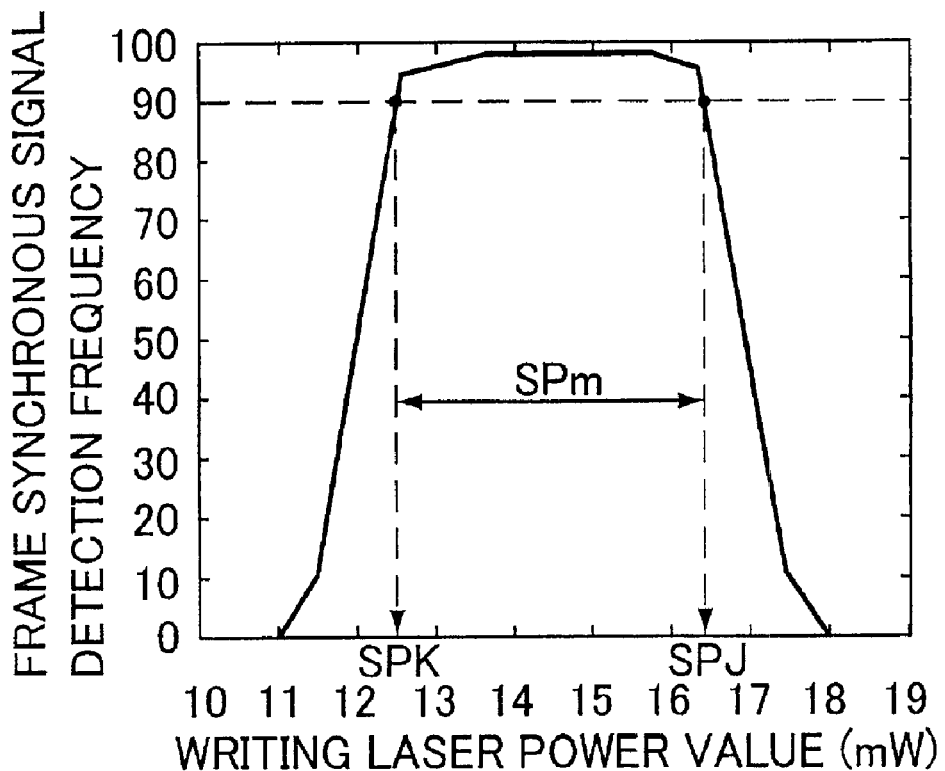
FIG. 29 is an explanatory view of the processing for determining the optimum writing laser power value from a relation between the writing laser power value and a frame synchronous signal detection frequency in the modification example of the optical disc recording/reproducing apparatus.

The method further includes: specifying the writing laser power value Pt (see FIG. 25) corresponding to the β value indicated by the pre-stored β preferable value information similarly as the second embodiment; referring to the writing power-frame synchronous signal detection frequency characteristic shown in FIG. 29; and obtaining an upper limit value SPJ (16.5 mW in the shown example) and lower limit value SPK (12.5 mW in the shown example) of the writing laser power for setting the frequency within the range (the frame synchronous signal detection frequency of 90 or more in the shown example) indicated by the pre-stored frame synchronous signal detection frequency preferable value information and specifying a possible range SPm of the writing laser power.

When the writing laser power value Pt is specified from the β value, the possible range SPm of the writing laser power value is specified from the frame synchronous signal detection frequency, and the writing laser power value Pt is within the range SPm similarly as the second embodiment, the writing laser power value Pt is determined as the optimal writing laser power value. On the other hand, when the writing laser power value Pt is not in the range SPm, the OPC is performed again, and the processing for determining the optimal writing laser power value based on the OPC result similarly as described above may be performed. Moreover, when the writing laser power value Pt is not in the range SPm, the determining method includes: determining the average value of the writing laser power value Pt and the upper limit value SPJ or the lower limit value SPK (the value closer to the writing laser power value Pt) as the optimal writing laser power value. Then, the optimal writing laser power value can be determined considering not only the β value but also the detection frequency of the frame synchronous signal.

Moreover, as shown in FIG. 17, the jitter detection circuit 160 is provided instead of the C1 error detection circuit 23, and the optimal writing laser power value may be determined using a jitter value detected by the jitter detection circuit 160 instead of the C1 error value. Here, the jitter detection circuit 160 includes an equalizer, slicer, phase-locked loop (PLL) circuit, and jitter measurement unit. An RF signal supplied from the RF amplifier 12 passes through the equalizer, and the signal passed through the equalizer is binarized by the slicer. Moreover, the binarized RF signal is supplied to both the PLL circuit and the jitter measurement unit. In the PLL circuit, a clock is generated from the binarized RF signal, and the generated clock is sent to the jitter measurement unit. The jitter measurement unit measures a jitter as a standard deviation of a recorded bit and reference length deviation from the clock and the binarized RF signal.

When the jitter value is used instead of the C1 error value, that is, when the β value and jitter value are used to determine the optimal writing laser power value, first the writing power-β characteristic (see FIG. 25) indicating the relation between the writing laser power value and the β value is obtained from the jitter value supplied from the jitter detection circuit 160 and the β value supplied from the β detection circuit 24 similarly as the second embodiment. Moreover, a writing power-jitter characteristic indicating the relation between the writing laser power value and the jitter value is obtained as shown in FIG. 30.

Figure 30:
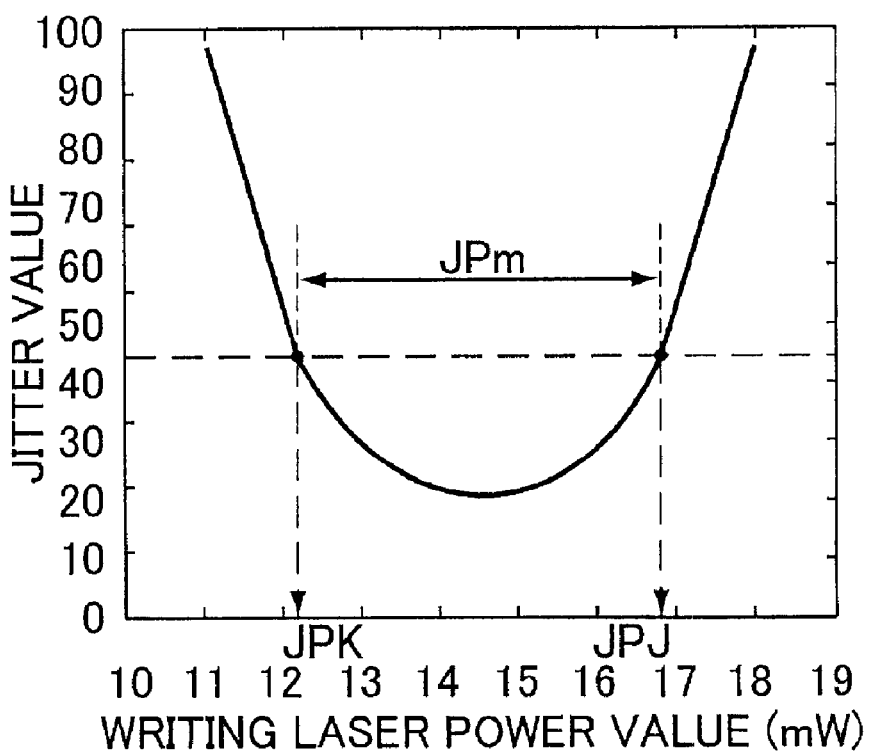
FIG. 30 is an explanatory view of the processing for determining the optimum writing laser power value from a relation between the writing laser power value and a jitter value in another modification example of the optical disc recording/reproducing apparatus.

The method further includes: specifying the writing laser power value Pt (see FIG. 25) corresponding to the β value indicated by the pre-stored β preferable value information similarly as the second embodiment; referring to the writing power-jitter characteristic shown in FIG. 30; and obtaining an upper limit value JPJ (16.9 mW in the shown example) and lower limit value JPK (12.1 mW in the shown example) of the writing laser power for setting the value within the range (the jitter value of 35 or less in the shown example) indicated by the pre-stored jitter preferable value information and specifying a possible range JPm of the writing laser power.

When the writing laser power value Pt is specified from the β value in this manner, the possible range JPm of the writing laser power value is specified from the jitter value, and the writing laser power value Pt is within the range JPm similarly as the second embodiment, the writing laser power value Pt is determined as the optimal writing laser power value. On the other hand, when the writing laser power value Pt is not in the range JPm, the OPC is performed again, and the processing for determining the optimal writing laser power value based on the OPC result similarly as described above may be performed. Moreover, when the writing laser power value Pt is not in the range JPm, the determining method includes determining the average value of the writing laser power value Pt and the upper limit value JPJ or the lower limit value JPK (the value closer to the writing laser power value Pt) as the optimal writing laser power value.

Furthermore, as shown in FIG. 19, the deviation detection circuit 180 is provided instead of the C1 error detection circuit 23, and the optimal writing laser power value may be determined using a deviation value detected by the deviation detection circuit 180. Here, the deviation detection circuit 180 includes an equalizer, slicer, and PLL circuit similarly as the jitter detection circuit 160. Furthermore, instead of the jitter measurement unit, a deviation measurement unit for detecting a deviation (deviations of the recording bit and reference length) from the clock supplied from the PLL circuit and the binary RF signal supplied from the slicer is provided.

When the deviation value is used instead of the C1 error value, that is, when the β value and deviation value are used to determine the optimal writing laser power value, first the writing power-β characteristic (see FIG. 25) indicating the relation between the writing laser power value and the β value is obtained from the deviation value supplied from the deviation detection circuit 180 and the β value supplied from the β detection circuit 24 similarly as the second embodiment. Moreover, a writing power-deviation characteristic indicating the relation between the writing laser power value and the deviation value is obtained as shown in FIG. 31.

Figure 31:
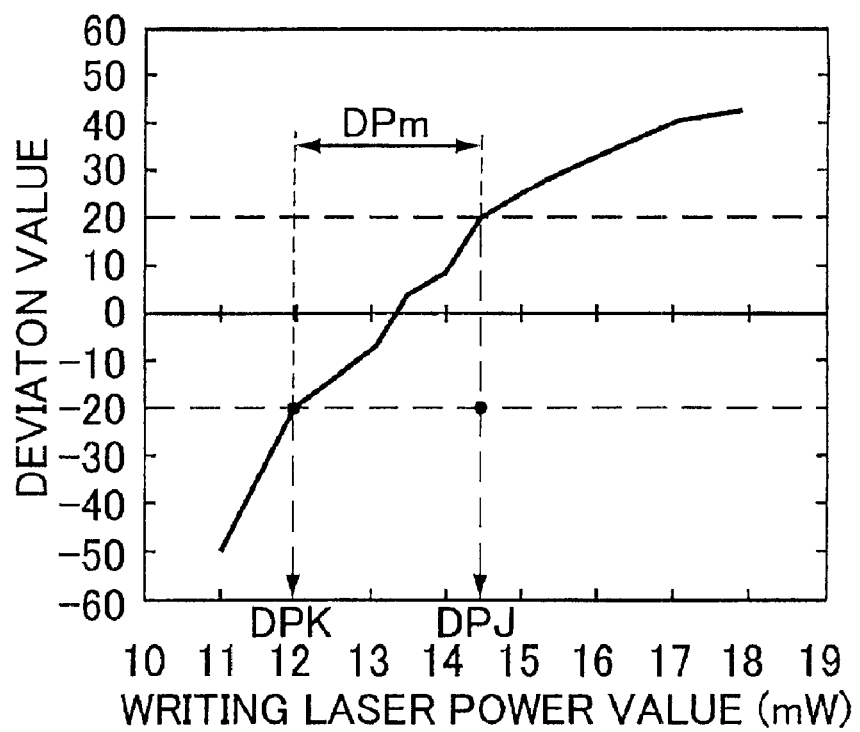
FIG. 31 is an explanatory view of the processing for determining the optimum writing laser power value from a relation between the writing laser power value and a deviation value in another modification example of the optical disc recording/reproducing apparatus.

The method further includes: specifying the writing laser power value Pt (see FIG. 25) corresponding to the β value indicated by the pre-stored β preferable value information similarly as the second embodiment; referring to the writing power-deviation characteristic shown in FIG. 31; and obtaining an upper limit value DPJ (14.5 mW in the shown example) and lower limit value DPK (12 mW in the shown example) of the writing laser power for setting the value within the range (the deviation value of −20 to 20 in the shown example) indicated by the pre-stored deviation preferable value information and specifying a possible range DPm of the writing laser power.

When the writing laser power value Pt is specified from the β value in this manner, the possible range DPm of the writing laser power value is specified from the deviation value, and the writing laser power value Pt is within the range DPm similarly as the second embodiment, the writing laser power value Pt is determined as the optimal writing laser power value. On the other hand, when the writing laser power value Pt is not in the range DPm, the OPC is performed again, and the processing for determining the optimal writing laser power value based on the OPC result may be performed similarly as described above. Moreover, when the writing laser power value Pt is not in the range DPm, the determining method includes determining the average value of the writing laser power value Pt and the upper limit value DPJ or the lower limit value DPK (the value closer to the writing laser power value Pt) as the optimal writing laser power value.

Figure 32:
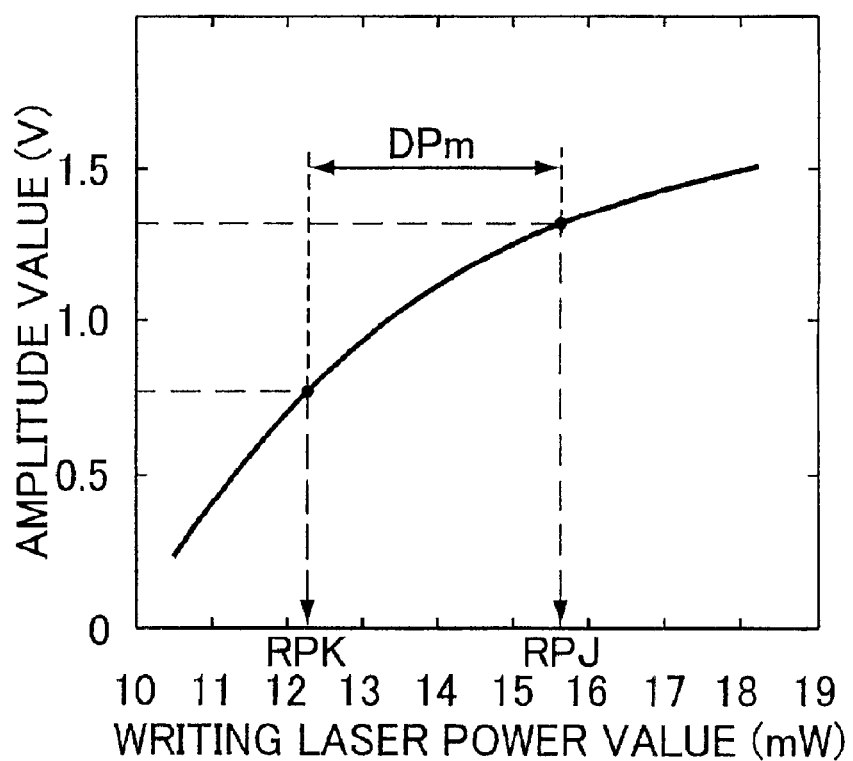
FIG. 32 is an explanatory view of the processing for determining the optimum writing laser power value from a relation between the writing laser power value and an amplitude value of an RF signal in the optical disc recording/reproducing apparatus.

Moreover, instead of the C1 error value, parameters such as an amplitude of the RF signal supplied from the RF amplifier 12 during reproduction of the test record area, modulation degree, and reflectance may be used to determine the optimal writing laser power value. Here, a relation between the writing laser power value and an amplitude value of the RF signal has a characteristic such that the amplitude value rises with a rise of the writing laser power value, and the amplitude value rises to some degree and becomes saturated as shown in FIG. 32. When the amplitude of the RF signal is used to determine the optimal writing laser power value, the writing power-amplitude characteristic is obtained from the RF signal supplied from the RF amplifier 12 during reproduction of the tested recording area as described above. The method further includes: referring to the obtained characteristic; and obtaining an upper limit value RPJ and lower limit value RPK of the writing laser power for setting the writing laser power within a range indicated by the pre-stored preferable value information of the amplitude of the RF signal and specifying a possible range RPm of the writing laser power value. Moreover, similarly as the second embodiment, the optimal writing laser power value may be determined based on the range RPm and the writing laser power value Pt specified from the β value.

Figure 33:
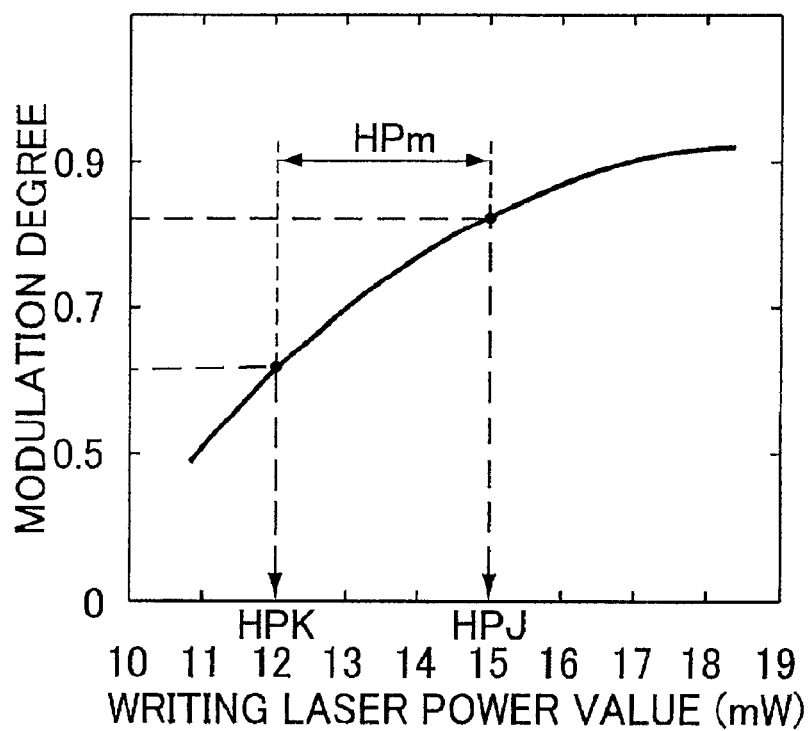
FIG. 33 is an explanatory view of the processing for determining the optimum writing laser power value from a relation between the writing laser power value and a modulation degree in the optical disc recording/reproducing apparatus.

Furthermore, a relation between the modulation degree and the writing laser power value has a characteristic similar to that of the amplitude of the RF signal as shown in FIG. 33. When the modulation degree is used to determine the optimal writing laser power value, the writing power-modulation degree characteristic is obtained from the RF signal supplied from the RF amplifier 12 during the reproduction of the tested recording area as described above. The method further includes: referring to the obtained characteristic; and obtaining an upper limit value HPJ and lower limit value HPK of the writing laser power for setting the writing laser power within a range indicated by the pre-stored preferable value information of the modulation degree and specifying a possible range HPm of the writing laser power value. Moreover, similarly as the second embodiment, the optimal writing laser power value may be determined based on the range HPm and the writing laser power value Pt specified from the β value similarly as the second embodiment. Additionally, assuming that a maximum value of the RF signal is Imax, and a minimum value thereof is Imin, the modulation degree can be obtained by the modulation degree=(Imax−Imin)/Imax.

Figure 34:
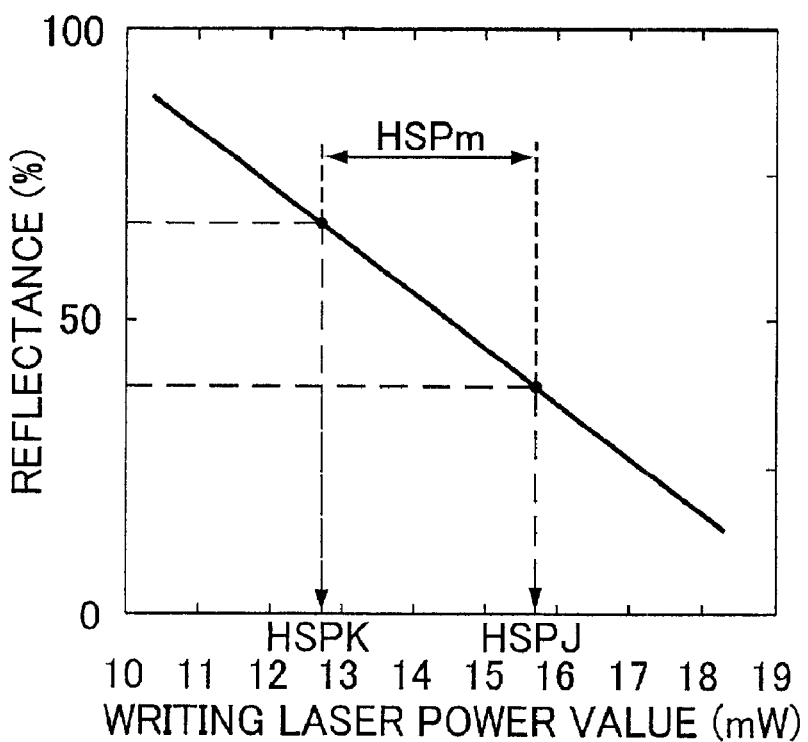
FIG. 34 is an explanatory view of the processing for determining the optimum writing laser power value from a relation between the writing laser power value and a reflectance in the optical disc recording/reproducing apparatus.

Additionally, a relation between the reflectance and the writing laser power value substantially has a characteristic of a linear function, in which the reflectance drops with an increase of the writing laser power value as shown in FIG. 34. When the reflectance is used to determine the optimal writing laser power value, the writing power-reflectance characteristic is obtained from the RF signal supplied from the RF amplifier 12 during the reproduction of the tested recording area as described above. The method further includes: referring to the obtained characteristic; and obtaining an upper limit value HSPJ and lower limit value HSPK of the writing laser power for setting the writing laser power within a range indicated by the pre-stored preferable value information of the reflectance and specifying a possible range HSPm of the writing laser power value. Moreover, similarly as the second embodiment, the optimal writing laser power value may be determined based on the range HSPm and the writing laser power value Pt specified from the β value. Additionally, the reflectance can be obtained by passing the RF signal supplied from the RF amplifier 12 and averaging the signal.

B-3-2. Modification Example 2

Moreover, in the second embodiment and the previous modification examples, the writing laser power value of one point is specified from the β value obtained according to the result of the test recording, and the possible range of the writing laser power value is obtained from the other parameters (C1 error value, detection frequency of the frame synchronous signal, jitter value, deviation value, amplitude of the RF signal, modulation degree, and reflectance). However, the method may include: using the other parameters to specify the writing laser power value of one point; and using the β value to specify the possible range of the writing laser power.

Alternatively, the method may include: using two or more parameters such as the level of the recording state such as the C1 error value, detection frequency of the frame synchronous signal, jitter value, deviation value, amplitude of the RF signal, modulation degree, and reflectance to determine the optimal writing laser power value. For example, the method may include: using the C1 error value to specify the writing laser power value of one point; using the detection frequency of the frame synchronous signal to specify the possible range of the writing laser power value; and determining the optimal writing laser power value based on the specified writing laser power value and range.

Moreover, in the second embodiment, the writing laser power value of one point is specified from one parameter (β value in the second embodiment), and the possible range of the writing laser power value is specified from the other parameter (C1 error value in the second embodiment). When the writing laser power value of one point specified from the parameter is in the range specified by the other parameter, the writing laser power value of one point is determined as the optimal writing laser power value. However, the optimal writing laser power value may be determined by other methods. For example, the average value of the writing laser power value of one point specified from the β value and the writing laser power value of one point specified from the C1 error value may be determined as the optimal writing laser power value.

Figure 35:
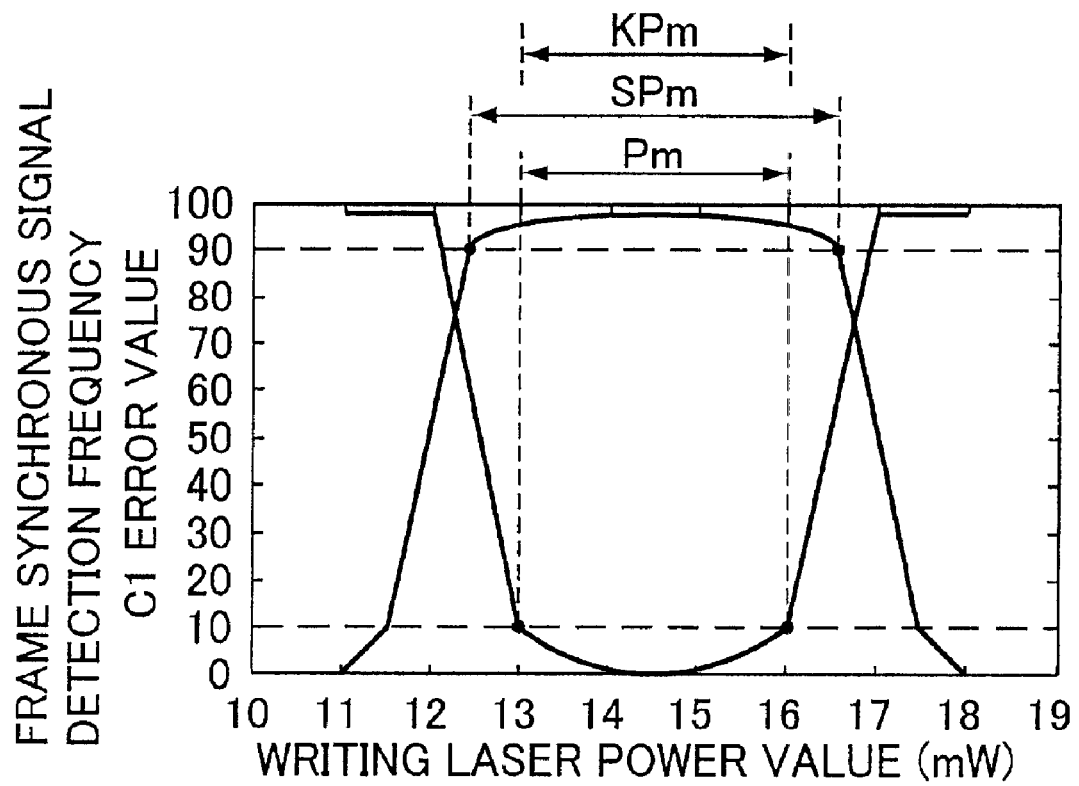
FIG. 35 is an explanatory view of the processing for determining the optimum writing laser power value in another modification example of the optical disc recording/reproducing apparatus.

Furthermore, two parameters regarding the level of the recording state such as the β value and C1 error value are used to obtain the optimal writing laser power value. However, three or more parameters of the aforementioned various parameters (C1 error value, detection frequency of the frame synchronous signal, jitter value, deviation value, amplitude of the RF signal, modulation degree, and reflectance). For example, when three parameters such as the β value, C1 error value, and detection frequency value of the frame synchronous signal are used to obtain the optimal writing laser power value, similarly as the second embodiment, the writing laser power value Pt is specified from the writing power-β characteristic (see FIG. 25), and the possible range of the writing laser power value is obtained from the writing power-C1 error characteristic and writing power-frame synchronous signal detection frequency characteristic. For example, as shown in FIG. 35, when the possible range Pm of the writing laser power value is specified from the writing power-C1 error characteristic, and the possible range SPm of the writing laser power value is specified from the writing power-frame synchronous signal detection frequency, the optimal writing laser power value may be specified based on a range KPm of a portion of the range Pm superposed upon the range SPm (range KPm=range Pm in the shown example) and the writing laser power value Pt.

C. Third Embodiment

Figure 36:
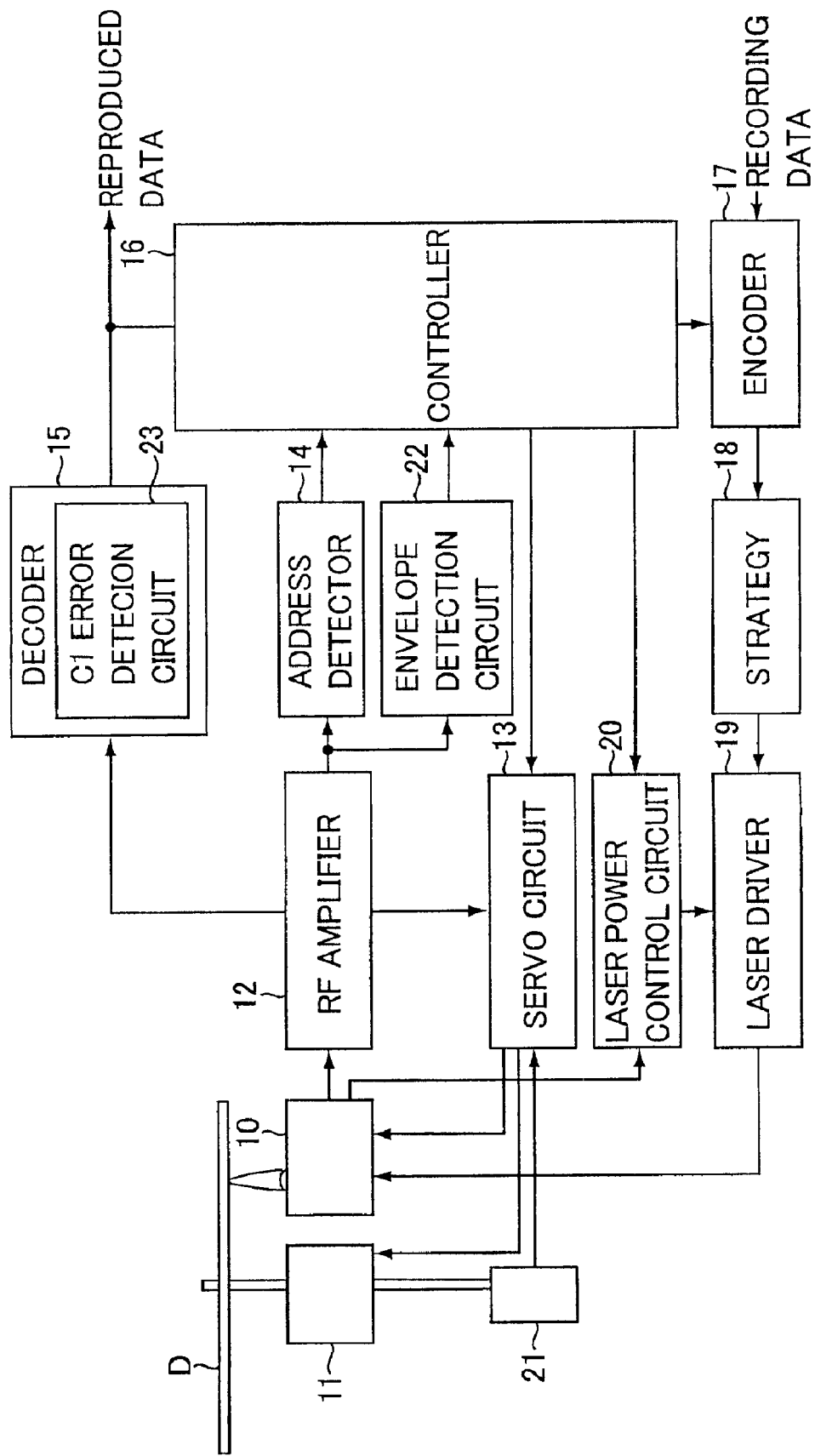
FIG. 36 is a block diagram showing a constitution of the optical disc recording/reproducing apparatus according to a third embodiment of the present invention.
Figure 37:
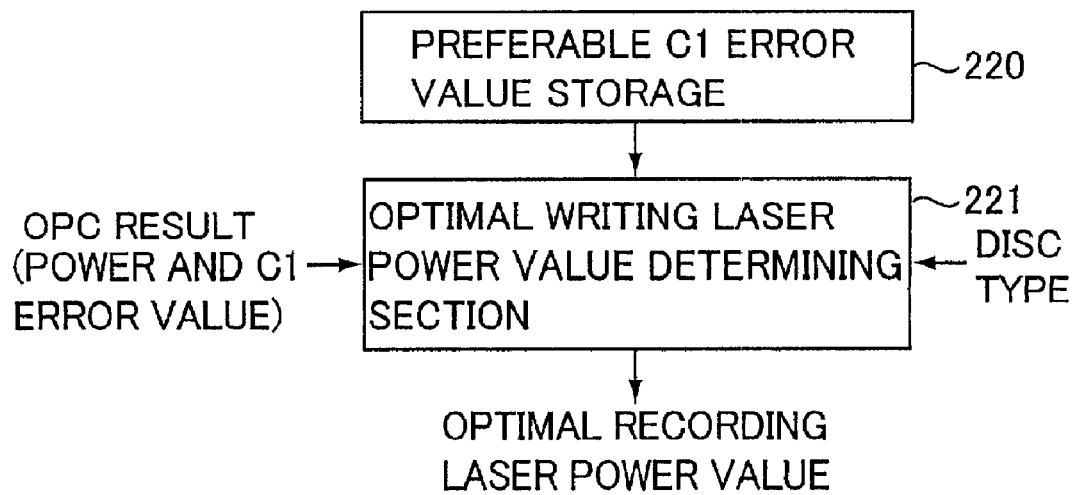
FIG. 37 is a block diagram showing a functional constitution of the controller as the constituting element of the optical disc recording/reproducing apparatus according to the third embodiment.

The optical disc recording/reproducing apparatus according to a third embodiment of the present invention will next be described with reference to FIGS. 36 and 37. As shown in FIG. 36, the optical disc recording/reproducing apparatus according to the third embodiment is different from the optical disc recording/reproducing apparatus according to the second embodiment in that the β detection circuit 24 in the second embodiment is not provided. The C1 error detection circuit 23 measures the C1 error from the RF signal supplied from the RF amplifier 12 during the reproduction of the test record area performed similarly as the second embodiment, and outputs the C1 error value as a measurement result to the controller 16.

The controller 16 in the third embodiment is different from the controller 16 in the second embodiment in the determining method of the optimal writing laser power value. The functional constitution of the controller 16 for the processing of determining the optimal writing laser power value by the controller 16 in the third embodiment is shown in FIG. 37. As shown in FIG. 37, the controller 16 has a C1 error preferable value storage 220, and an optimal writing laser power value determining section 221.

Figure 38:
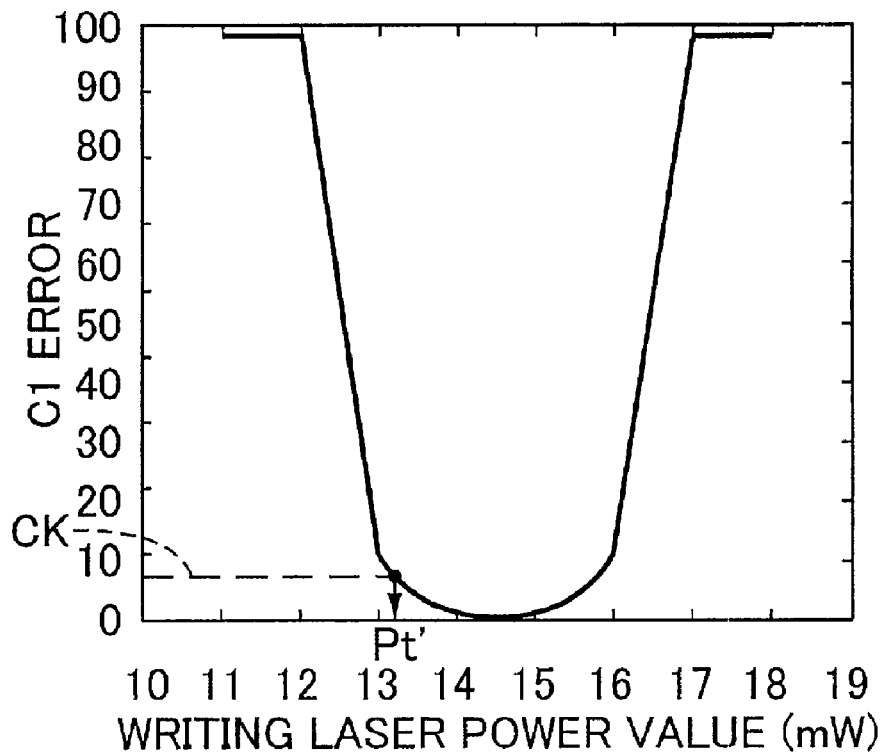
FIG. 38 is an explanatory view showing the processing for determining the optimum writing laser power value from the relation between the writing laser power value and the C1 error value in the optical disc recording/reproducing apparatus according to the third embodiment.

The optimal writing laser power value determining section 221 obtains the writing power-C1 error characteristic indicating a relation between the writing laser power value and the C1 error value shown in FIG. 38 from the result (a plurality of writing laser power values and C1 error values corresponding to the writing laser power values) obtained by the OPC performed prior to the regular recording. The optimal writing laser power value determining section 221 specifies the writing laser power value based on the C1 error preferable value information stored in the C1 error preferable value storage 220, and disc type information supplied from the address detector circuit 14. In the C1 error preferable value storage 220, the jitter preferable value information indicating the C1 error value for performing the optimal recording is stored for each type (manufacturing maker and dyestuff) of the optical disc D. Here, the information stored in the C1 error preferable value storage 220 is a value obtained for each disc type beforehand by the experiment.

When the power-C1 error characteristic indicating the relation between the writing laser power value and the C1 error value shown in FIG. 38 is obtained, the optimal writing laser power value determining section 221 obtains C1 error preferable value information CJK (may be equal to 0) corresponding to type information of the disc supplied from the address detector circuit 14 from the C1 error preferable value information corresponding to a large number of disc types stored in the C1 error preferable value storage 220. Moreover, the optimal writing laser power value determining section 221 refers to the power-C1 error characteristic obtained based on the OPC result, and determines a writing laser power value Pt' corresponding to the C1 error value indicated by the obtained C1 error preferable value information. Furthermore, the controller 16 controls the respective apparatus components of the laser power control circuit 20 so that the laser beam having the determined writing laser power value Pt' is emitted to the optical disc D from the optical pickup 10.

According to the third embodiment, the optimal writing laser power value can be determined considering the C1 error value as the parameter other than the β value. For example, the recording is performed with the writing laser power value corresponding to the β significant point with respect to the optical disc (see FIG. 48) with the characteristic having the β value significant point at which the β value significantly changes. Then, the satisfactory recording state level cannot be obtained in some case. However, in the present embodiment, the optimal writing laser power value is determined considering not only the β value but also the other parameters concerning the recording level. Therefore, the recording level arising from the β significant point can be inhibited from being deteriorated.

Additionally, in the third embodiment, the C1 error detection circuit 23 is provided to detect the C1 error value from the reproduced signal of the test record area, and the writing laser power value at which the C1 error value indicates a pre-stored preferable value is determined as the optimal writing laser power value. However, the method may include: detecting the parameters relating to the level of the recording state, such as the jitter value, detection frequency of the frame synchronous signal, deviation value, and amplitude of the RF signal; and using any one of these parameters to determine the optimal writing laser power value.

Moreover, in the third embodiment, the writing laser power value Pt' corresponding to the preferable value CJK of the C1 error value stored in the C1 error preferable value storage 220 is determined as the optimal writing laser power value. However, when the optimal writing laser power value is determined from the parameters other than the β value, the following method may be used.

Figure 39:
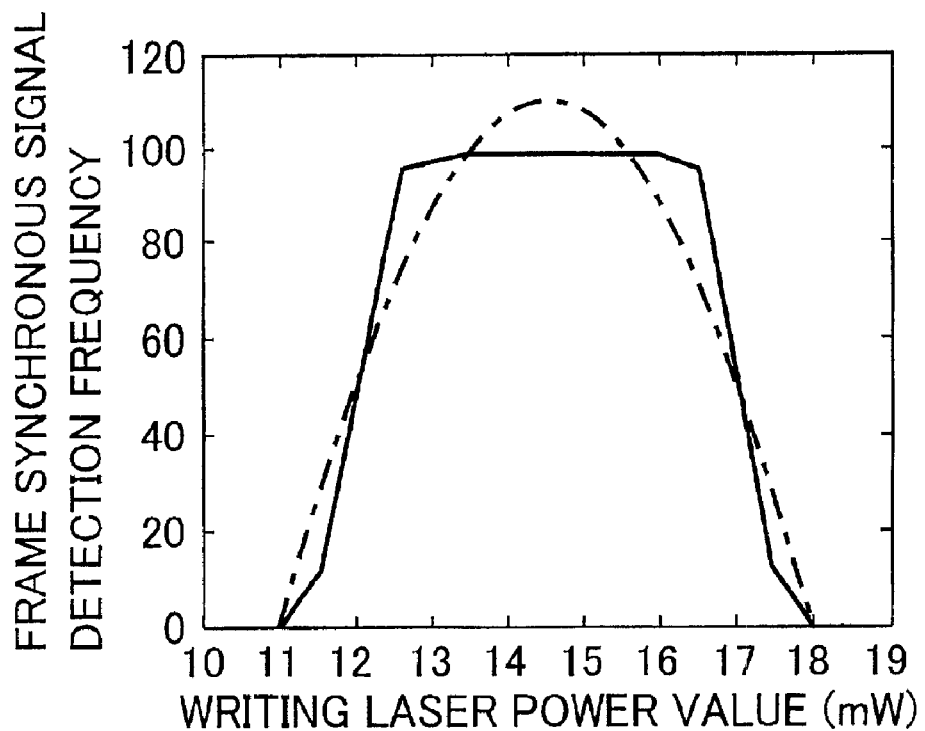
FIG. 39 is an explanatory view showing the processing for determining the optimum writing laser power value from the relation between the writing laser power value and the frame synchronous signal detection frequency in the modification example of the optical disc recording/reproducing apparatus according to the third embodiment.
Figure 40:
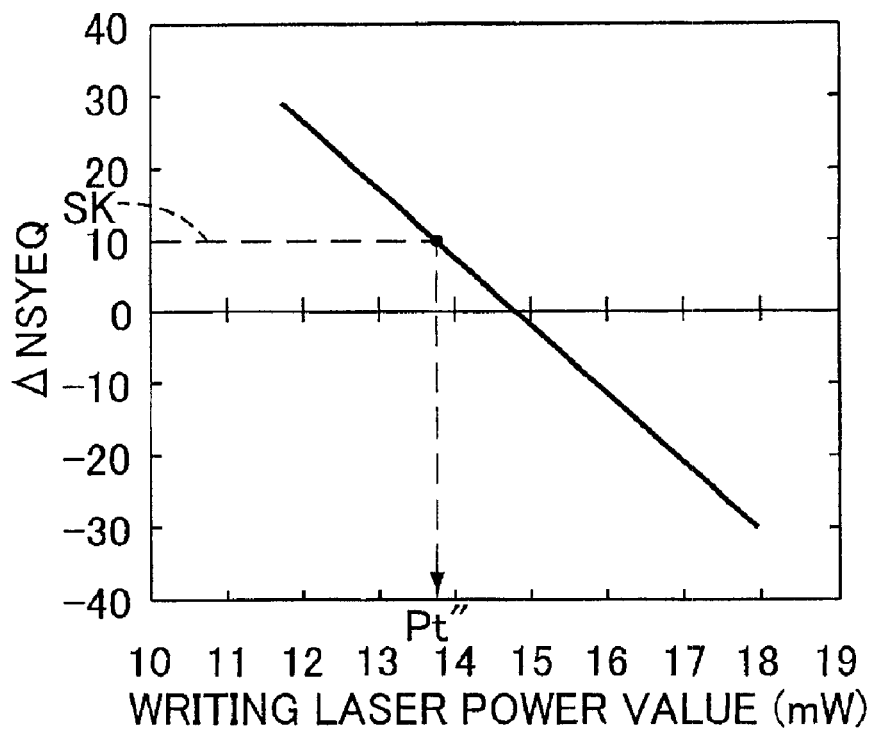
FIG. 40 is an explanatory view of the processing for determining the optimum writing laser power value from a relation between the writing laser power value and a $\Delta$ frame synchronous signal detection frequency value in the modification example of the optical disc recording/reproducing apparatus according to the third embodiment.

For example, when the detection frequency of the frame synchronous signal is detected from the RF signal of the test record area, a writing power-frame synchronous signal detection frequency characteristic shown by a solid line in FIG. 39 is obtained. When the characteristic is obtained, the method for determining the optimal writing laser power value first includes: obtaining a secondary function approximate to the writing power-frame synchronous signal detection frequency characteristic obtained as a result of the test recording shown by the solid line by a method of least square (shown by a one-dot chain line in FIG. 39). For example, when the secondary function is represented by frame synchronous signal detection frequency (SYEQ)= $ap^2+bp+c$ (p denotes a variable indicating the writing laser power value, and a, b, c are fixed values), the secondary function is differentiated, and a change amount $ap+b$ (hereinafter referred to as ΔNSYEQ) of the frame synchronous signal detection frequency per a unit writing laser power is obtained. A relation between the ΔNSYEQ obtained in this manner and the writing laser power value is represented by the linear function as shown in FIG. 40, a writing power-ΔNSYEQ characteristic shown in FIG. 40 is referred to, and a writing laser power value Pt" corresponding to a pre-stored preferable ΔNSYEQ value SK is determined as the optimal writing laser power value.

Figure 41:
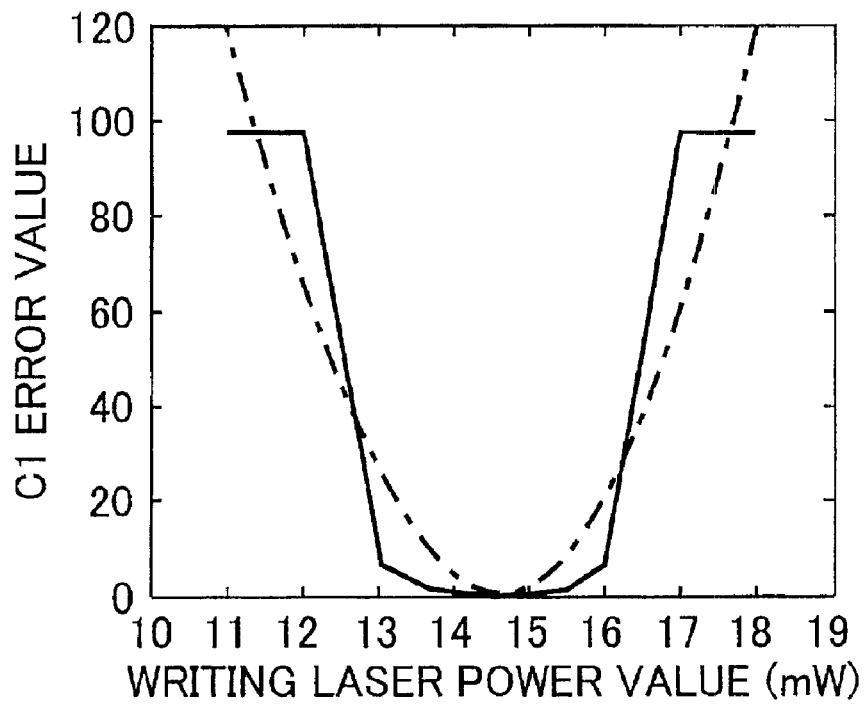
FIG. 41 is an explanatory view showing the processing for determining the optimum writing laser power value from the relation between the writing laser power value and the C1 error value in the modification example of the optical disc recording/reproducing apparatus according to the third embodiment.
Figure 42:
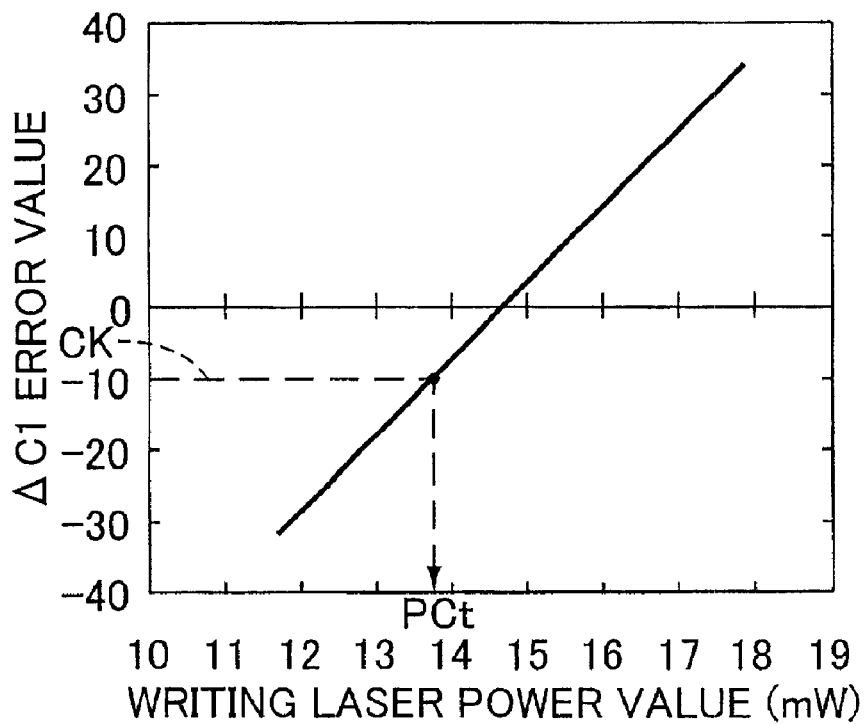
FIG. 42 is an explanatory view showing the processing for determining the optimum writing laser power value from the relation between the writing laser power value and a $\Delta$C1 error value in the modification example of the optical disc recording/reproducing apparatus according to the third embodiment.
Figure 43:
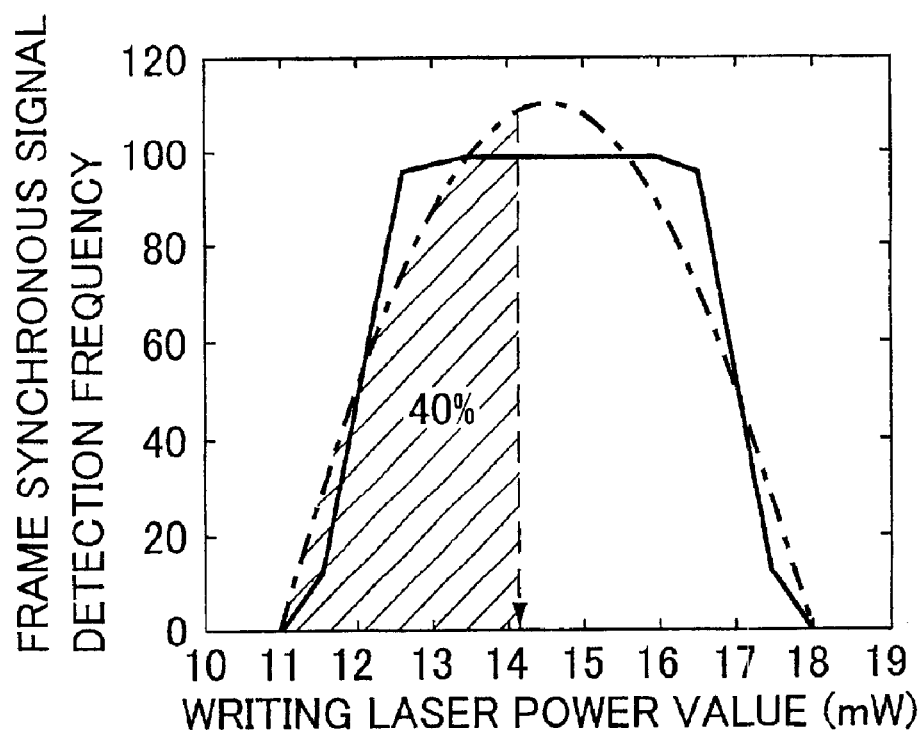
FIG. 43 is an explanatory view showing a modification example of the processing for determining the optimum writing laser power value from the relation between the writing laser power value and the frame synchronous signal detection frequency in the modification example of the optical disc recording/reproducing apparatus according to the third embodiment.

Furthermore, to detect the C1 error value from the signal obtained by EFM-demodulating the RF signal of the test record area and determine the optimal writing laser power value, similarly as determination of the optimal writing laser power value using the frame synchronous signal detection frequency, the secondary function approximate to the writing power-C1 error value characteristic shown by a solid line in FIG. 41 is obtained by the method of least square (shown by a one-dot chain line in FIG. 41). For example, similarly as the use of the detection frequency of the frame synchronous signal, the secondary function is differentiated, and a writing power-ΔC1 error characteristic shown in FIG. 42 is obtained. The writing power-ΔC1 error characteristic shown in FIG. 42 is referred to, and a writing laser power value PCt corresponding to a pre-stored preferable ΔC1 error value CK is determined as the optimal writing laser power value.

Additionally, in the aforementioned modification example, the secondary function approximate to writing power-frame synchronous signal detection frequency characteristic or the writing power-C1 error characteristic is obtained by the method of least square. The writing laser power value at which the ΔNSYEQ or the ΔC1 error value represented by the linear function obtained by differentiating the secondary function indicates the preferable value is determined as the optimal value. However, a method may be used comprising: obtaining the secondary function approximate to the writing power-frame synchronous signal detection frequency characteristic similarly as described above; and determining a writing laser power value Pst having an area being 40% of an area S, when an area of a portion defined by a curve of the obtained secondary function (one-dot chain line) and a line indicating the frame synchronous signal detection frequency=0 is set to S. In this case, the writing laser power value having the area ratio for performing the preferable recording may be obtained beforehand by the experiment, and the area ratio obtained by an experiment result may be stored.

Figure 44:
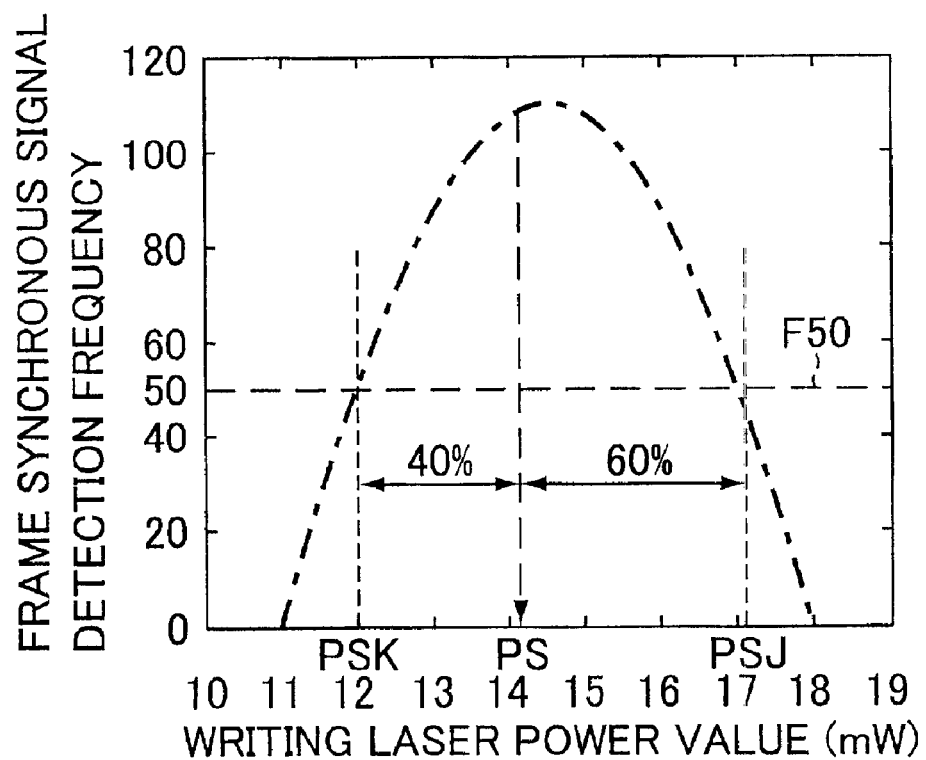
FIG. 44 is an explanatory view showing another modification example of the processing for determining the optimum writing laser power value from the relation between the writing laser power value and the frame synchronous signal detection frequency in the modification example of the optical disc recording/reproducing apparatus according to the third embodiment.

Moreover, instead of the aforementioned determination of the optimal writing laser power value with the ratio of the area S, as shown in FIG. 44, intersections of the curve of the secondary function obtained similarly as described above and a line F50 indicating the value of the preset frame synchronous signal detection frequency (frame synchronous signal detection frequency=50 in the shown example) are obtained as writing laser power values PSK, PSJ. The optimal writing laser power value may be determined from these values. For example, as shown in FIG. 44, an optimal writing laser power value PS may be obtained by the following equation.

$$Ps=(PSJ-PSK)*0.4+PSK$$

With use of the equation, a value (value of 60% from PSJ) which is between the writing laser power values PSK and PSJ as the intersections and which is 40% from PSK of a distance between the intersections is obtained, and may be determined as the optimal writing laser power value.

Furthermore, the method of using the detection frequency of the frame synchronous signal and the C1 error value, representing the characteristics by the secondary function by the method of least square, differentiating the secondary function or obtaining the area surrounded by the secondary function curve, and obtaining the optimal writing laser power value may be applied to not only the parameters such as the frame synchronous signal detection frequency and C1 error, but also the other parameters such as the jitter value.

D. Fourth Embodiment

The optical disc recording/reproducing apparatus according to a fourth embodiment of the present invention will next be described. The constitution of the optical disc recording/reproducing apparatus according to the fourth embodiment is substantially similar to that of the optical disc recording/reproducing apparatus according to the second embodiment, and different from that of the second embodiment in the determining method of the optimal writing laser power value by the controller 16. Therefore, the determining method of the optimal writing laser power value by the controller 16 of the optical disc recording/reproducing apparatus according to the fourth embodiment will be described hereinafter with reference to FIG. 45 which shows the functional constitution of the controller 16 for the processing of determining the optimal writing laser power value.

Figure 45:
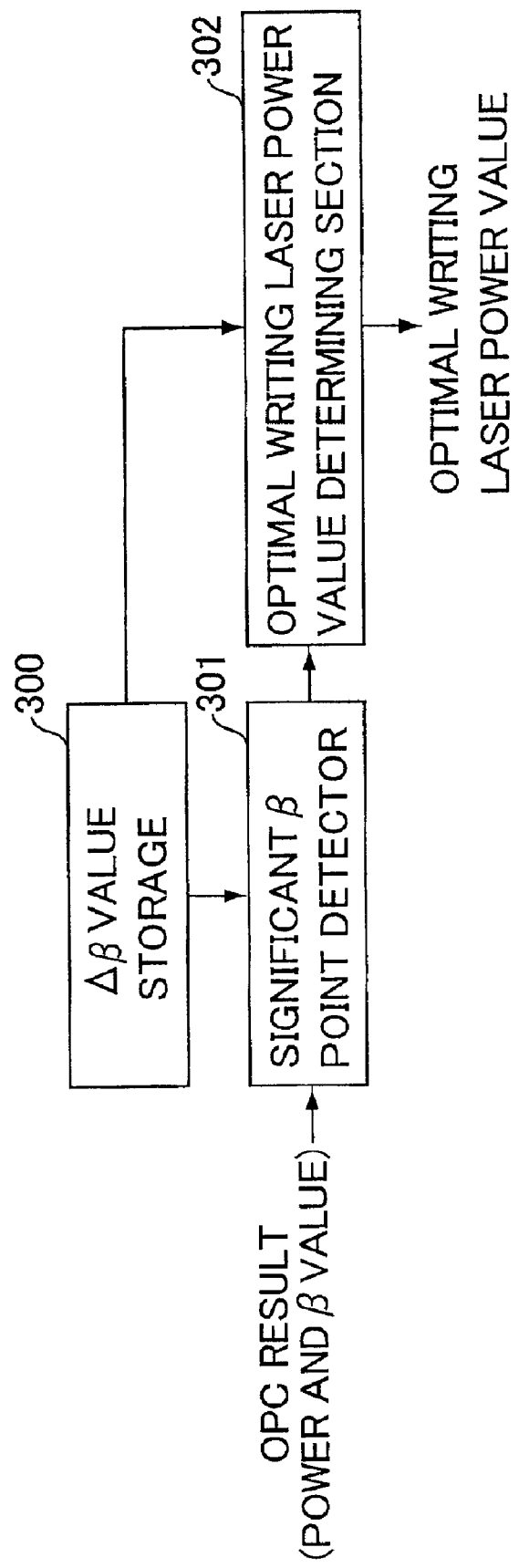
FIG. 45 is a block diagram showing the functional constitution of the controller as the constituting element of the optical disc recording/reproducing apparatus according to a fourth embodiment of the present invention.

As shown in FIG. 45, the controller 16 in the fourth embodiment has a Δβ value storage 300, β significant point detector 301, and optimal writing laser power value determining section 302.

Figure 46:
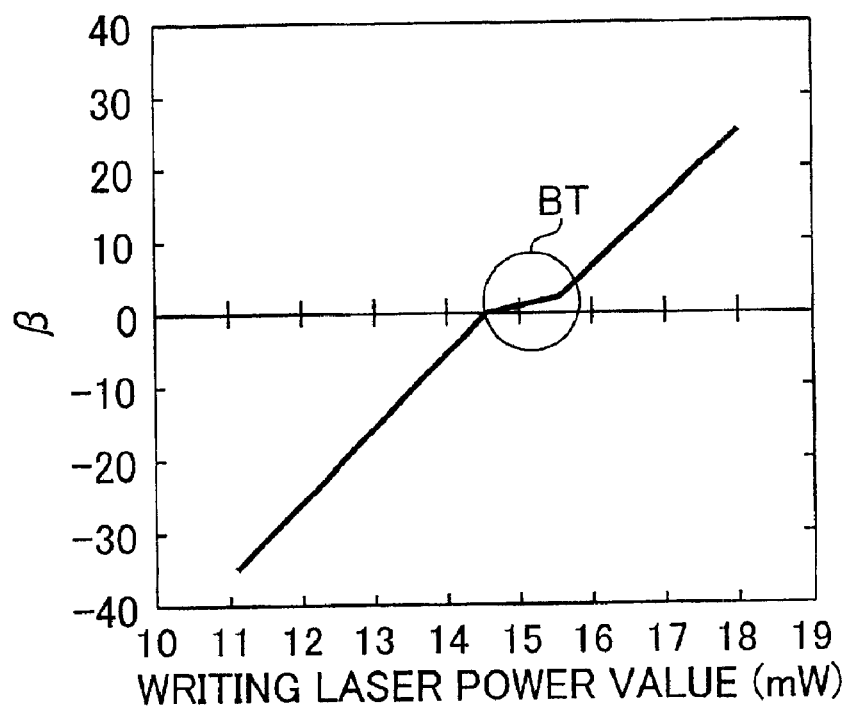
FIG. 46 is a diagram showing one example of the relation between the writing laser power value and the $\beta$ value obtained by the test recording performed by the optical disc recording/reproducing apparatus according to the fourth embodiment.
Figure 47:
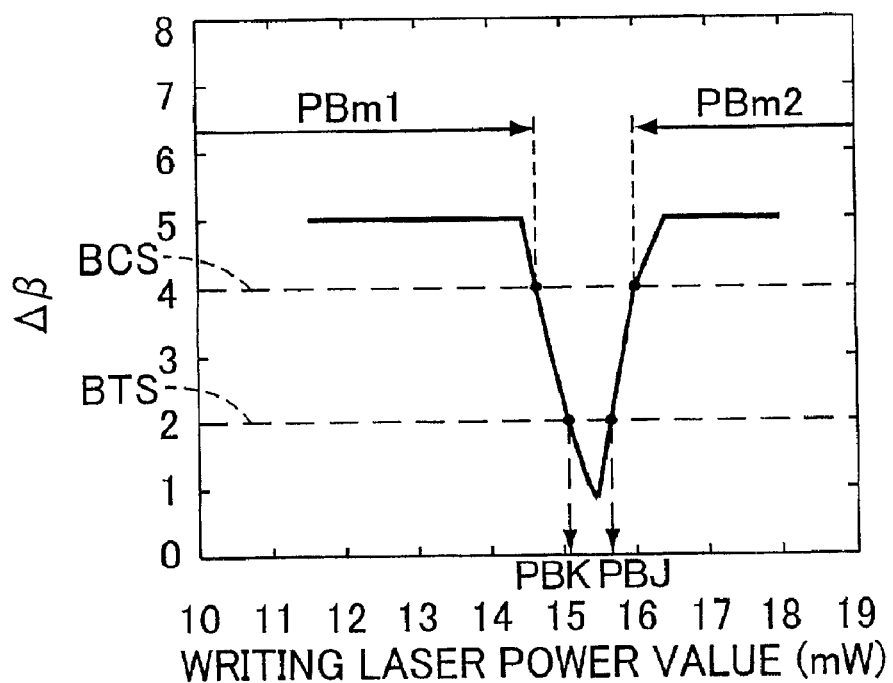
FIG. 47 is an explanatory view of the processing for determining the optimum writing laser power value from the relation between the writing laser power value and the $\Delta\beta$ value in the optical disc recording/reproducing apparatus according to the fourth embodiment.

The β significant point detector 301 obtains a writing power-β characteristic indicating the relation between the writing laser power value and the β value shown in FIG. 46 from the result (a plurality of writing laser power values and β values corresponding to the respective laser power values) obtained from the OPC prior to the regular recording. Furthermore, the writing power-Δβ characteristic indicating the relation between the change amount of the β value per the unit writing laser power value, that is, a Δβ value as a differential value of the β value, and the writing laser power value is obtained as shown in FIG. 47.

The β significant point detector 301 detects a portion different from other portions in the relation between the β value and the writing laser power value, that is, a β significant point at which the β value significantly changes based on the writing power-Δβ characteristic and the Δβ value information stored in the Δβ value storage 300. The Δβ value storage 300 stores a threshold value BTS of the Δβ value for detecting the β significant point obtained beforehand by the experiment. As shown in FIG. 46, a β significant point BT is a portion having a smaller Δβ value as compared with the other portions. Therefore, a portion whose Δβ value is smaller than the threshold value BTS of the Δβ value stored in the Δβ value storage 300 can be detected as the β significant point. In the example shown in FIG. 46, a portion in the vicinity of the writing laser power value of 15 to 16 mW is the β significant point BT. It is seen from FIG. 47 that the Δβ value of the portion (vicinity of the writing laser power value of 15 to 16 mW) of the β value significant point is smaller than that of any other portion. The β significant point detector 301 detects a portion whose Δβ value is smaller than the threshold value BTS of the Δβ value stored in the Δβ value storage 300 as the β significant point BT, and obtains the writing laser power value (lower limit value PBK to upper limit value PBJ) corresponding to the β value significant point BT.

Moreover, in addition to the threshold value BTS of the Δβ value for detecting the β value significant point BT, a threshold value BCS of the Δβ value for specifying the possible range of the writing laser power value is stored in the Δβ value storage 300. The optimal writing laser power value determining section 302 refers to the writing power-Δβ characteristic shown in FIG. 47, and specifies a range (PBm1, PBm2) of the writing laser power value in which the Δβ value is larger than the threshold value BCS stored in the Δβ value storage 300. Furthermore, the optimal writing laser power value determining section 302 determines the writing laser power value which is smaller than the writing laser power value PBK corresponding to the β value significant point BT obtained by the β significant point detector 301 as described above and which belongs to the ranges PBm1, PBm2 of the writing laser power value as the optimal writing laser power value.

The controller 16 in the fourth embodiment controls the respective apparatus components of the optical disc recording/reproducing apparatus so that the recording is performed with the optimal writing laser power value determined as described above. To perform the recording with respect to the optical disc with the characteristic having the β significant point, the recording is performed on the optical disc having the characteristic with the writing laser power value (15.5 mW in the example shown in FIG. 47) corresponding to the β value significant point at which the β value significantly changes. In this case, the satisfactory recording state level cannot be obtained in some case. However, in the present embodiment, the Δβ value is obtained and β significant point is detected as described above, so that the recording is performed in the writing laser power value smaller than the writing laser power value corresponding to the β significant point. Therefore, the deterioration of the recording level because of the β significant point can be inhibited.

Figure 48:
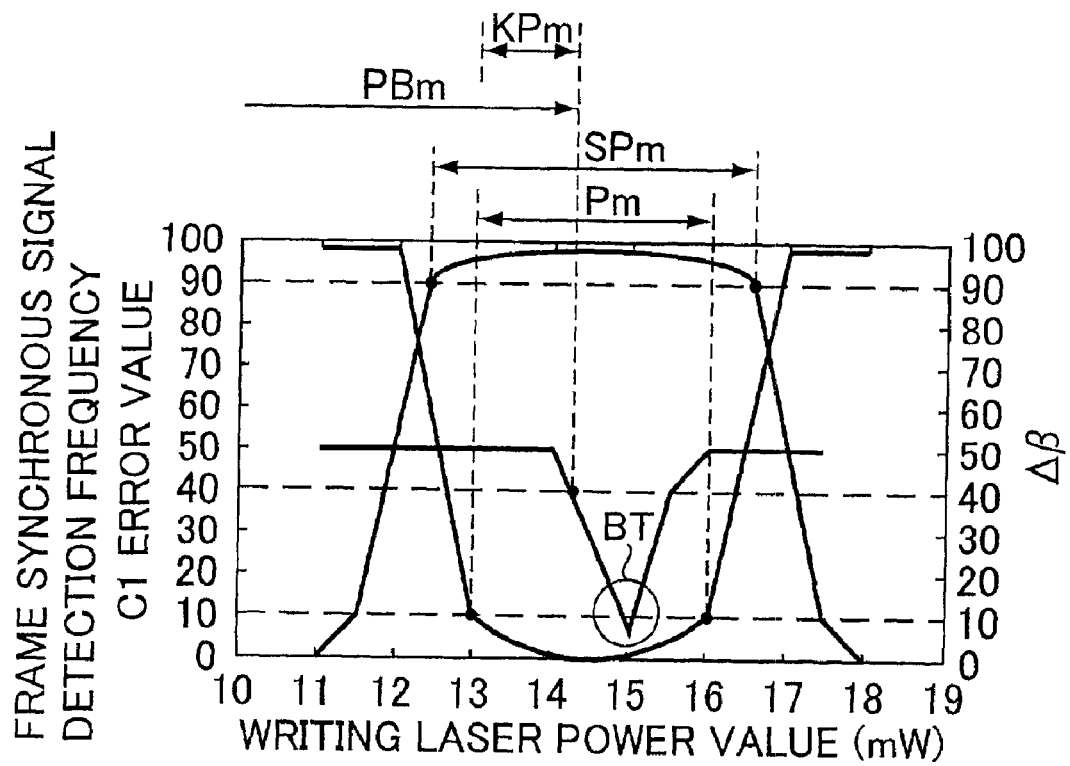
FIG. 48 is an explanatory view of the processing for determining the optimum writing laser power value in the modification example of the optical disc recording/reproducing apparatus according to the fourth embodiment.
Figure 49:
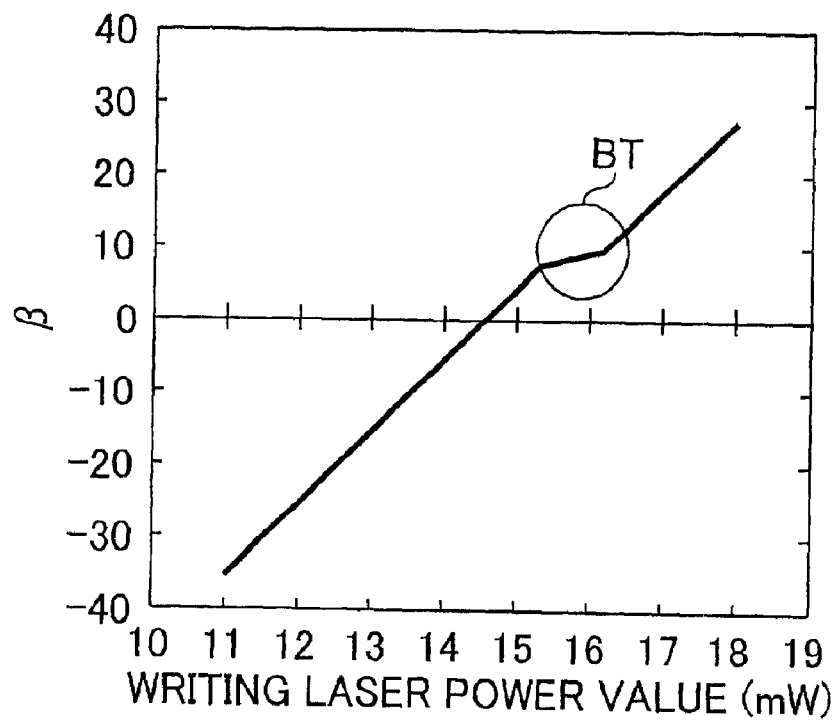
FIG. 49 is a diagram showing one example of the relation between the writing laser power value and the $\beta$ value obtained from the reproduced signal of a test area in which the test recording is performed on an optical disc.

Additionally, when the Δβ value is obtained and used in determining the optimal writing laser power value, in addition to the Δβ value, the other parameters (C1 error value, frame synchronous signal detection frequency, jitter value, deviation value, amplitude of the RF signal, modulation degree, reflectance) may be used to determine the optimal writing laser power value. For example, when the frame synchronous signal detection frequency and C1 error value are used in addition to the Δβ value, the possible range of the writing laser power value is obtained from the writing power-Δβ characteristic similarly as the fourth embodiment. Additionally, the possible range of the writing laser power value may be obtained from the writing power-C1 error characteristic and writing power-frame synchronous signal detection frequency characteristic. For example, as shown in FIG. 48, the possible range Pm of the writing laser power value is specified from the writing power-C1 error characteristic, the possible range SPm of the writing laser power value is specified from the writing power-frame synchronous signal detection frequency characteristic, and further the possible range PBm of the writing laser power value is specified from the writing power-Δβ characteristic. In this case, the writing laser power value set within the range KPm of the superposed portion of the ranges Pm, SPm, and PBm may be determined as the optimal writing laser power value.

E. Modification Examples

Additionally, the present invention is no limited to the aforementioned various embodiments, and can variously be modified as follows.

In the respective embodiments, the recording is performed in the CLV method in which the spindle motor 11 drives the optical disc D at a constant linear velocity. However, the recording may be performed in a constant angular velocity (CAV) method in which the optical disc D is driven at a constant angular velocity. During the recording performed in the CAV method, the recording linear velocity increases, when a recording position approaches an outer peripheral side. Therefore, it is necessary to change the writing laser power value in accordance with a change of the recording linear velocity. Therefore, during the recording, the CAV method includes: performing the determination processing of the optimal writing laser power value as described above in the various embodiments with respect to a plurality of recording linear velocities; obtaining a recording velocity-optimal power characteristic indicating the relation between the plurality of recording velocities and the optimal writing laser power values corresponding to the respective recording velocities; referring to the recording velocity-optimal power characteristic; and changing the optimal writing laser power value in accordance with the change of the recording linear velocity.

Moreover, in the aforementioned second and third embodiments, and modification examples, two or more parameters such as the β value and C1 error value (third embodiment) are obtained from the reproduced signal of the test record area, and the obtained parameters are used to determine the optimal writing laser power value. However, when an ability of a circuit for detecting the respective parameters is insufficient, and when the test record area is reproduced at the same high velocity (e.g., 16-times velocity) as the recording velocity in order to obtain the optimal writing laser power value in a high-velocity recording, a processing for measuring the plurality of parameters at the same time cannot follow a reproduction velocity. It is sometimes impossible to accurately obtain the parameters such as the β value and C1 error value from the reproduced signal. Therefore, it is proposed to thin out a sampling period for obtaining the parameter (e.g., to double the period). However, when the C1 error value is obtained, a maximum C1 error number is 48 (usually, 98), and there is a problem in accuracy.

Considering that it is difficult to accurately obtain the plurality of parameters by the OPC for the high-velocity recording, the OPC is performed at the high recording velocity, the reproduction is performed at a velocity lower than the recording velocity, and the plurality of parameters are measured from the reproduced signal obtained at a low reproduction velocity, so that the plurality of parameters can more accurately be obtained.

Moreover, another method may include: performing the recording of OPC at the high velocity; performing the reproduction of the recorded area a plurality of times; and averaging the parameters measured from the respective reproduced signals obtained by the plurality of reproductions so that a measurement precision of the parameter is enhanced. Moreover, the first reproduced signal is used in measuring only the β value, and the second reproduced signal is used in obtaining the C1 error value. Each of the obtained reproduced signals may be used in measuring one type of parameter in this manner. Of course, the plurality of reproductions may be performed at the velocity lower than the recording velocity.

Furthermore, in the various embodiments, an example in which CD-R is used as the optical disc D has been described. However, the present invention can also be applied to the recording with respect to CD-RW, DVD-R, DVD-random access memory (DVD-RAM), phase change-rewritable (PCRW), and the like.

Additionally, the controller 16 for executing the recording processing including the determination processing of the optimal writing laser power value may be constituted of an exclusive-use hardware circuit, a central processing unit (CPU), or the like. The processing may be realized by software, when program stored in storage means such as a read only memory (ROM) is executed. When the processing is performed by software in this manner, various recording mediums such as CD-ROM and floppy disc in which the program for allowing a computer to realize the processing is recorded may be supplied to the user, or the program may be supplied to the user via transmission mediums such as Internet.

As described above, according to the second aspect of the present invention, generation of the recording error can be reduced regardless of the individual differences of products of the optical disc to be recorded.

What is claimed is:

1. A method of determining a recording velocity of a signal by a write laser beam onto an optical disc, the method comprising the steps of:

undergoing a test recording of a signal onto a predetermined area of the optical disc prior to an actual recording at one or more levels of the recording velocity;

reproducing the signal by a read laser beam from the predetermined area of the optical disc;

generating a first characteristic at one or more levels of the recording velocity based on the reproduced signal, the first characteristic representing a relation between an optical feature of the laser beam and a qualitative parameter of a recording state of the signal, the optical feature being expressed in terms of either a $\beta$ value obtained from the read laser beam reflected back from the optical disc or a power of the writing laser beam;

generating a second characteristic from the first characteristic based on a predetermined preferable range of the qualitative parameter, such that the second characteristic represents a relation between the recording velocity and an available range of the optical feature corresponding to the predetermined preferable range of the qualitative parameter of the recording state; and determining a preferable value of the recording velocity according to the second characteristic and a predetermined preferable range of the optical feature which is predetermined to obtain a preferable recording state.

2. The method according to claim 1, further comprising storing a plurality of preferable ranges of the qualitative parameter and a plurality of preferable ranges of the optical feature in correspondence with a plurality of types of optical discs, and detecting the type of the optical disc under the test recording, such that generating the second characteristic uses the optical range of the qualitative parameter corresponding to the detected type of the optical disc, and determining the preferable value of the recording velocity uses the preferable range of the optical feature corresponding to the detected type of the optical disc.

3. The method according to claim 1, wherein generating the first characteristic adopts the qualitative parameter selected from the group consisting of a frequency of detecting a frame synchronization signal contained in the signal reproduced from the optical disc, a C1 error contained in the reproduced signal, a jitter value of the reproduced signal, a deviation of the reproduced signal, a degree of modulation applied to the laser beam, a reflectance of the laser beam from the optical disc and an amplitude of the reproduced signal.

4. An apparatus for recording a signal onto an optical disc by a write laser beam at a recording velocity, the apparatus comprising:

a test recording section that undergoes a test recording of a signal onto a predetermined area of the optical disc prior to an actual recording at one or more levels of the recording velocity;

a reproducing section that reproduces the signal by a read laser beam from the predetermined area of the optical disc;

a first generating section that generates a first characteristic at one or more levels of the recording velocity based on the reproduced signal, the first characteristic representing a relation between an optical feature of the laser beam and a qualitative parameter of a recording state of the signal, the optical feature being expressed in terms of either a $\beta$ value obtained from the read laser beam reflected back from the optical disc or a power of the writing laser beam;

a second generating section that generates a second characteristic from the first characteristic based on a predetermined preferable range of the qualitative parameter, such that the second characteristic represents a relation between the recording velocity and an available range of the optical feature corresponding to the predetermined preferable range of the qualitative parameter of the recording state; and a determining section that determines a preferable value of the recording velocity according to the second characteristic and a predetermined preferable range of the optical feature which is predetermined to obtain a preferable recording state.

5. The apparatus according to claim 4, further comprising:

a storing section that stores a plurality of preferable ranges of the qualitative parameter and a plurality of preferable ranges of the optical feature in correspondence with a plurality of types of optical discs; and a detecting section that detects the type of the optical disc under the test recording, such that the second generating section uses the optical range of the qualitative parameter corresponding to the detected type of the optical disc, and the determining section uses the preferable range of the optical feature corresponding to the detected type of the optical disc.

6. The apparatus according to claim 4, wherein the first generating section adopts the qualitative parameter selected from the group consisting of a frequency of detecting a frame synchronization signal contained in the signal reproduced from the optical disc, a C1 error contained in the reproduced signal, a jitter value of the reproduced signal, a deviation of the reproduced signal, a degree of modulation applied to the laser beam, a reflectance of the laser beam from the optical disc and an amplitude of the reproduced signal.

7. The apparatus according to claim 4, further comprising:

a setting section that is operated by a user for setting a desired recording velocity; and a judging section that judges whether the actual recording of the signal onto the optical disc at the desired recording velocity is possible according to the determined preferable value of the recording velocity.

8. The apparatus according to claim 7, further comprising an adjusting section operative when the judging section judges that the actual recording is not possible since the desired recording velocity exceeds the preferable recording velocity, for shifting the desired recording velocity below the preferable recording velocity so as to enable the recording of the signal.

9. The apparatus according to claim 8, further comprising a predicting section that predicts a time necessary for the recording at the shifted recording velocity, and an indicating section that indicates the predicted time to the user.

10. The apparatus according to claim 4, further comprising:

a driving section that operates in the recording of the signal for selectively driving the optical disc in either of a CLV mode where the optical disc is rotated at a constant linear velocity or a CAV mode where the optical disc is rotated at a constant angular velocity; and a control section that controls the driving section to switch between the CLV mode and the CAV mode according to the determined preferable recording velocity.

11. A computer program for use in a disc apparatus having a processor for recording a signal onto an optical disc by a write laser beam at a preferable recording velocity, the computer program being executed by the processor for enabling the disc apparatus to perform a process comprising:

undergoing a test recording of a signal onto a predetermined area of the optical disc prior to an actual recording at one or more levels of the recording velocity;

reproducing the signal by a read laser beam from the predetermined area of the optical disc;

generating a first characteristic at one or more levels of the recording velocity based on the reproduced signal, the first characteristic representing a relation between an optical feature of the laser beam and a qualitative parameter of a recording state of the signal, the optical feature being expressed in terms of either a $\beta$ value obtained from the read laser beam reflected back from the optical disc or a power of the writing laser beam;

generating a second characteristic from the first characteristic based on a predetermined preferable range of the qualitative parameter, such that the second characteristic represents a relation between the recording velocity and an available range of the optical feature corresponding to the predetermined preferable range of the qualitative parameter of the recording state; and determining a preferable value of the recording velocity according to the second characteristic and a predetermined preferable range of the optical feature which is predetermined to obtain a preferable recording state.

12. A method of determining a power of a writing optical beam used for recording of a signal onto an optical disc, the method comprising:

undergoing a test recording of a signal onto a predetermined test area of the optical disc prior to an actual recording;

reproducing the signal from the predetermined test area of the optical disc;

generating a first recording characteristic according to the reproduced signal, wherein the first characteristic represents a characteristic of a $\beta$ value as a function of the power of the writing optical beam, and wherein the $\beta$ value derived from an amplitude of the reproduced signal;

obtaining from the first recording characteristic a second recording characteristics, wherein the second characteristic represents a characteristic of a $\Delta\beta$ as a function of the power of the writing optical beam, and wherein the $\Delta\beta$ indicates a variation of the $\beta$ value in the first characteristic per a unit amount of the power of the writing optical beam;

determining a recording power range according to the obtained second recording characteristic using a preferable range of $\Delta\beta$, which is predetermined for realizing a preferable recording, such that the power of the writing optical beam is determined within the recording power range; and determining a preferable power of the writing optical beam according to the first recording characteristic and within the recording power range.

13. The method according to claim 12, further comprising:

generating a third recording characteristic according to the reproduced signal, representing a relation between the power of the writing optical beam and at least one of a plurality of qualitative parameters being associated with a quality of the recording and being selected from a group consisting of a frequency of detecting a frame synchronization signal contained in the signal reproduced from the optical disc, a C1 error contained in the reproduced signal, a jitter value of the reproduced signal, a deviation of the reproduced signal, a degree of modulation applied to the laser beam, a reflectance of the laser beam from the optical disc and an amplitude of the reproduced signal;

wherein determining comprises determining the recording power range according to the generated third recording characteristic in addition to the obtained second recording characteristic.

14. The method according to claim 12, wherein reproducing comprises reproducing the signal at a reading rate which is set smaller than a writing rate of the signal at the test recording.

15. The method according to claim 14, wherein reproducing comprises reproducing a plurality of the signals by undergoing a plurality of reproducing sessions on the test area.

16. An apparatus for recording a signal onto an optical disc by a writing optical beam having a preferable power, the apparatus comprising:

a test recording section that undergoes a test recording of a signal onto a predetermined test area of the optical disc prior to an actual recording;

a reproducing section that reproduces the signal from the predetermined test area of the optical disc;

a generating section that generates a first recording characteristic according to the reproduced signal wherein the first recording characteristic represents a characteristic of a $\beta$ value as a function of the power of the writing optical beam, and wherein the $\beta$ value is derived from an amplitude of the reproduced signal; the generating section further generates from the first recording characteristic a second recording characteristic wherein the second characteristic represents a characteristic of a $\Delta\beta$ as a function of the power of the writing optical beam, and wherein the $\Delta\beta$ indicates a variation of the $\beta$ value in the first recording characteristic per a unit amount of the power of the writing optical beam; and a determining section that determines a recording power range according to the second recording characteristic using a preferable range of $\Delta\beta$, which is predetermined for realizing a preferable recording, such that the power of the writing optical beam is determined within the recording power range, and that further determines a preferable power of the writing optical beam according to the first recording characteristic and within the recording power range.

17. An apparatus for recording a signal onto an optical disc by a writing optical beam having a preferable power, the apparatus comprising:

a test recording section that undergoes a test recording of a signal onto a predetermined test area of the optical disc prior to an actual recording;

a reproducing section that reproduces the signal from the predetermined test area of the optical disc;

a generating section that generates a first recording characteristic according to the reproduced signal, wherein the first characteristic represents a characteristic of a β value as a function of the power of the writing optical beam, the β value is derived from an amplitude of the reproduced signal, the generating section generates a second recording characteristic from the first characteristic, the second characteristic represents a characteristic of a Δβ as a function of the power of the writing optical beam, the Δβ indicates a variation of the β value in the first characteristic per a unit amount of the power of the writing optical beam, the generating section generates a third recording characteristic according to the reproduced signal, representing a relation between the power of the writing optical beam and at least one of a plurality of qualitative parameters being associated with a quality of the recording and being selected from a group consisting of a frequency of detecting a frame synchronization signal contained in the signal reproduced from the optical disc, a C1 error contained in the reproduced signal, a jitter value of the reproduced signal, a deviation of the reproduced signal, a degree of modulation applied to the laser beam, a reflectance of the laser beam from the optical disc and an amplitude of the reproduced signal; and a determining section that determines a recording cower range according to the second recording characteristic and the third recording characteristic using a preferable range of Δβ, which is predetermined for realizing a preferable recording, such that the power of the writing optical beam is determined within the recording power range and determines a preferable power of the writing optical beam according to the first recording characteristic, the second recording characteristic, and the third recording characteristic and within the recording power.

18. A computer program for use in a disc apparatus having a processor for recording a signal onto an optical disc by a writing optical beam having a preferable power, the computer program being executable by the processor for enabling the disc apparatus to perform a process comprising:

undergoing a test recording of a signal onto a predetermined test area of the optical disc prior to an actual recording;

reproducing the signal from the predetermined test area of the optical disc;

generating a first recording characteristic according to the reproduced signal, wherein the first recording characteristic represents a characteristic of a β value as a function of the power of the writing optical beam, and wherein the β value is derived from an amplitude of the reproduced signal;

obtaining from the first recording characteristic a second recording characteristic wherein the second characteristic represents a characteristic of a Δβ as a function of the power of the writing optical beam, and wherein the Δβ indicates a variation of the β value in the first recording characteristic per a unit amount of the power of the writing optical beam;

determining a recording power range according to the obtained second recording characteristic using a preferable range of Δβ, which is predetermined for realizing a preferable recording, such that the power of the writing optical beam is determined within the recording power range; and determining a preferable power of the writing optical beam according to the first recording characteristic and within the recording power range.

19. A computer program for use in a disc apparatus having a processor for recording a signal onto an optical disc by a writing optical beam having a preferable power, the computer program being executable by the processor for enabling the disc apparatus to perform a process comprising:

undergoing a test recording of a signal onto a predetermined test area of the optical disc prior to an actual recording;

reproducing the signal from the predetermined test area of the optical disc;

generating a first recording characteristic according to the reproduced signal, wherein the first characteristic represents a characteristic of a β value as a function of the power of the writing optical beam, and wherein the β value is derived from an amplitude of the reproduced signal;

obtaining from the first recording characteristic a second recording characteristic, wherein the second characteristic represents a characteristic of a Δβ as a function of the power of the writing optical beam, and wherein the Δβ indicates a variation of the β value in the first characteristic per a unit amount of the power of the writing optical beam;

generating a third recording characteristic according to the reproduced signal, representing a relation between the power of the writing optical beam and at least one of a plurality of qualitative parameters being associated with a quality of the recording and being selected from a group consisting of a frequency of detecting a frame synchronization signal contained in the signal reproduced from the optical disc, a C1 error contained in the reproduced signal, a jitter of the reproduced signal, a deviation of the reproduced signal, a degree of modulation applied to the laser beam, a reflectance of the laser beam from the optical disc and an amplitude of the reproduced signal; and determining a recording power range according to the second recording characteristic and the third recording characteristic using a preferable range of Δβ, which is predetermined for realizing a preferable recording, such that the power of the writing optical beam is determined within the recording power range and determines a preferable power of the writing optical beam according to the first recording characteristic, the second recording characteristic, and the third recording characteristic and within the recording power range.

20. The method according to claim 12, wherein determining comprises determining the recording power range which is split into a higher side and a lower side, and wherein determining comprises determining the preferable power of the writing optical beam within the lower side of the determined recording power range.

* * * * *